(12) United States Patent
Kim et al.

(10) Patent No.: US 9,919,741 B2
(45) Date of Patent: Mar. 20, 2018

(54) AUTONOMOUS DRIVING VEHICLE

(71) Applicant: LG ELECTRONICS INC., Seoul (KR)

(72) Inventors: Yonggwon Kim, Seoul (KR); Jieseop Sim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/138,025

(22) Filed: Apr. 25, 2016

(65) Prior Publication Data

US 2017/0057542 A1 Mar. 2, 2017

(30) Foreign Application Priority Data

Aug. 28, 2015 (KR) .................. 10-2015-0122127

(51) Int. Cl.
| | |
|---|---|
| *G01C 22/00* | (2006.01) |
| *B62D 15/02* | (2006.01) |
| *G05D 1/00* | (2006.01) |
| *B60W 10/20* | (2006.01) |
| *B62D 1/28* | (2006.01) |

(52) U.S. Cl.
CPC ........... *B62D 15/025* (2013.01); *B60W 10/20* (2013.01); *B62D 1/28* (2013.01); *G05D 1/0088* (2013.01); *B60W 2540/18* (2013.01)

(58) Field of Classification Search
USPC ........................................................ 701/23
See application file for complete search history.

(56) References Cited

U.S. PATENT DOCUMENTS

| | | | |
|---|---|---|---|
| 5,835,870 A | 11/1998 | Kagawa | |
| 8,260,482 B1* | 9/2012 | Szybalski | B62D 1/286 701/23 |
| 8,346,426 B1* | 1/2013 | Szybalski | B60W 50/14 701/25 |
| 2012/0303217 A1 | 11/2012 | Reichel et al. | |
| 2014/0088814 A1* | 3/2014 | You | G05D 1/0061 701/23 |
| 2014/0156133 A1* | 6/2014 | Cullinane | B60W 30/00 701/23 |
| 2015/0006014 A1* | 1/2015 | Wimmer | B60W 50/00 701/23 |
| 2016/0207538 A1* | 7/2016 | Urano | B60W 30/182 |
| 2016/0264131 A1* | 9/2016 | Chan | B60W 30/025 |

(Continued)

FOREIGN PATENT DOCUMENTS

| | | |
|---|---|---|
| DE | 10 2010 051 939 A1 | 5/2012 |
| DE | 10 2013 012 777 A1 | 2/2015 |
| EP | 1 864 889 A2 | 12/2007 |

(Continued)

*Primary Examiner* — Tyler D Paige
(74) *Attorney, Agent, or Firm* — Birch, Stewart, Kolasch & Birch, LLP

(57) ABSTRACT

An autonomous driving vehicle is configured to enable mutual switching between an autonomous driving state and a manual driving state. The autonomous driving vehicle includes a steering wheel, and a controller configured to control mechanical linkage or electrical linkage between the steering wheel and a directional vehicle wheel so as to be cut off based on whether the autonomous driving vehicle is in the autonomous driving state or the manual driving state.

18 Claims, 61 Drawing Sheets

(56) References Cited

U.S. PATENT DOCUMENTS

2016/0304124 A1\* 10/2016 Fujiyoshi ............... B62D 1/286
2017/0057542 A1\* 3/2017 Kim .................... B62D 15/025

FOREIGN PATENT DOCUMENTS

| EP | 2 862 767 A2 | 4/2015 |
|----|---|---|
| EP | 2 862 773 A2 | 4/2015 |
| JP | 7-89095 A | 3/1995 |
| JP | 9-164970 A | 6/1997 |
| JP | 2000-306194 A | 11/2000 |
| JP | 2002-2519 A | 1/2002 |
| JP | 2004-34751 A | 2/2004 |
| JP | 2004-203117 A | 7/2004 |
| JP | 2010-188770 A | 9/2010 |
| JP | 5113098 B2 | 1/2013 |
| JP | 2015-98218 A | 5/2015 |

\* cited by examiner

AUTONOMOUS DRIVING VEHICLE

CROSS-REFERENCE TO RELATED APPLICATION

This application claims the priority benefit of Korean Patent Application No. 10-2015-0122127, filed on Aug. 28, 2015, in the Korean Intellectual Property Office, the entire disclosure of which is incorporated herein by reference.

BACKGROUND OF THE INVENTION

1. Field of the Invention

The present invention relates to autonomous driving vehicles.

2. Description of the Related Art

A vehicle is an apparatus that transports a user riding therein in a desired direction. A representative example of a vehicle may be an automobile.

In recent years, electronic companies as well as existing automobile manufacturers have been immersed in the development of autonomous driving vehicles.

Autonomous driving vehicles perform autonomous driving via communication with external devices, or perform autonomous driving via recognition and judgment of the surrounding environment using various sensors attached thereto.

Autonomous driving vehicles need to be manually driven depending on the situation. That is, autonomous driving vehicles are provided with driving operation devices such as a steering wheel, an acceleration pedal, and a brake pedal for manual driving. Although autonomous driving does not require the driving operation devices, the driving operation devices of conventional autonomous driving vehicles have been used in the autonomous driving state so as to be operated in linkage to vehicle driving. In particular, when a steering wheel is rotated upon direction change in the autonomous driving state, this may cause a driver to feel a sense of disconnectedness and inconvenience.

Therefore, there is a demand for research and development related to autonomous driving vehicles which control the cutoff of linkage between a steering wheel and directional vehicle wheels based on whether an autonomous driving vehicle is in an autonomous driving state or in a manual driving state.

SUMMARY OF THE INVENTION

Therefore, the present invention is made to solve the problems as described above and an object of the present invention is to provide an autonomous driving vehicle, which controls the cutoff of linkage between a steering wheel and directional vehicle wheels based on whether the autonomous driving vehicle is in an autonomous driving state or in a manual driving state.

Objects of the present invention should not be limited to the aforementioned object and other not-mentioned objects will be clearly understood by those skilled in the art from the following description.

In accordance with an embodiment of the present invention, the above and other objects can be accomplished by the provision of an autonomous driving vehicle configured to enable mutual switching between an autonomous driving state and a manual driving state, the vehicle including a steering wheel, and a controller configured to control mechanical linkage or electrical linkage between the steering wheel and a directional vehicle wheel so as to be cut off based on whether the autonomous driving vehicle is in the autonomous driving state or the manual driving state.

In addition, in the embodiment of the present invention, the controller may control the mechanical linkage or electrical linkage between the steering wheel and the directional vehicle wheel so as to be cut off when the autonomous driving vehicle is in the autonomous driving state.

In addition, in the embodiment of the present invention, the controller may perform control to begin an operation to prepare for autonomous driving when a prescribed event occurs in the manual driving state.

In addition, in the embodiment of the present invention, the event may be a user input for switching from the manual driving state to the autonomous driving state.

In addition, in the embodiment of the present invention, the autonomous driving vehicle may further include an output unit, and the controller may control the output unit so as to output information regarding switching to autonomous driving when the preparation operation begins.

In addition, in the embodiment of the present invention, when the preparation operation begins in the state in which the steering wheel is rotated, the controller may control the mechanical linkage or electrical linkage so as to be cut off while maintaining the steering wheel in the rotated state.

In addition, in the embodiment of the present invention, the controller may control the steering wheel so as to return to an original state thereof from the rotated state after the mechanical linkage or electrical linkage is cut off.

In addition, in the embodiment of the present invention, the controller may perform control to switch to the manual driving state when it is sensed that the steering wheel is being gripped in the autonomous driving state in the state in which the steering wheel and the directional vehicle wheel are not in an engaged state, thereby controlling the steering wheel and the directional vehicle wheel so as to be mechanically or electrically linked to each other while maintaining the steering wheel and the directional vehicle wheel in the unengaged state.

In addition, in the embodiment of the present invention, the controller may perform control to again switch to the autonomous driving state when the release of the grip of the steering wheel is sensed after switching to the manual driving state.

In addition, in the embodiment of the present invention, the controller may perform control to begin an operation to prepare for autonomous driving when user input for switching to the autonomous driving state is received in the state in which the release of the grip of the steering wheel is sensed after switching to the manual driving state.

In addition, in the embodiment of the present invention, the controller may perform control to temporarily switch to the manual driving state when user input for lane change is received in the autonomous driving state.

In addition, in the embodiment of the present invention, the controller may control the steering wheel and the directional vehicle wheel so as to be mechanically or electrically linked to each other while the autonomous driving vehicle is in the manual driving state.

In addition, in the embodiment of the present invention, the controller may perform control to begin an operation to prepare for manual driving when a prescribed event occurs in the autonomous driving state.

In addition, in the embodiment of the present invention, the event may be user input for switching from the autonomous driving state to the manual driving state, or an input corresponding to rotation of the steering wheel.

In addition, in the embodiment of the present invention, the autonomous driving vehicle may further include an output unit, and the controller may control the output unit so as to output information regarding switching to manual driving when the preparation operation begins.

In addition, in the embodiment of the present invention, the controller may control the steering wheel and the directional vehicle wheel so as to be mechanically or electrically linked to each other for engagement therebetween when the preparation operation begins.

In addition, in the embodiment of the present invention, the controller may control the steering wheel and the directional vehicle wheel so as to be engaged with each other by rotating the steering wheel to correspond to a direction of the directional vehicle wheel.

In addition, in the embodiment of the present invention, the controller may adjust a rotational speed of the steering wheel based on whether it is sensed that the steering wheel is being gripped.

In addition, in the embodiment of the present invention, the autonomous driving vehicle may further include an output unit, and the controller may control the output unit so as to output information regarding an engagement state of the steering wheel and the directional vehicle wheel.

In addition, in the embodiment of the present invention, the controller may control the mechanical linkage or electrical linkage between the steering wheel and the directional vehicle wheel so as to be cut off when an extent of direction change of the directional vehicle wheel per unit time is a reference value or more in the manual driving state.

Detailed items of other embodiments are included in the following description and the accompanying drawings.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
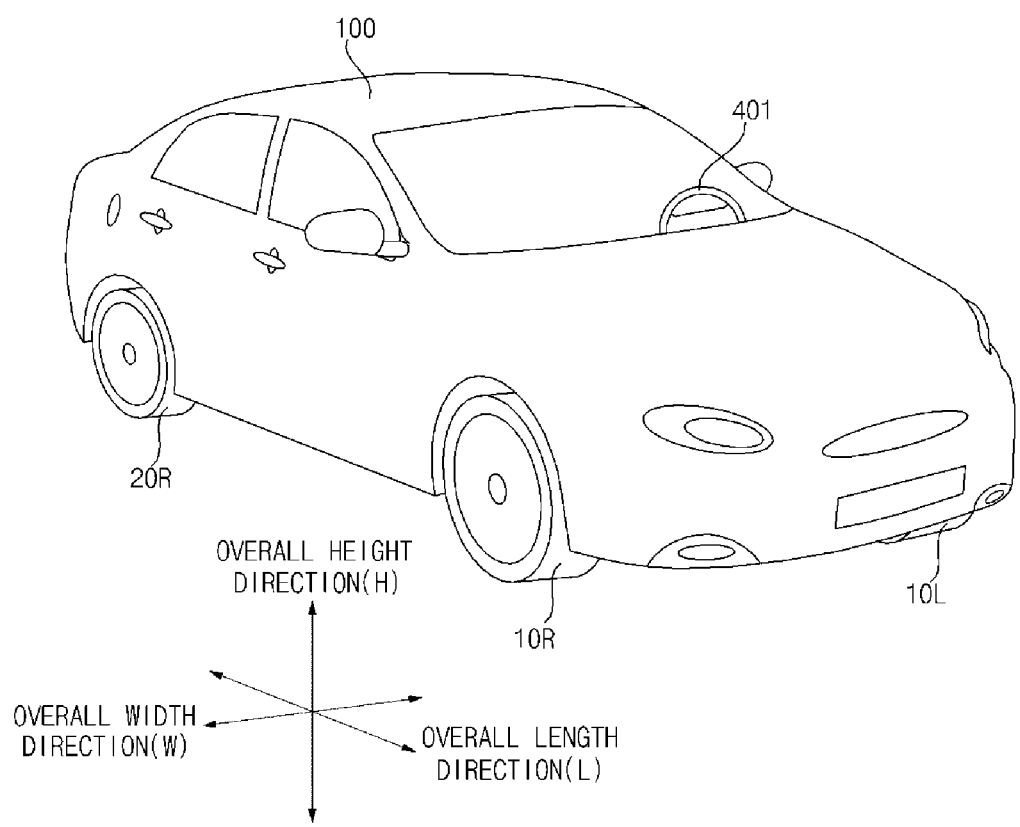
FIG. 1 is a view illustrating the external appearance of an autonomous driving vehicle according to an embodiment of the present invention.

Hereinafter, the embodiments disclosed in the present specification will be described in detail with reference to the accompanying drawings, and the same or similar elements are denoted by the same reference numerals even though they are depicted in different drawings and redundant descriptions thereof will be omitted. In the following description, with respect to constituent elements used in the following description, suffixes "module" and "unit" are given or mingled with each other only in consideration of ease in the ready of the specification, and do not have or serve as different meanings. Accordingly, the suffixes "module" and "unit" may be mingled with each other. In addition, in the following description of the embodiments disclosed in the present specification, a detailed description of known functions and configurations incorporated herein will be omitted when it may make the subject matter of the embodiments disclosed in the present specification rather unclear. In addition, the accompanying drawings are provided only for a better understanding of the embodiments disclosed in the present specification and are not intended to limit technical ideas disclosed in the present specification. Therefore, it should be understood that the accompanying drawings include all modifications, equivalents and substitutions included in the scope and sprit of the present invention.

It will be understood that although the terms first, second, etc., may be used herein to describe various components, these components should not be limited by these terms. These terms are only used to distinguish one component from another component.

It will be understood that when a component is referred to as being "connected to" or "coupled to" another component, it may be directly connected to or coupled to another component or intervening components may be present. In contrast, when a component is referred to as being "directly connected to" or "directly coupled to" another component, there are no intervening components present. In addition, it will be understood that when a component is referred to as "controlling" another component, it may directly control another component, or may also control another component via the mediation of a third component. In addition, it will be understood that when a component is referred to as "providing" another component with information and signals, it may directly provide another component with the same and may also provide another component the same via the mediation of a third component.

As used herein, the singular form is intended to include the plural forms as well, unless the context clearly indicates otherwise.

In the present application, it will be further understood that the terms "comprises", includes," etc. specify the presence of stated features, integers, steps, operations, elements, components, or combinations thereof, but do not preclude the presence or addition of one or more other features, integers, steps, operations, elements, components, or combinations thereof.

A vehicle as described in this specification may include an automobile and a motorcycle. Hereinafter, the vehicle will be described as being an automobile.

The vehicle as described in this specification may include all of an internal combustion engine vehicle including an engine as a power source, a hybrid vehicle including both an engine and an electric motor as a power source, and an electric vehicle including an electric motor as a power source.

In the following description, "the left side of the vehicle" refers to the left side in the forward driving direction of the vehicle, and "the right side of the vehicle" refers to the right side in the forward driving direction of the vehicle.

In the following description, "forward" refers to the forward driving direction of the vehicle, and "rearward" refers to the reverse driving direction of the vehicle.

Figure 2:
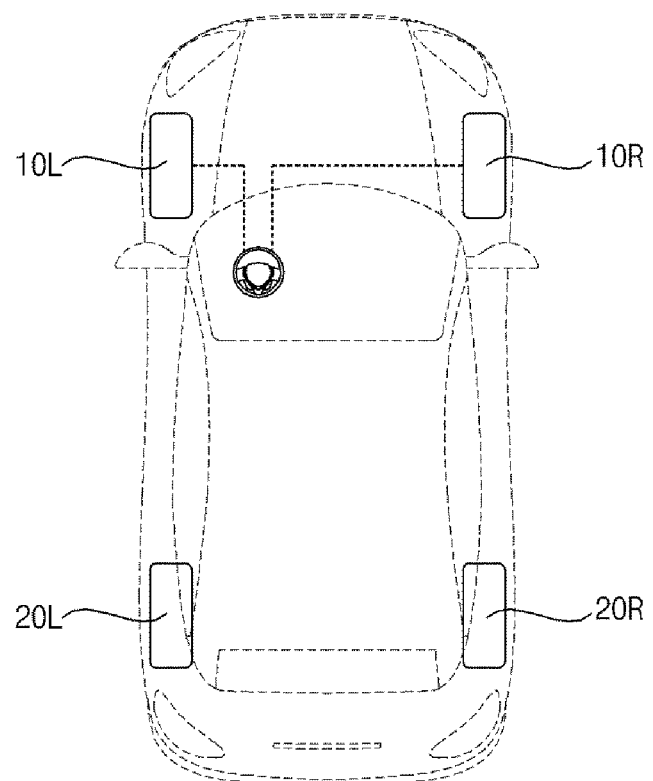
FIG. 2 is a plan view of the autonomous driving vehicle according to an embodiment of the present invention.
Figure 3:
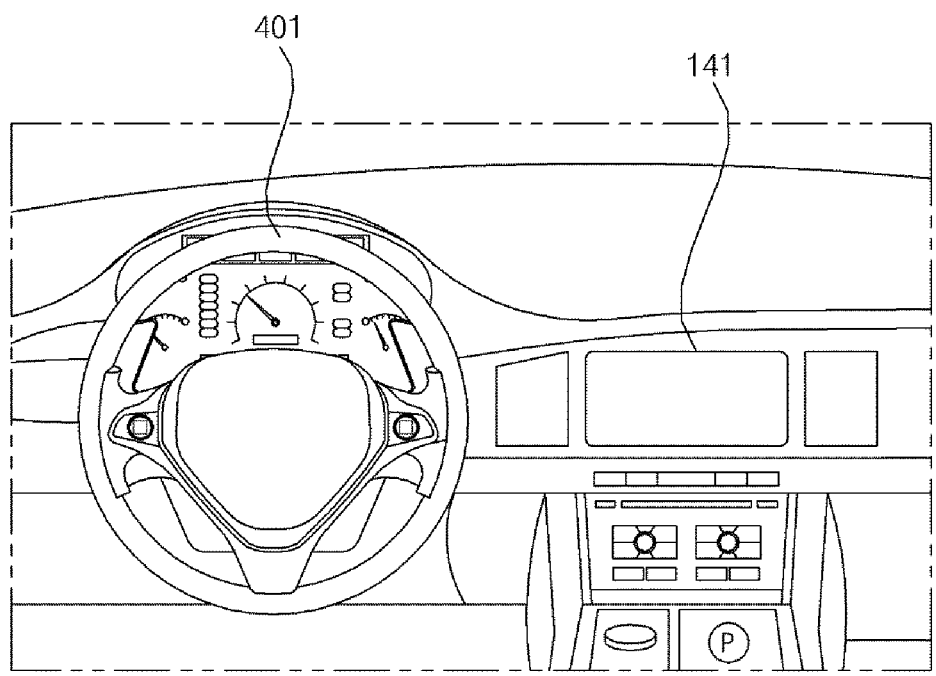
FIG. 3 is a view illustrating a cockpit module of the autonomous driving vehicle, including a steering wheel, according to an embodiment of the present invention.

FIG. 1 is a view illustrating the external appearance of an autonomous driving vehicle according to an embodiment of the present invention, FIG. 2 is a plan view of the autonomous driving vehicle according to an embodiment of the present invention, and FIG. 3 is a view illustrating a cockpit module of the autonomous driving vehicle, including a steering wheel, according to an embodiment of the present invention.

Figure 4A:
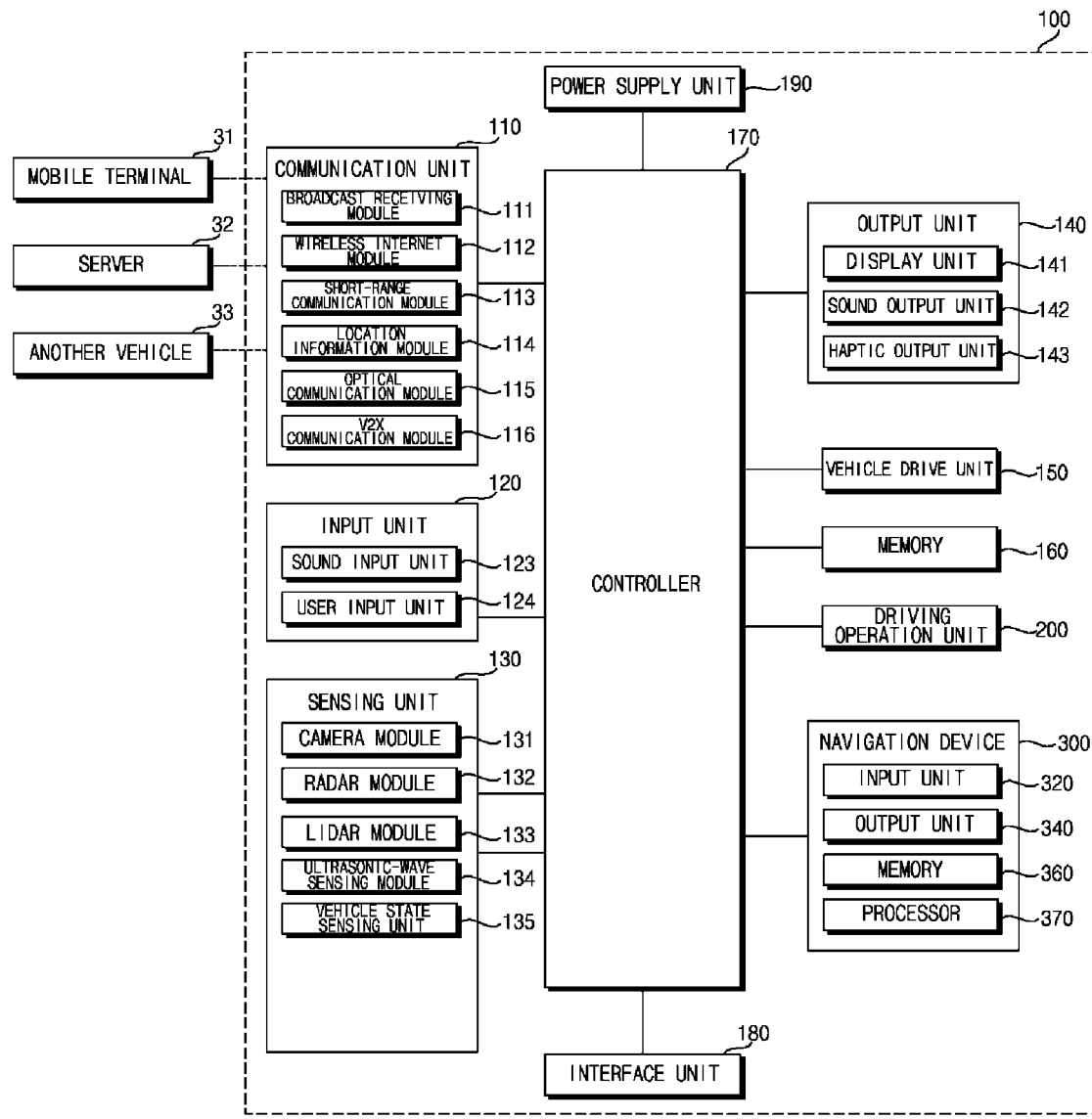
FIG. 4A is a block diagram of the autonomous driving vehicle according to an embodiment of the present invention.

Referring to FIGS. 1 to 3, the autonomous driving vehicle 100 according to the embodiment of the present invention may include wheels 10R, 10L, 20R and 20L, which are rotated by a power source, and a driving operation unit 200 (see FIG. 4A).

The driving operation unit 200 may include a steering wheel 401.

The wheels 10R, 10L, 20R and 20L may include directional vehicle wheels 10L and 10R. Here, the directional vehicle wheels 10L and 10R mean wheels, the direction of which is changed in response to a steering input. For example, in the manual driving state, the directional vehicle wheels 10L and 10R may be changed in direction to the left side or the right side of the forward movement direction in response to user steering input using the steering wheel 401. For example, in the autonomous driving state, the directional vehicle wheels 10L and 10R may be changed in direction to the left side or the right side of the forward movement direction under the control of a controller 170 without user input.

The directional vehicle wheels 10L and 10R may include respectively steering actuators. The directional vehicle wheels 10L and 10R may be changed in direction upon receiving power from the steering actuators. Here, the steering actuators for direction change may be controlled by the controller 170. The steering actuator may include, for example, a motor, a solenoid, a pneumatic actuator, an electric actuator, or a hydraulic actuator.

In the following description, although the directional vehicle wheels 10L and 10R will be illustrated and described as front wheels, the directional vehicle wheels may be rear wheels. Alternatively, the directional vehicle wheels may be all of the front wheels and rear wheels.

The steering wheel 401 may be mechanically or electrically linked to the directional vehicle wheels 10L and 10R.

The autonomous driving vehicle 100 enables mutual switching between the autonomous driving state and the manual driving state. Specifically, the autonomous driving vehicle 100 may switch from the autonomous driving state to the manual driving state, and may switch from the manual driving state to the autonomous driving state.

The autonomous driving vehicle 100 may switch from the autonomous driving state to the manual driving state when a prescribed event occurs. Here, the event may be a user input event or an event corresponding to the occurrence of a specific situation. In addition, the autonomous driving vehicle 100 may switch from the manual driving state to the autonomous driving state when a prescribed event occurs. Here, the event may be a user input event or an event corresponding to the occurrence of a specific situation.

The autonomous driving vehicle 100 may perform control to cut off the mechanical linkage or electrical linkage between the steering wheel 401 and the directional vehicle wheels 10L and 10R.

The overall length means the length of the autonomous driving vehicle 100 from the front end to the rear end, the overall width means the width of the autonomous driving vehicle 100, and the overall height means the height of the autonomous driving vehicle 100 from the bottom of the wheels to the roof. In the following description, the overall length direction L may mean the reference direction for the measurement of the overall length of the autonomous driving vehicle 100, the overall width direction W may mean the reference direction for the measurement of the overall width of the autonomous driving vehicle 100, and the overall height direction H may mean the reference direction for the measurement of the overall height of the autonomous driving vehicle 100.

Figure 4B:
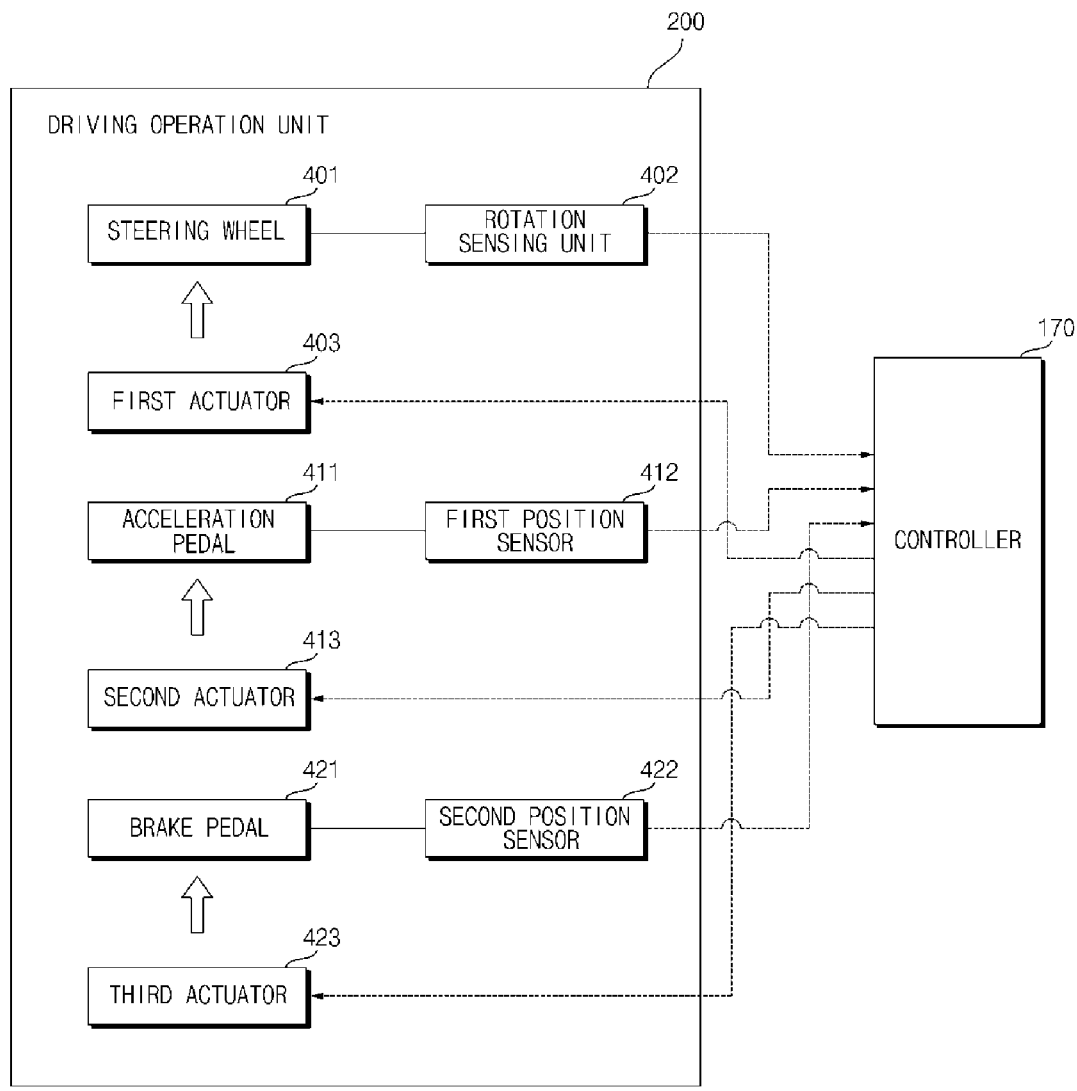
FIG. 4B is a block diagram illustrating the internal configuration of a driving operation unit according to an embodiment of the present invention.
Figure 5:
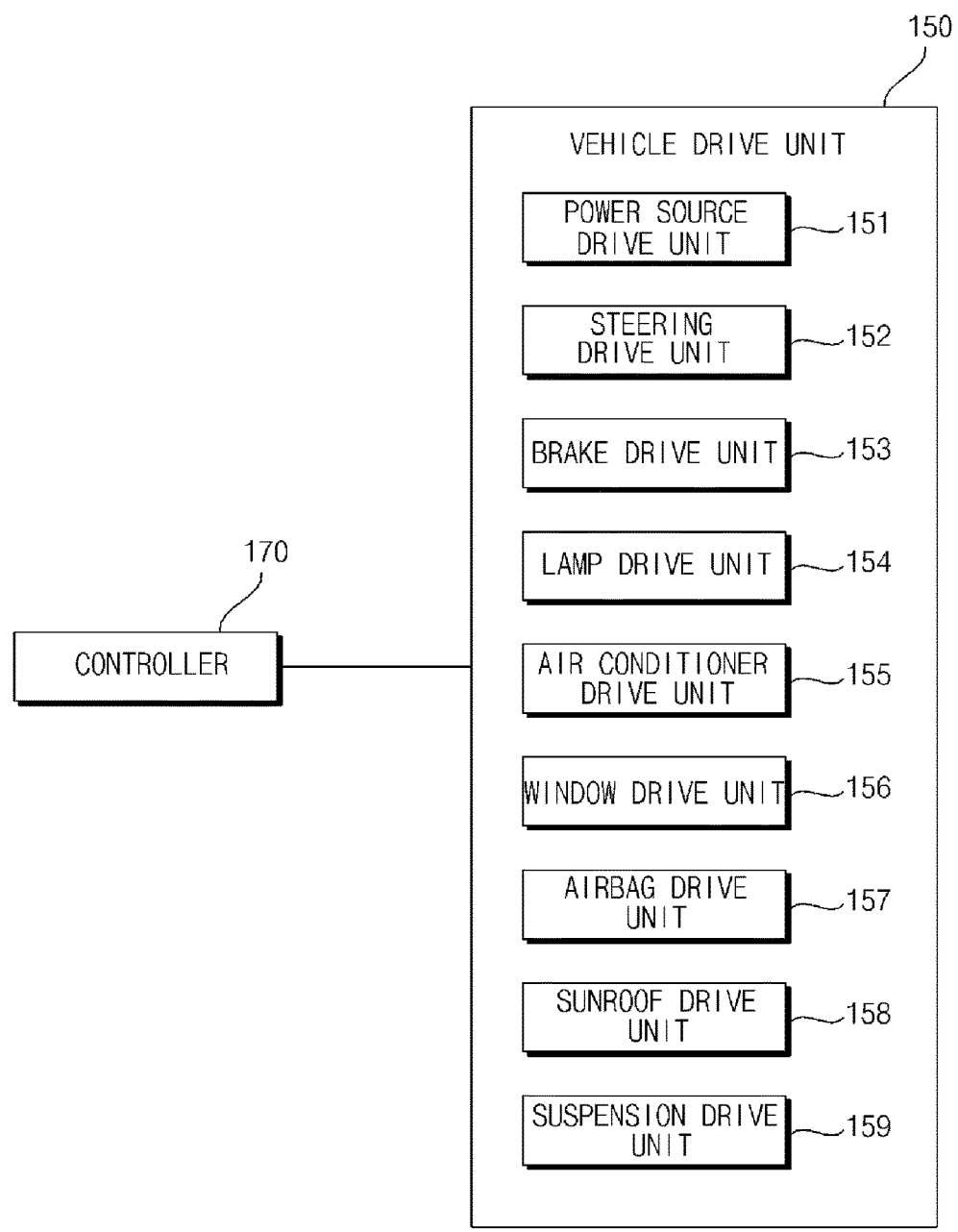
FIG. 5 is a block diagram illustrating the internal configuration of a vehicle drive unit according to an embodiment of the present invention.

FIG. 4A is a block diagram of the autonomous driving vehicle according to an embodiment of the present invention, FIG. 4B is a block diagram illustrating the internal configuration of a driving operation unit according to an embodiment of the present invention, and FIG. 5 is a block diagram illustrating the internal configuration of a vehicle drive unit according to an embodiment of the present invention.

Referring to FIG. 4A, the autonomous driving vehicle 100 may include a communication unit 110, an input unit 120, a sensing unit 130, an output unit 140, a vehicle drive unit 150, a memory 160, a controller 170, an interface unit 180, a power supply unit 190, and a navigation device 300.

The communication unit 110 may include a broadcast receiving module 111, a wireless Internet module 112, a short-range communication module 113, a location information module 114, an optical communication module 115, and a V2X communication module 116.

The broadcast receiving module 111 is configured to receive broadcast signals or broadcast-associated information from an external broadcast managing server through a broadcast channel. Here, broadcast includes radio broadcast or TV broadcast.

The wireless Internet module 112 is a module for wireless Internet access. The wireless Internet module 112 may be internally or externally coupled to the autonomous driving vehicle 100. The wireless Internet module 112 is configured to transmit or receive wireless signals via communication networks based on wireless Internet technologies.

Examples of such wireless Internet technologies include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), and LTE-A (Long Term Evolution-Advanced). The wireless Internet module 112 transmits and receives data according to one or more of such wireless Internet technologies and other Internet technologies as well. For example, the wireless Internet module 112 may exchange data with an external server 32 in a wireless manner. The wireless Internet module 112 may receive weather information and road traffic state information (e.g., Transport Protocol Expert Group (TPEG) information) from the external server 32.

The short-range communication module 113 may assist short-range communication using at least one selected from among Bluetooth™, Radio Frequency IDdentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication module 113 may form wireless area networks to perform the short-range communication between the autonomous driving vehicle 100 and at least one external device. For example, the short-range communication module 113 may exchange data with a mobile terminal 31 in a wireless manner. The short-range communication module 113 may receive weather information and road traffic state information (e.g., Transport Protocol Expert Group (TPEG) information) from the mobile terminal 31. When the user gets into the autonomous driving vehicle 100, the mobile terminal 31 of the user and the autonomous driving vehicle 100 may pair with each other automatically or as the user executes a pairing application.

The location information module 114 is a module to acquire a location of the autonomous driving vehicle 100. A representative example of the location information module 114 includes a Global Position System (GPS) module. For example, when the autonomous driving vehicle 100 utilizes a GPS module, a location of the autonomous driving vehicle 100 may be acquired using signals transmitted from GPS satellites.

In some embodiments, the location information module 114 may be a component included in the sensing unit 130, rather than a component included in the communication unit 110.

The optical communication module 115 may include a light emitting unit and a light receiving unit.

The light receiving unit may convert light into electrical signals to receive information. The light receiving unit may include Photo Diodes (PDPs) to receive light. The photo diodes may convert light into electrical signals. For example, the light receiving unit may receive information regarding a preceding autonomous driving vehicle via light emitted from a light source included in the preceding autonomous driving vehicle.

The light emitting unit may include at least one light emitting element to convert electrical signals into light. Here, the light emitting element may be a Light Emitting Diode (LED). The light emitting unit converts electrical signals into light to thereby emit the light. For example, the light emitting unit may externally emit light via flickering of the light emitting element corresponding to a prescribed frequency. In some embodiments, the light emitting unit may include an array of a plurality of light emitting elements. In some embodiments, the light emitting unit may be integrated with a lamp provided in the autonomous driving vehicle 100. For example, the light emitting unit may be at least one selected from among a headlight, a taillight, a brake light, a turn signal light, and a sidelight. For example, the optical communication module 115 may exchange data with another vehicle 33 via optical communication.

The V2X communication module 116 is a module to perform wireless communication with the server 32 or the other vehicle 33. The V2X communication module 116 includes a module in which a protocol for communication between autonomous driving vehicles (V2V) or communication between an autonomous driving vehicle and an infrastructure (V2I) may be implemented. The autonomous driving vehicle 100 may perform wireless communication with the external server 32 or the other vehicle 33 via the V2X communication module 116.

The input unit 120 may include the driving operation unit 200, a sound input unit 123, and a user input unit 124.

Referring to FIG. 4B, the driving operation unit 200 is configured to receive a user input for the driving of the autonomous driving vehicle 100 in a manual mode. The driving operation unit 200 may include a steering wheel 401, a rotation sensing unit 402, a first actuator 403, an acceleration pedal 411, a first position sensor 412, a second actuator 413, a brake pedal 421, a second position sensor 422, and a third actuator 423.

The steering wheel 401 may receive user input with regard to the heading direction of the vehicle 100.

The steering wheel 401 may be mechanically linked to the directional vehicle wheels 10L and 10R.

For example, the steering wheel 401 may be mechanically linked to the directional vehicle wheels 10L and 10R with, for example, a steering shaft, a steering gear box, a pitman arm, a drag link, a center link, a tie-rod, a knuckle arm, a steering knuckle, and a king pin interposed therebetween. At this time, the direction of the directional vehicle wheels 10L and 10R may be changed as the power generated by the rotation of the steering wheel 401 is transmitted to the directional vehicle wheels 10L and 10R. A hydraulic device or a motor may be provided to amplify the power.

The steering wheel 401 may be electrically linked to the directional vehicle wheels 10L and 10R.

For example, the steering wheel 401 may be electrically linked to the directional vehicle wheels 10L and 10R without mechanical linkage. In this instance, information related to the rotation of the steering wheel 401 may be converted into electrical signals so as to be transmitted to the steering wheels 10L and 10R. At this time, the directional vehicle wheels 10L and 10R may include respective steering actuators which enable change in the direction of the directional vehicle wheels 10L and 10R, and the electrical signals may be transmitted to the actuators so as to change the direction of the directional vehicle wheels 10L and 10R.

Such electrical linkage may be named "steer-by-wire".

In the state in which the steering wheel 401 and the directional vehicle wheels 10L and 10R are linked to each other, the direction of the directional vehicle wheels 10L and 10R may be changed to the left side relative to the direction in which the vehicle is heading when the steering wheel 401 is rotated counterclockwise by the operation of the user. In addition, the direction of the directional vehicle wheels 10L and 10R may be changed to the right side relative to the direction in which the vehicle is heading when the steering wheel 401 is rotated clockwise by the operation of the user.

In addition, in the state in which the steering wheel 401 and the directional vehicle wheels 10L and 10R are linked to each other, the steering wheel 401 may be rotated counterclockwise when the direction of the directional vehicle wheels 10L and 10R is changed to the left direction. In addition, the steering wheel 401 may be rotated clockwise when the direction of the directional vehicle wheels 10L and 10R is changed to the right direction.

The rotation sensing unit 402 may sense the rotation of the steering wheel 401. The rotation sensing unit 402 may sense whether the steering wheel 401 is rotated, and the rotational direction, rotational displacement, or rotational speed of the steering wheel 401.

The first actuator 403 may provide power so as to allow the steering wheel 401 to be rotated to a prescribed position under the control of the controller 170. The first actuator 403 may include, for example, a motor, a solenoid, a pneumatic actuator, an electric actuator, or a hydraulic actuator.

The acceleration pedal 411 may receive an input for the acceleration of the vehicle 100 from the user.

The first position sensor 412 may sense the pedaling of the acceleration pedal 411. The first position sensor 412 may sense the pedaling speed or the pedaling pressure.

The second actuator 413 may provide power so as to push the acceleration pedal 411 to a prescribed position under the control of the controller 170. The second actuator 413 may include, for example, a motor, a solenoid, a pneumatic actuator, an electric actuator, or a hydraulic actuator.

For example, in the case of switching from the autonomous driving state to the manual driving state, the controller 170 may control the second actuator 413 so as to allow the acceleration pedal 411 to be pushed to a position corresponding to the degree of acceleration of the autonomous driving vehicle 100. The second actuator 413 may provide power required to allow the acceleration pedal 411 to be pushed to a position corresponding to the degree of acceleration under the control of the controller 170. In this way, the user can drive without feeling a sense of disconnectedness in the case of switching from the autonomous driving state to the manual driving state.

The brake pedal 421 may receive an input for the speed reduction of the vehicle 100 from the user.

The second position sensor 422 may sense the pedaling of the brake pedal 421. The second position sensor 412 may sense the pedaling speed or the pedaling pressure.

The third actuator 423 may provide power so as to push the brake pedal 421 to a prescribed position under the control of the controller 170. The third actuator 423 may include, for example, a motor, a solenoid, a pneumatic actuator, an electric actuator, or a hydraulic actuator.

For example, in the case of switching from the autonomous driving state to the manual driving state, the controller 170 may control the third actuator 424 so as to allow the brake pedal 421 to be pushed to a position corresponding to the degree of speed reduction of the autonomous driving vehicle 100. The third actuator 423 may provide power required to allow the brake pedal 423 to be pushed to a position corresponding to the degree of speed reduction under the control of the controller 170. In this instance, the user can drive without feeling a sense of disconnectedness in the case of switching from the autonomous driving state to the manual driving state.

Referring again to FIG. 4A, the sound input unit 123 may process external sound signals into electrical data. The processed data may be utilized in various ways based on functions that the autonomous driving vehicle 100 is performing. The sound input unit 123 may convert a user voice command into electrical data. The converted electrical data may be transmitted to the controller 170.

In some embodiments, the sound input unit 123 may be a component included in the sensing unit 130, rather than a component included in the input unit 120.

The user input unit 124 serves to receive information from the user. When information is input via the user input unit 124, the controller 170 may control the operation of the autonomous vehicle driving 100 so as to correspond to the input information. The user input unit 124 may include a touch type input unit or a mechanical input unit. In some embodiments, the user input unit 124 may be placed at a region of the steering wheel 401. In this instance, the driver may operate the user input unit 124 with the fingers while gripping the steering wheel 401.

The user input unit 124 may include a touchscreen, and may be integrated with a display unit 141 or a display apparatus.

The sensing unit 130 may include a camera module 131, a radar module 132, a light detection and ranging (LiDAR) module 133, an ultrasonic-wave sensing module 134, and a vehicle state sensing unit 135.

The camera module 131 may acquire a vehicle front-view image, a vehicle rear-view image, or a vehicle surround-view image. The camera module 131 may detect an object from the acquired image.

The camera module 131 may include an image sensor and an image processing module. The camera module 131 may process a still image or moving image acquired by the image sensor (e.g., a CMOS or CCD). The image processing module may extract required information by processing the still image or moving image acquired by the image sensor, and may transmit the extracted information to the controller 170.

The autonomous driving vehicle 100 may include a front camera module configured to capture a front-view image of the autonomous driving vehicle, an around-view camera module configured to capture a surround-view image of the autonomous driving vehicle, an internal camera module configured to capture an interior image of the autonomous driving vehicle, and a rear camera module configured to capture a rear-view image of the autonomous driving vehicle. Each of the camera modules may include a lens, an image sensor, and a processor. The processor may generate data or information via computing of the captured image, and may transmit the generated data or information to the controller 170.

The processor included in the camera module 131 may be controlled by the controller 170.

The processor included in the camera module 131 may be implemented in a hardware manner using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for the implementation of other functions.

The camera module 131 may include the front camera module, the around-view camera module, the internal camera module, and the rear camera module.

The front camera module may include a stereo camera module. In this instance, the processor of the camera module may detect the distance to an object located in front of the vehicle, the speed relative to the object detected from the image, and the distance between a plurality of objects, through the use of the disparity difference detected from stereo images.

The front camera module may include a Time of Flight (TOF) camera module. In this instance, the front camera module may include a light source (e.g., infrared light or laser) and a receiver. The processor of the front camera module may detect the distance to an object located in front of the vehicle, the speed relative to the object, and the distance between a plurality of objects based on the TOF, that is, the time taken until infrared or laser emitted from the light source is reflected by the object and then received.

When the front camera module is a mono camera module, the front camera module may detect the distance to the object and the speed relative to the object based on variation in the size of the object located in front of the vehicle with the passage of time.

The around-view camera module may include a plurality of camera modules. For example, the camera modules may be arranged at the left, rear, right, and front positions of the autonomous driving vehicle 100.

A left camera module may be located in a case enclosing a left side view mirror. Alternatively, the left camera module may be located at the exterior of the case enclosing the left side view mirror. Alternatively, the left camera module may be located at a region of the exterior of a left front door, a left rear door, or a left fender.

A right camera module may be located in a case enclosing a right side view mirror. Alternatively, the right camera module may be located at the exterior of the case enclosing the right side view mirror. Alternatively, the right camera module may be located at a region of the exterior of a right front door, a right rear door, or a right fender.

A rear camera module may be located near a rear license plate or a trunk or tail gate switch.

A front camera module may be located near an emblem or near a radiator grill.

Respective images captured by the camera modules may be transmitted to the processor of the camera module, and the processor may compose the respective images to generate a surround-view image of the autonomous driving vehicle 100. At this time, the surround-view image of the autonomous driving vehicle 100 may be displayed in the form of a top view image or a bird's eye image via the display unit 141.

The internal camera module may capture an image of the interior of the autonomous driving vehicle 100. The inner camera module may acquire an image of a passenger.

The processor of the internal camera module may detect the number of passengers riding in the vehicle and which seats the respective passengers are sitting in by acquiring an image of the passengers inside the autonomous driving vehicle 100. For example, the internal camera module may detect whether a passenger is present and the position of the passenger.

The inner camera module may acquire an image for the recognition of biometrics of the passenger. The processor of the inner camera module may verify the ID of the passenger based on the image of the face of the passenger.

The rear camera module may include a stereo camera. In this instance, the processor of the camera module may detect the distance to an object located at the rear of the vehicle, the speed relative to the object detected from the image, and the distance between a plurality of objects, through the use of the disparity difference detected from stereo images.

The rear camera module may include a Time of Flight (TOF) camera module. In this instance, the camera module may include a light source (e.g., infrared light or laser) and a receiver. The processor of the camera module may detect the distance to an object located at the rear of the vehicle, the speed relative to the object, and the distance between a plurality of objects based on the TOF, that is, the time until infrared or laser emitted from the light source is reflected by the object and then received.

When the rear camera module is a mono camera module, the rear camera module may detect the distance to the object and the speed relative to the object based on variation in the size of the object located at the rear of the vehicle with the passage of time.

An object detected by the ultrasonic sensor, radar, or LiDAR may be utilized by matching it with an object detected from the image acquired by the camera module 131.

The radar module 132 may include an electromagnetic wave transmitter and receiver, and a processor. The radar module 132 may be implemented in a pulse radar or continuous wave radar manner based on the principle of electromagnetic wave radiation. In addition, the radar module 132 may be implemented in a Frequency Modulated Continuous Wave (FMCW) or Frequency Shift Keying (FSK) manner based on the signal waveform of the continuous wave radar.

The radar module 132 may detect an object based on transmitted electromagnetic waves, and may detect the distance to the detected object and the speed relative to the object. In the case where the object is a stationary object (e.g., a tree, streetlamp, traffic light, or traffic sign), the radar module 132 may detect the driving speed of the autonomous driving vehicle 100 based on the TOF of the object.

The LiDAR module 133 may include laser transmitter and receiver, and a processor. The LiDAR module 133 may be implemented in a Time of Flight (TOF) manner or phase-shift manner.

The TOF type LiDAR module 133 emits laser pulse signals, and receives the pulse signals reflected by the object. The LiDAR module 133 may measure the distance to the object based on the time taken for emitted laser pulse signals to be reflected and then received. In addition, the LiDAR module 133 may measure the speed relative to the object based on variation in distance over time.

The phase-shift type LiDAR module 133 may emit a continuously modulated laser beam having a specific frequency, and may measure the distance to the object and time based on variation in the phase of signals reflected by the object. In addition, the LiDAR module 133 may measure the speed relative to the object based on variation in distance over time.

The LiDAR module 133 may detect an object based on transmitted laser, and may detect the distance to the detected object and the speed relative to the object. In the case where the object is a stationary object (e.g., a tree, streetlamp, traffic light, or traffic sign), the LiDAR module 133 may detect the driving speed of the autonomous driving vehicle 100 based on the TOF of the object.

The ultrasonic-wave sensing module 134 may include an ultrasonic wave transmitter and receiver, and a processor.

The ultrasonic-wave sensing module 134 may detect an object based on transmitted ultrasonic waves, and may detect the distance to the detected object and the speed relative to the object. In the case where the object is a stationary object (e.g., a tree, streetlamp, traffic light, or traffic sign), the ultrasonic-wave sensing module 134 may detect the driving speed of the autonomous driving vehicle 100 based on the TOF of the object.

The vehicle state sensing unit 135 senses various situations of the autonomous driving vehicle 100. To this end, the vehicle state sensing unit 135 may include, for example, a collision sensor, wheel sensor, speed sensor, gradient sensor, weight sensor, heading sensor, yaw sensor, gyro sensor, position module, autonomous driving vehicle forward/reverse sensor, battery sensor, fuel sensor, tire sensor, steering sensor based on the rotation of the steering wheel, autonomous driving vehicle interior temperature sensor, interior humidity sensor, and illuminance sensor.

As such, the vehicle state sensing unit 135 may acquire sensing signals with regard to, for example, autonomous driving vehicle collision information, autonomous driving vehicle direction information, autonomous driving vehicle location information (GPS information), autonomous driving vehicle angle information, autonomous driving vehicle speed information, autonomous driving vehicle acceleration information, autonomous driving vehicle tilt information, autonomous driving vehicle forward/reverse information, battery information, fuel information, tire information, autonomous driving vehicle lamp information, autonomous driving vehicle interior temperature information, autonomous driving vehicle interior humidity information, steering wheel rotation angle information, and autonomous driving vehicle exterior illuminance.

The vehicle state sensing unit 135 may further include, for example, an accelerator pedal sensor, pressure sensor, engine speed sensor, Air Flow-rate Sensor (AFS), Air Temperature Sensor (ATS), Water Temperature Sensor (WTS), Throttle Position Sensor (TPS), Top Dead Center (TDC) sensor, and Crank Angle Sensor (CAS).

The output unit 140 is configured to output information processed in the controller 170. The output unit 140 may include a display unit 141, a sound output unit 142, and a haptic output unit 143.

The output unit 140 may output information processed in the controller 170. For example, the output unit 140 may output autonomous driving state information or manual driving state information. For example, the output unit 140 may display information regarding the linkage between the steering wheel 401 and the directional vehicle wheels 10L and 10R.

The display unit 141 may display information processed in the controller 170. For example, the display unit 141 may display vehicle-associated information. Here, the vehicle-associated information may include vehicle control information for the direct control of the vehicle or driver assistance information to guide the driver's vehicle driving. In addition, the vehicle-associated information may include vehicle state information that indicates the current state of the vehicle or vehicle traveling information regarding the traveling of the vehicle.

The display unit 141 may include at least one selected from among a Liquid Crystal Display (LCD), a Thin Film Transistor LCD (TFT LCD), an Organic Light Emitting Diode (OLED), a flexible display, a 3D display, and an e-ink display.

The display unit 141 may configure an inter-layer structure with a touch sensor, or may be integrally formed with the touch sensor to implement a touchscreen. The touchscreen may function as the user input unit 124 which provides an input interface between the autonomous driving vehicle 100 and the user, and may provide an output interface between the autonomous driving vehicle 100 and the user. In this instance, the display unit 141 may include a touch sensor which senses a touch to the display unit 141 so as to receive a control command in a touch manner. When a touch is input to the display unit 141 as described above, the touch sensor may sense the touch and the controller 170 may generate a control command corresponding to the touch. Content input in a touch manner may be characters or numbers, or may be, for example, instructions in various modes or menu items that may be designated.

The display unit 141 may include a cluster to allow the driver to check vehicle state information or vehicle traveling information while driving the vehicle. The cluster may be located on a dashboard. In this instance, the driver may check information displayed on the cluster while looking forward.

In some embodiments, the display unit 141 may be implemented as a Head Up display (HUD). When the display unit 141 is implemented as a HUD, information may be output via a transparent display provided at the windshield. Alternatively, the display unit 141 may include a projector module to output information via an image projected to the windshield.

In some embodiments, the display unit 141 may include a transparent display. In this instance, the transparent display may be attached to the windshield.

The transparent display may have prescribed transparency and may display a prescribed screen. The transparent display may include at least one of a transparent Thin Film Electroluminescent (TFEL), a transparent Organic Light-Emitting Diode (OLED), a transparent Liquid Crystal Display (LCD), a transmissive transparent display, and a transparent Light-Emitting Diode (LED) display. The transparency of the transparent display may be adjusted.

The sound output unit 142 is configured to convert electrical signals from the controller 170 into audio signals and to output the audio signals. To this end, the sound output unit 142 may include, for example, a speaker. The sound output unit 142 may output sound corresponding to the operation of the user input unit 124.

The haptic output unit 143 is configured to generate tactile output. For example, the haptic output unit 143 may operate to vibrate a steering wheel, a safety belt, or a seat so as to allow the user to recognize an output thereof.

The vehicle drive unit 150 may control the operation of various devices of the autonomous driving vehicle 100.

Referring to FIG. 5, the vehicle drive unit 150 may include a power source drive unit 151, a steering drive unit 152, a brake drive unit 153, a lamp drive unit 154, an air conditioner drive unit 155, a window drive unit 156, an airbag drive unit 157, a sunroof drive unit 158, and a suspension drive unit 159.

The power source drive unit 151 may perform electronic control for a power source inside the autonomous driving vehicle 100.

For example, in the case where a fossil fuel based engine is a power source, the power source drive unit 151 may perform electronic control for the engine. As such, the power source drive unit 151 may control, for example, an output torque of the engine. In the case where the power source drive unit 151 is the engine, the power source drive unit 151 may control the speed of the vehicle by limiting the output torque of the engine under the control of the controller 170.

In another example, in the case where an electric motor is a power source, the power source drive unit 151 may perform control for the motor. As such, the power source drive unit 151 may control, for example, the RPM and torque of the motor.

The steering drive unit 152 may perform electronic control for a steering apparatus inside the autonomous driving vehicle 100. As such, the steering drive unit 152 may change the heading direction of the vehicle.

The brake drive unit 153 may perform electronic control of a brake apparatus inside the autonomous driving vehicle 100. For example, the brake drive unit 153 may reduce the speed of the autonomous driving vehicle 100 by controlling the operation of brakes located at wheels. In another example, the brake drive unit 153 may adjust the heading direction of the autonomous driving vehicle 100 to the left or to the right by differentiating the operation of respective brakes located at left and right wheels.

The lamp drive unit 154 may control the turn-on/turn-off of lamps arranged inside and outside the vehicle. In addition, the lamp drive unit 154 may control, for example, the intensity and direction of light of each lamp. For example, the lamp drive unit 154 may perform control for a turn signal lamp or a brake lamp.

The air conditioner drive unit 155 may perform the electronic control of an air conditioner inside the autonomous driving vehicle 100. For example, when the interior temperature of the vehicle is high, the air conditioner drive unit 155 may operate the air conditioner to supply cold air to the interior of the vehicle.

The window drive unit 156 may perform the electronic control of a window apparatus inside the autonomous driving vehicle 100. For example, the window drive unit 156 may control the opening or closing of left and right windows of the vehicle.

The airbag drive unit 157 may perform the electronic control of an airbag apparatus inside the autonomous driving vehicle 100. For example, the airbag drive unit 157 may control an airbag to be deployed in a dangerous situation.

The sunroof drive unit 158 may perform the electronic control of a sunroof apparatus inside the autonomous driving vehicle 100. For example, the sunroof drive unit 158 may control the opening or closing of a sunroof.

The suspension drive unit 159 may perform the electronic control of a suspension apparatus inside the autonomous driving vehicle 100. For example, in the case where the road surface is uneven, the suspension drive unit 159 may control the suspension apparatus to reduce vibration of the autonomous driving vehicle 100.

Referring again to FIG. 4A, the memory 160 is electrically connected to the controller 170. The memory 160 may store basic data for each unit, control data for the operation control of the unit, and input/output data. The memory 160 may be any of various storage devices such as, for example, a ROM, a RAM, an EPROM, a flash drive, and a hard drive. The memory 160 may store various data for the overall operation of the autonomous driving vehicle 100 such as, for example, programs for the processing or control of the controller 170.

The navigation device 300 may provide the autonomous driving vehicle 100 with routes. The navigation device 300 may receive a destination input. The navigation device 300 may provide a route to a received destination.

The navigation device 300 may include an input unit 320, an output unit 340, a memory 360, and a processor 370.

The input unit 320 may receive a destination or driving mode input from the user. The input unit 320 may include, for example, a button, touch sensor, microphone, gesture sensor, or camera, which serves to receive a user input.

The output unit 340 may output a route or driving-associated information to the user. The output unit 320 may include a display unit or a sound output unit.

The memory 360 may store various kinds of data for the overall operation of the navigation device 300 such as, for example, programs for the processing or control of the processor 370. In addition, the memory 360 may store map data. The map data stored in the memory 360 may be updated via communication with external devices 31, 32, and 33. At this time, the communication with the external devices 31, 32 and 33 may be performed via the communication unit 110 of the autonomous driving vehicle 100. Alternatively, the navigation device 300 may include a separate communication module.

The processor 370 may control the overall operation of each unit inside the navigation device 300. The processor 370 may match the destination with a map and set a route to the destination. The processor 370 may select a route suitable for a received driving mode from among a plurality of routes.

For example, when a safe driving mode is selected via the input unit 320, the processor 370 may select the driving route having the lowest number of traffic lights and crossroads.

The controller 170 may control the overall operation of each unit inside the autonomous driving vehicle 100. The controller 170 may be referred to as an Electronic Control Unit (ECU).

The controller 170 may control the linkage between the steering wheel 401 and the directional vehicle wheels 10R and 10L.

The controller 170 may control the vehicle drive unit 150 based on information or data received via the communication unit 110, the input unit 120, the sensing unit 130 or the navigation device 300.

In the autonomous driving state, the controller 170 may control the vehicle 100 to drive without receiving user input via the input unit 120, more particularly, the driving operation unit 200. The controller 170 may control the vehicle 100 to drive based on information or data received via the communication unit 110, the sensing unit 130, and the navigation device 300.

In the manual driving state, the controller 170 may control the vehicle 100 to drive in response to user input received via the input unit 120, more particularly, the driving operation unit 200. In some embodiments, the controller 170 may control the vehicle 100 so as to temporarily perform autonomous driving based on data or information received from the communication unit 110 or the sensing unit 130.

The controller 170 may control the output unit 140 so as to output data or information received via the communication unit 110 or the input unit 120. The controller 170 may control the output unit 140 so as to output information or data stored in the memory 160. The controller 170 may allow the received information or data to be directly output, or to be processed and then output. The controller 170 may control the display unit 141 so as to visually output information or data. The controller 170 may control the sound output unit 142 so as to audibly output information or data.

The controller 170 may receive sensed information from the first position sensor 412 and the second position sensor 422.

The controller 170 may transmit control signals to the first actuator 403, the second actuator 413, and the third actuator 423.

The controller 170 may control the mechanical linkage or electrical linkage between the steering wheel 401 and the directional vehicle wheels 10L and 10R so as to be cut off based on whether the autonomous driving vehicle 100 is in the autonomous driving state or in the manual driving state.

The controller 170 may control the mechanical linkage or electrical linkage between the steering wheel 401 and the directional vehicle wheels 10L and 10R so as to be cut off when the autonomous driving vehicle 100 is in the autonomous driving state.

In the autonomous driving state, the controller 170 may cut off the linkage between the steering wheel 401 and the directional vehicle wheels 10L and 10R, thereby preventing the steering wheel 401 from being rotated when the direction of the wheels is changed.

In this instance, it is possible to prevent the user from feeling a sense of disconnectedness and inconvenience caused when the steering wheel 401 is rotated in the autonomous driving state.

The controller 170 may control the autonomous driving vehicle 100 so as to begin an operation to prepare for autonomous driving when a prescribed event occurs in the manual driving state.

For example, the event may be user input for switching from the manual driving state to the autonomous driving state. Here, the user input may be received via the sound input unit 123 or the user input unit 124. In this instance, the switching from the manual driving state to the autonomous driving state may be performed based on the user's will.

For example, the event may be the occurrence of an accident, or the prediction of an accident. When an accident occurs or is predicted, switching to autonomous driving may be performed to assist the user in responding to a difficult driving situation.

The controller 170 may control the output unit 140 so as to output information indicating that switching from the manual driving state to the autonomous driving state will occur when the operation to prepare for autonomous driving begins. As the autonomous driving switching information is output, it is possible to assist the user in recognizing the current state of the autonomous driving vehicle 100.

When the operation to prepare for autonomous driving begins, the controller 170 may control the mechanical linkage or electrical linkage between the steering wheel 401 and the directional vehicle wheels 10L and 10R so as to be cut off.

When the operation to prepare for autonomous driving begins in the state in which the steering wheel 401 has been rotated, the controller 170 may control the mechanical linkage or electrical linkage between the steering wheel 401 and the directional vehicle wheels 10L and 10R so as to be cut off while maintaining the steering wheel 401 in the rotated state.

In addition, after the mechanical linkage or electrical linkage is cut off, the controller 170 may control the steering wheel 401 so as to return to the original state from the rotated state. Here, the original state of the steering wheel 401 may mean the state before the steering wheel 401 is rotated. For example, the original state of the steering wheel 401 may be the state of the steering wheel 401 in the manual driving state when the autonomous driving vehicle 100 drives straight.

For example, when user input for switching to autonomous driving is received in the state in which the steering wheel 401 has been rotated by user operation while the autonomous driving vehicle 100 is in the manual driving state, the controller 170 may control the mechanical linkage or electrical linkage between the steering wheel 401 and the directional vehicle wheels 10L and 10R so as to be cut off while maintaining the steering wheel 401 in the rotated state. In this way, the autonomous driving vehicle 100 may switch to the autonomous driving state even in the situation in which the vehicle 100 drives along a curved road as well as the situation in which the vehicle 100 drives straight.

When it is sensed that the steering wheel 401 is being gripped while the autonomous driving vehicle 100 is in the autonomous driving state, the controller 170 may control the steering wheel 401 and the directional vehicle wheels 10L and 10R so as to be mechanically or electrically linked to each other. Thereafter, the controller 170 may control the autonomous driving vehicle 100 so as to switch from the autonomous driving state to the manual driving state. A sensor capable of sensing whether the user is gripping the steering wheel 401 may be located in the region of the steering wheel 401. For example, the sensor for sensing the grip of the steering wheel 401 by the user may be a touch sensor or a pressure sensor. The grip sensor may sense the grip pressure of the steering wheel 401.

When it is sensed that the steering wheel 401 is being gripped in the state in which the steering wheel 401 is not engaged with the directional vehicle wheels 10L and 10R while the autonomous driving vehicle 100 is in the autonomous driving state, the controller 170 may control the autonomous driving vehicle 100 so as to switch to the manual driving state. In addition, In this instance, the controller 170 may control the steering wheel 401 and the directional vehicle wheels 10L and 10R so as to be mechanically or electrically linked to each other while maintaining the steering wheel 401 and the directional vehicle wheels 10L and 10R in the unengaged state. As such, as the autonomous driving vehicle 100 switches to the manual driving state when it is sensed that the steering wheel 401 is being gripped in the state in which the steering wheel 401 and the directional vehicle wheels 10L and 10R are not engaged with each other, the user can directly steer the autonomous driving vehicle 100 in order to deal with an emergency situation.

When it is sensed that the user releases the grip of the steering wheel 401 in the state in which the autonomous driving vehicle 100 has switched to the manual driving state based on the result of sensing that the steering wheel 401 is being gripped, the controller 170 may control the autonomous driving vehicle 100 so as to again switch to the autonomous driving state. As such, in the case where switching to the autonomous driving state is required as an emergency situation passes, this switching may be easily performed as the user simply releases the grip of the steering wheel 401.

When switched again to the autonomous driving state, the controller 170 may control the steering wheel 401 so as to return to the original state. Here, the original state of the steering wheel 401 may mean the state before the steering wheel 401 is rotated. For example, the original state of the steering wheel 401 may be the state of the steering wheel 401 when the autonomous driving vehicle 100 drives straight.

In some embodiments, after the autonomous driving vehicle 100 has switched to the manual driving state as it is sensed that the steering wheel 401 is being gripped, the controller 170 may begin an operation to prepare for autonomous driving in response to user input for switching to the autonomous driving state in the state in which it is sensed that the user releases the grip of the steering wheel 401. In the preparation operation, the controller 170 may release the linkage between the steering wheel 401 and the directional vehicle wheels 10L and 10R.

When the controller 170 receives user input for lane change while the autonomous driving vehicle 100 is in the autonomous driving state, the controller 170 may control the autonomous driving vehicle 100 so as to temporarily switch to the manual driving state. Here, the user input for lane change may be a manual turn signal input.

For example, when lane change is required as a prescribed situation occurs during autonomous driving, the user may input a turn signal. At this time, the controller 170 may temporarily switch the autonomous driving vehicle 100 from the autonomous driving state to the manual driving state upon receiving the turn signal input. Thereby, the user can temporarily manually drive the vehicle. In this instance, the controller 170 may maintain the manual driving state for a predetermined time after switching from the autonomous driving state to the manual driving state. After the predetermined time has passed, the controller 170 may again switch the autonomous driving vehicle 100 to the autonomous driving state.

While the autonomous driving vehicle 100 is in the manual driving state, the controller 170 may control the steering wheel 401 and the directional vehicle wheels 10L and 10R so as to be mechanically or electrically linked to each other.

In the manual driving state, the controller 170 may link the steering wheel 401 and the directional vehicle wheels 10L and 10R to each other so as to change the direction of the directional vehicle wheels 10L and 10R in response to the rotation of the steering wheel 401.

When a prescribed event occurs while the autonomous driving vehicle 100 is in the autonomous driving state, the controller 170 may perform control to begin an operation to prepare for manual driving.

For example, the event may be user input for switching from the autonomous driving state to the manual driving state. Here, the user input may be received via the sound input unit 123 or the user input unit 124.

For example, the event may be an input corresponding to the rotation of the steering wheel 401 received in the autonomous driving state. Assuming that the rotation of the steering wheel 401 a predetermined number of times or more is input in the autonomous driving state, the controller 170 may control the autonomous driving vehicle 100 so as to switch to the manual driving state.

When the operation to prepare for manual driving begins, the controller 170 may control the output unit 140 so as to output information indicating switching from the autonomous driving state to the manual driving state. As such, outputting the information indicating switching to manual driving may assist the user in recognizing the current state of the autonomous driving vehicle 100.

When the operation to prepare for manual driving begins, the controller 170 may control the steering wheel 401 and the directional vehicle wheels 10L and 10R so as to be mechanically or electrically linked to each other.

When the operation to prepare for manual driving begins, the controller 170 may control the steering wheel 401 and the directional vehicle wheels 10L and 10R so as to be mechanically or electrically linked to each other and engaged with each other.

For example, when the autonomous driving vehicle 100 drives straight, the controller 170 may control the steering wheel 401 and the directional vehicle wheels 10L and 10R so as to be mechanically or electrically linked to each other in the state in which the vertical reference center axis of the steering wheel 401 is oriented in the twelve o'clock and six o'clock direction.

The controller 170 may control the steering wheel 401 and the directional vehicle wheels 10L and 10R so as to be engaged with each other by rotating the steering wheel 401 so as to correspond to the direction of the directional vehicle wheels 10R and 10L. In this instance, the controller 170 may adjust the rotational speed of the steering wheel 401 based on whether it is sensed that the steering wheel 401 is being gripped.

For example, when the autonomous driving vehicle 100 drives along the curved road, the controller 170 may control the steering wheel 401 and the directional vehicle wheels 10L and 10R so as to be mechanically or electrically linked to each other by rotating the steering wheel 401 by an angle corresponding to the direction of the directional vehicle wheels 10R and 10L.

In this instance, when it is sensed that the steering wheel 401 is being gripped by the user, the controller 170 may rotate the steering wheel 401 more slowly than that when it is not sensed that the steering wheel 401 is being gripped. This is because the user may create a dangerous situation when the user rapidly rotates the steering wheel 401 while gripping the steering wheel 401.

The controller 170 may adjust the rotational speed of the steering wheel 401 based on the sensed grip pressure. Specifically, the controller 170 may adjust the rotational speed of the steering wheel 401 in proportion to the sensed grip pressure. When the user strongly grips the steering wheel 401, the controller 170 may rotate the steering wheel 401 more slowly than that when the user weakly grips the steering wheel 401.

The controller 170 may control the output unit 140 so as to output information indicating the engagement state of the steering wheel 401 and the directional vehicle wheels 10R and 10L.

For example, the controller 170 may control the output unit 140 so as to output information indicating whether the engagement of the steering wheel 401 and the directional vehicle wheels 10L and 10R is completed. In this instance, the user may grip the steering wheel 401 for manual driving after checking whether the engagement is completed.

For example, the controller 170 may control the output unit 140 so as to output the time taken until the steering wheel 401 and the directional vehicle wheels 10R and 10L are engaged with each other.

For example, the controller 170 may control the display unit 141 so as to display an image corresponding to the steering wheel 401 and an image corresponding to the directional vehicle wheels 10L and 10R, and the respective images may be an animation for displaying engagement state information. The controller 170 may display the rotating angle of the steering wheel 401 and the directional angle of the directional vehicle wheels 10L and 10R via the respective images. In addition, the controller 170 may display the rotational movement of the steering wheel 401 or the directional vehicle wheels 10L and 10R via the respective images.

The controller 170 may control the autonomous driving vehicle 100 so as to switch to the manual driving state in the state in which the steering wheel 401 and the directional vehicle wheels 10L and 10R are mechanically or electrically linked to each other.

When the extent of direction change of the directional vehicle wheels per unit time is a reference value or more while the autonomous driving vehicle 100 is in the manual driving state, the controller 170 may control the mechanical linkage or electrical linkage between the steering wheel 401 and the directional vehicle wheels 10L and 10R so as to be cut off. As such, when the direction of the wheels is rapidly changed automatically as an emergency situation is sensed in the manual driving state, the linkage between the steering wheel 401 and the directional vehicle wheels 10L and 10R may be cut off, which may alleviate the shock that would otherwise be applied to the user by the rapid rotation of the steering wheel 401.

The controller 170 may control the mechanical linkage or electrical linkage between the steering wheel 401 and the directional vehicle wheels 10L and 10R so as to be cut off when the rotation degree of the steering wheel 401 per unit time is a reference value or more while the autonomous driving vehicle 100 is in the manual driving state. As such, even if the user rapidly rotates the steering wheel 401 in a panic in an emergency situation in the manual driving state, the controller 170 may cut off the linkage between the steering wheel 401 and the directional vehicle wheels 10L and 10R, which may reduce the probability of an accident.

The controller 170 may be implemented in a hardware manner using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for the implementation of other functions.

The interface unit 180 may serve as a passage with various kinds of external appliances that are connected to the autonomous driving vehicle 100. For example, the interface unit 180 may have a port that is connectable to the mobile terminal 31 and may be connected to the mobile terminal 31 via the port. In this instance, the interface unit 180 may exchange data with the mobile terminal 31.

The interface unit 180 may serve as a passage for supplying electrical energy to the connected mobile terminal 31. When the mobile terminal 31 is electrically connected to the interface unit 180, the interface unit 180 may supply electric power from the power supply unit 190 to the mobile terminal 31 under the control of the controller 170.

The power supply unit 190 may supply power required for the operation of the respective components under the control of the controller 170. In particular, the power supply unit 190 may receive power from, for example, a battery inside the autonomous driving vehicle 100.

Figure 6:
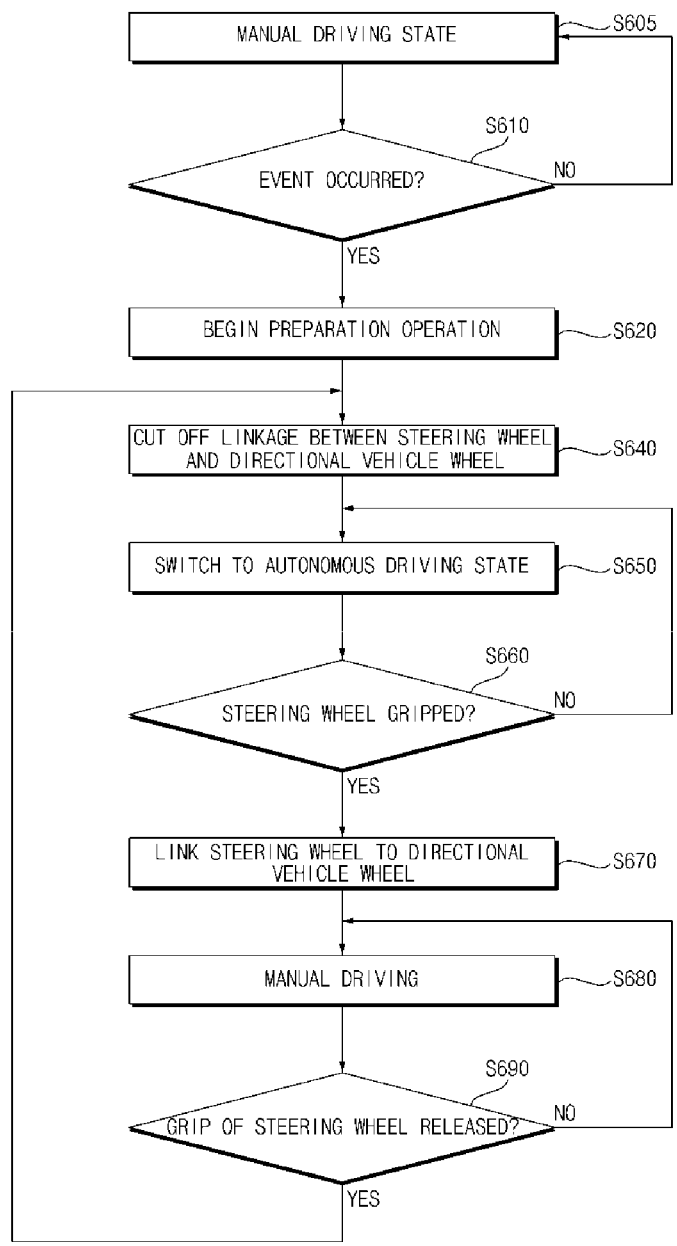
FIG. 6 is a flowchart referenced to describe the operation of the autonomous driving vehicle according to an embodiment of the present invention.

FIG. 6 is a flowchart referenced to describe the operation of the autonomous driving vehicle according to an embodiment of the present invention;

Referring to FIG. 6, when a prescribed event occurs while the autonomous driving vehicle 100 is in the manual driving state (S605 and S610), the controller 170 may begin an operation to prepare for autonomous driving (S620).

Here, the event may be user input for switching from the manual driving state to the autonomous driving state. The user input may be received via the sound input unit 123 or the user input unit 124. In this instance, the autonomous driving vehicle 100 may switch from the manual driving state to the autonomous driving state based on the user's will.

Alternatively, the event may be the occurrence of an accident, or the prediction of an accident. When an accident occurs or is predicted, switching to the autonomous driving may assist the user in responding to a driving impossible situation.

In some embodiments, when the operation to prepare for autonomous driving begins, the controller 170 may control the output unit 140 so as to output information indicating switching from the manual driving state to the autonomous driving state.

When the operation to prepare for autonomous driving begins, the controller 170 may cut off the mechanical linkage or electrical linkage between the steering wheel 401 and the directional vehicle wheels 10L and 10R (S640).

For example, when user input is received via the user input unit 124 in the state in which the preparation operation has begun, the controller 170 may cut off the mechanical linkage or electrical linkage between the steering wheel 401 and the directional vehicle wheels 10L and 10R.

When the preparation operation for autonomous driving has begun in the rotated state of the steering wheel 401, the controller 170 may control the mechanical linkage or electrical linkage between the steering wheel 401 and the directional vehicle wheels 10L and 10R so as to be cut off while maintaining the steering wheel 401 in the rotated state.

In addition, the controller 170 may control the steering wheel 401 to return to the original state thereof from the rotated state after the mechanical linkage or electrical linkage is cut off.

In some embodiments, when the linkage is cut off, the controller 170 may control the output unit 140 so as to output information indicating that the mechanical linkage or electrical linkage between the steering wheel 401 and the directional vehicle wheels 10L and 10R is cut off.

In the state in which the mechanical linkage or electrical linkage between the steering wheel 401 and the directional vehicle wheels 10L and 10R is cut off, the controller 170 may switch the autonomous driving vehicle 100 to the autonomous driving state (S650).

In this instance, the autonomous driving vehicle 100 may autonomously drive based on information regarding the destination set in the navigation device 300 and sensing information received from the sensing unit 130 under the control of the controller 170.

When it is sensed that the steering wheel 401 is being gripped in the autonomous driving state (S660), the controller 170 may control the steering wheel 401 and the directional vehicle wheels 10L and 10R so as to be mechanically or electrically linked to each other (S670). A sensor capable of sensing whether the steering wheel 401 is being gripped by the user may be located in the region of the steering wheel 401. For example, the sensor to sense whether the steering wheel 401 is being gripped by the user may be a touch sensor or a pressure sensor.

Thereafter, the controller 170 may control the autonomous driving vehicle 100 so as to switch from the autonomous driving state to the manual driving state (S680).

When it is sensed that the steering wheel 401 is being gripped in the state in which the steering wheel 401 and the directional vehicle wheels 10L and 10R are not engaged while the autonomous driving vehicle 100 is in the autonomous driving state, the controller 170 may switch the autonomous driving vehicle 100 to the manual driving state. In addition, In this instance, the controller 170 may control the steering wheel 401 and the directional vehicle wheels 10L and 10R so as to be mechanically or electrically linked to each other while maintaining the steering wheel 401 and the directional vehicle wheels 10L and 10R in the unengaged state.

When it is sensed that the user releases the grip of the steering wheel 401 after the autonomous driving vehicle 100 has switched to the manual driving state (S690), the controller 170 may return to the operation S640 so as to cut off the mechanical linkage or electrical linkage between the steering wheel 401 and the directional vehicle wheels 10R and 10L.

In some embodiments, when it is sensed that the user releases the grip of the steering wheel 401 in the state in which the autonomous driving vehicle 100 has switched to the manual driving state (S690), the controller 170 may return to the operation S610 so as to begin an operation to prepare for autonomous driving upon receiving user input for switching to the autonomous driving state.

Figure 7:
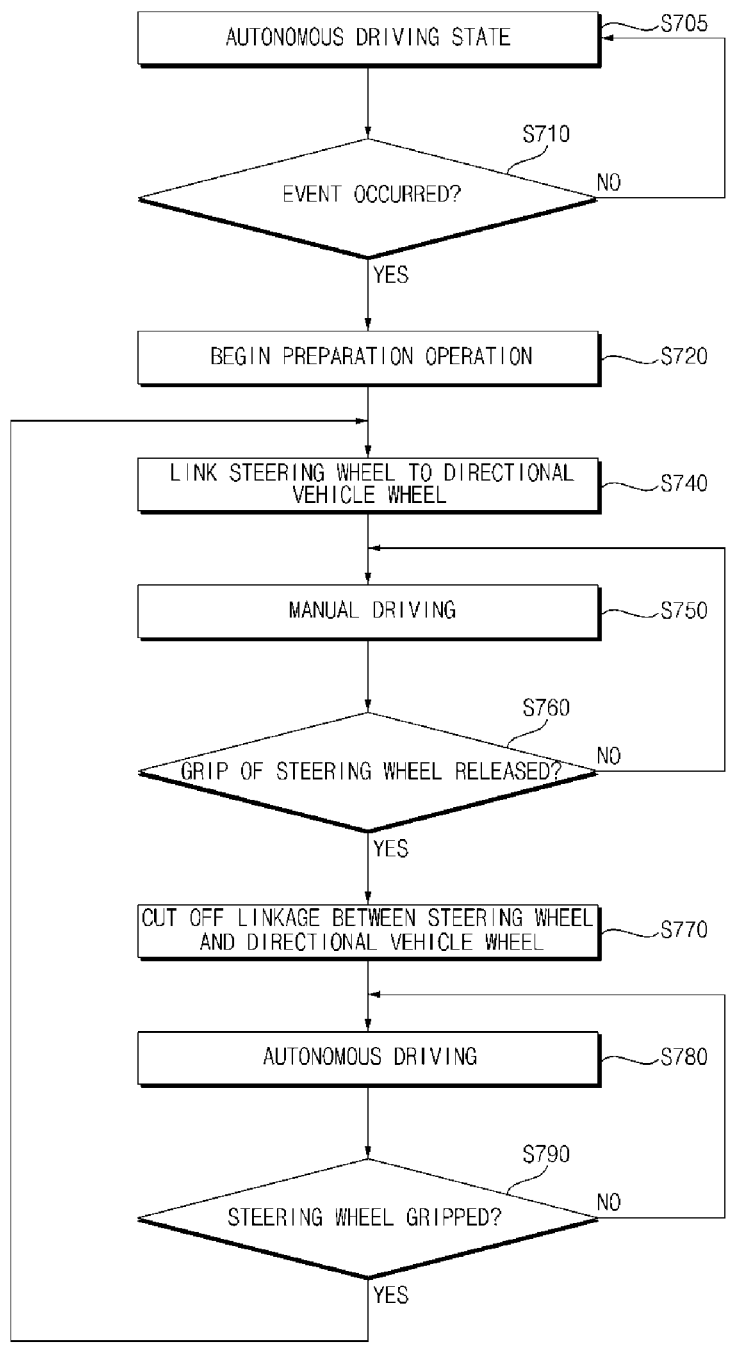
FIG. 7 is a flowchart referenced to describe the operation of the autonomous driving vehicle according to an embodiment of the present invention.

FIG. 7 is a flowchart referenced to describe the operation of the autonomous driving vehicle according to another embodiment of the present invention.

Referring to FIG. 7, when a prescribed event occurs while the autonomous driving vehicle 100 is in the autonomous driving state (S705 and S710), the controller 170 may begin an operation to prepare for manual driving (S720).

Here, the event may be a user input for switching from the autonomous driving state to the manual driving state. The user input may be received via the sound input unit 123 or the user input unit 124.

Alternatively, the event may be an input corresponding to the rotation of the steering wheel 401 received in the autonomous driving state. Assuming that the rotation of the steering wheel 401 a predetermined number of times or more is input in the autonomous driving state, the controller 170 may switch the autonomous driving vehicle 100 to the manual driving state.

In some embodiments, when the operation to prepare for manual driving begins, the controller 170 may control the output unit 140 so as to output information indicating switching from the autonomous driving state to the manual driving state.

When the operation to prepare for manual driving begins, the controller 170 may control the steering wheel 401 and the directional vehicle wheels 10L and 10R so as to be mechanically or electrically linked to each other (S740).

For example, when user input is received via the user input unit 124 in the state in which the preparation operation has begun, the controller 170 may control the steering wheel 401 and the directional vehicle wheels 10L and 10R so as to be mechanically or electrically linked to each other.

When the preparation operation for manual driving has begun, the controller 170 controls the steering wheel 401 and the directional vehicle wheels 10L and 10R so as to be mechanically or electrically linked to each other to enable engagement of the steering wheel 401 and the directional vehicle wheels 10L and 10R.

The controller 170 may control the output unit 140 so as to output information indicating the engagement state of the steering wheel 401 and the directional vehicle wheels 10L and 10R.

The controller 170 may control the autonomous driving vehicle 100 so as to switch to the manual driving state in the state in which the steering wheel 401 and the directional vehicle wheels 10L and 10R have been mechanically or electrically linked to each other (S750).

In this instance, the autonomous driving vehicle 100 may drive in response to the user input via the input unit 120.

When it is sensed that the user releases the grip of the steering wheel 401 for a predetermined time or more in the manual driving state (S760), the controller 170 may cut off the mechanical linkage or electrical linkage between the steering wheel 401 and the directional vehicle wheels 10L and 10R (S770). A sensor capable of sensing whether the steering wheel 401 is being gripped by the user may be located in the region of the steering wheel 401. For example, the sensor to sense the grip of the steering wheel 401 by the user may be a touch sensor or a pressure sensor.

Thereafter, the controller 170 may control the autonomous driving vehicle 100 so as to switch from the manual driving state to the autonomous driving state (S780).

When it is sensed that the steering wheel 401 is being gripped in the state in which the autonomous driving vehicle 100 has switched to the autonomous driving state (S790), the controller 170 may return to the operation S740, so as to control the steering wheel 401 and the directional vehicle wheels 10L and 10R to be mechanically or electrically linked to each other.

In some embodiments, when it is sensed that the steering wheel 401 is being gripped in the state in which the autonomous driving vehicle 100 has switched to the autonomous driving state (S790), the controller 170 may return to the operation S710, so as to begin an operation to prepare for manual driving when user input for switching to the manual driving is received.

Figure 8A:
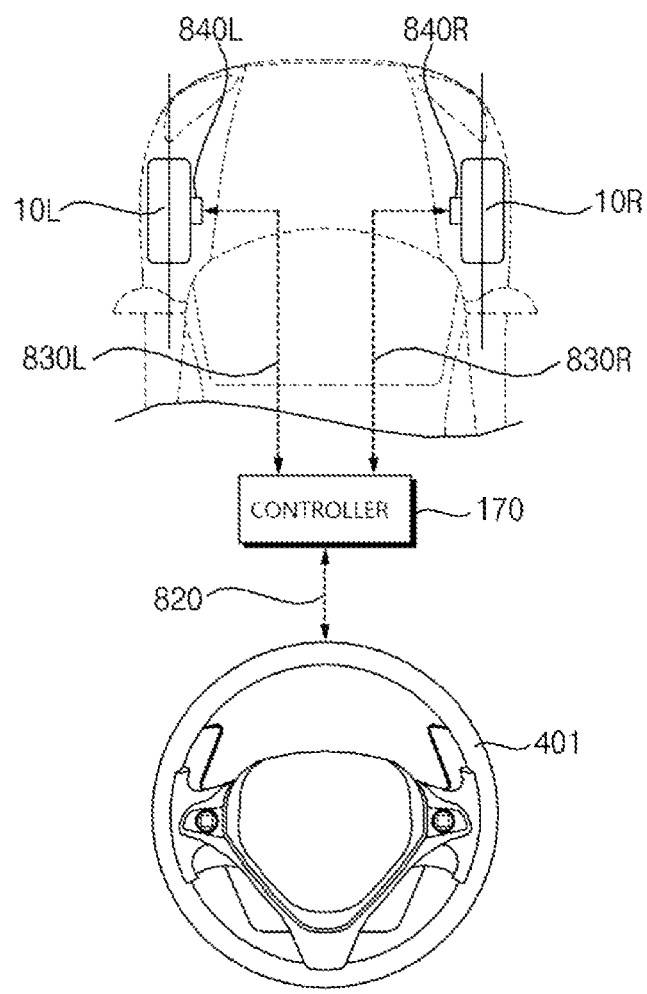
FIGS. 8A and 8B are views referenced to describe the linkage and linkage-cutoff between a steering wheel and directional vehicle wheels according to an embodiment of the present invention.
Figure 8B:
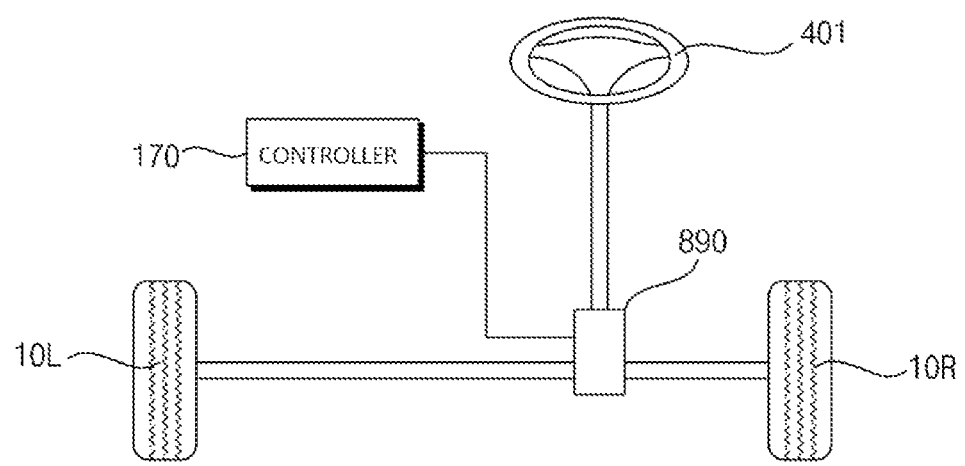

FIGS. 8A and 8B are views referenced to describe the linkage between the steering wheel 401 and the directional vehicle wheels 10L and 10R and the cutoff of linkage according to an embodiment of the present invention.

FIG. 8A illustrates the electrical linkage and linkage-cutoff between the steering wheel 401 and the directional vehicle wheels 10L and 10R, and FIG. 8B illustrates the mechanical linkage and linkage-cutoff between the steering wheel 401 and the directional vehicle wheels 10L and 10R.

Referring to FIG. 8A, the steering wheel 401 may be electrically linked to the directional vehicle wheels 10L and 10R.

The controller 170 may receive rotation information of the steering wheel 401 from the rotation sensing unit (402 of FIG. 4B). Here, the rotation information may include whether the steering wheel 401 is rotated, and the rotational direction, the rotational displacement and the rotational speed of the steering wheel 401.

The controller 170 may provide steering actuators 840L and 840R, which provide power to the directional vehicle wheels 10L and 10R, with electrical control signals 830L and 830R. The controller 170 may control the steering actuators 840L and 840R based on the rotation information.

For example, when the steering wheel 401 is rotated in the first direction, by the first angle, and at the first angular speed, the controller 170 may control the steering actuators 840L and 840R so as to change the direction of the directional vehicle wheels 10L and 10R to correspond to the first direction, the first angle, and the first angular speed.

The controller 170 may control the steering wheel 401 so as to be rotated to correspond to the change in the direction of the directional vehicle wheels 10L and 10R. The controller 170 may control the first actuator 403 so as to provide power to the steering wheel 401.

The electrical linkage between the steering wheel 401 and the directional vehicle wheels 10L and 10R may be cut off. In this instance, the controller 170 may control the steering actuators 840L and 840R regardless of the rotation information of the steering wheel 401.

Referring to FIG. 8B, the steering wheel 401 may be mechanically linked to the directional vehicle wheels 10L and 10R.

For example, the steering wheel 401 may be mechanically linked to the directional vehicle wheels 10L and 10R with, for example, a steering shaft, a steering gear box, a pitman arm, a drag link, a center link, a tie-rod, a knuckle arm, a steering knuckle, and a king pin interposed therebetween. Here, each unit located between the steering wheel 401 and the directional vehicle wheels 10L and 10R may be omitted or added in some embodiments.

The autonomous driving vehicle 100 may further include a clutch 890. Here, the clutch 890 may serve to control the transmission of power from the steering wheel 401 to the directional vehicle wheels 10L and 10R under the control of the controller 170.

The controller 170 may control the clutch 890 so as to mechanically link the steering wheel 401 to the directional vehicle wheels 10L and 10R. In this instance, the direction of the directional vehicle wheels 10L and 10R is changed based on the rotation of the steering wheel 401. For example, the direction of the directional vehicle wheels 10L and 10R is changed based on the rotational direction of the steering wheel 401. For example, the direction of the directional vehicle wheels 10L and 10R is changed in proportion to the rotational displacement of the steering wheel 401. For example, the direction of the directional vehicle wheels 10L and 10R is changed in proportion to the rotational speed of the steering wheel 401.

The controller 170 may control the clutch 890 so as to cut off the mechanical linkage between the steering wheel 401 and the directional vehicle wheels 10L and 10R.

In this instance, the direction of the directional vehicle wheels 10L and 10R is not changed even if the steering wheel 401 is rotated. In addition, the steering wheel 401 is not rotated even if the direction of the directional vehicle wheels 10L and 10R is changed.

The following description will be centered on the operation of the autonomous driving vehicle 100 with reference to the accompanying drawings in the state in which the steering wheel 401 and the directional vehicle wheels 10L and 10R are electrically linked to each other, or in the state in which the electrical linkage is cut off.

The operation of the autonomous driving vehicle 100 in the state in which the steering wheel 401 and the directional vehicle wheels 10L and 10R are mechanically linked to each other or in the state in which the mechanical linkage is cut off may be identical to that of the case in which the electrical linkage is implemented or the electrical linkage is cut off.

Figure 9A:
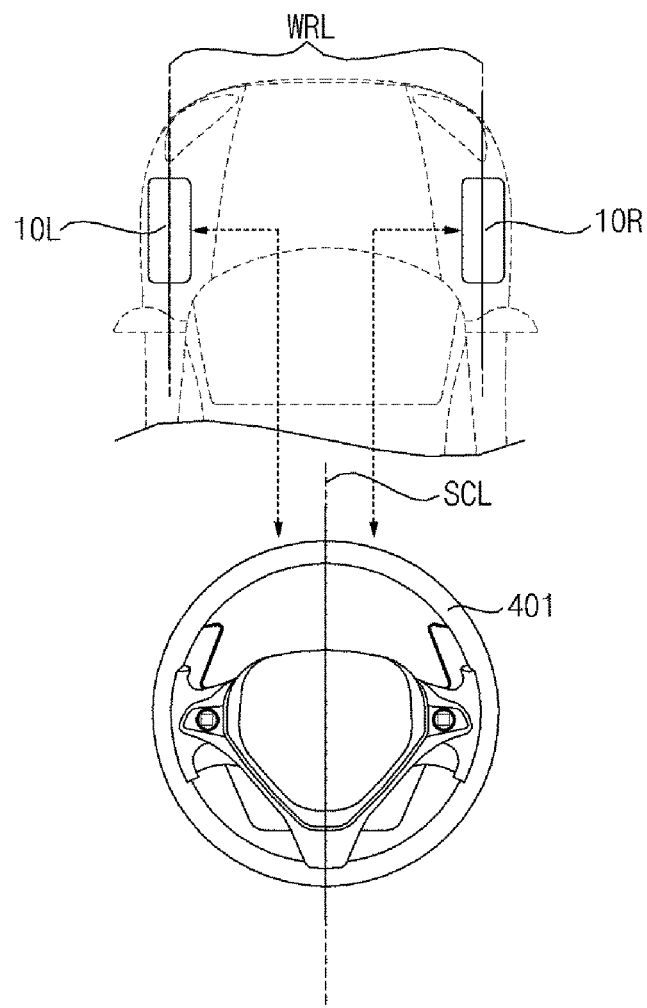
FIGS. 9A to 9C are views referenced to describe the operation of realizing the linkage between the steering wheel and the directional vehicle wheels according to an embodiment of the present invention.
Figure 9B:
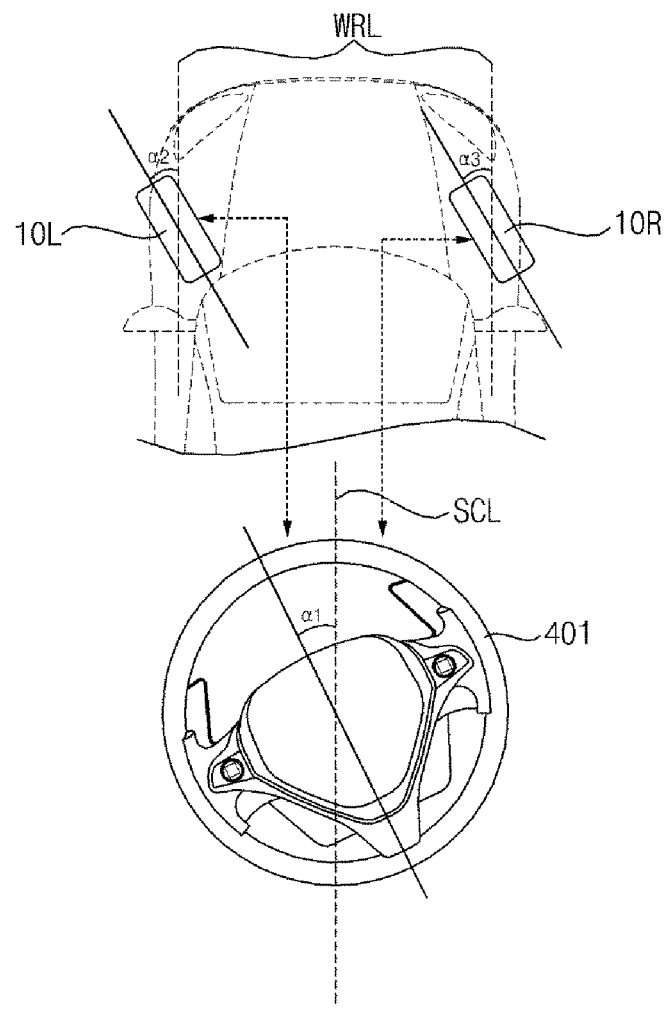
Figure 9C:
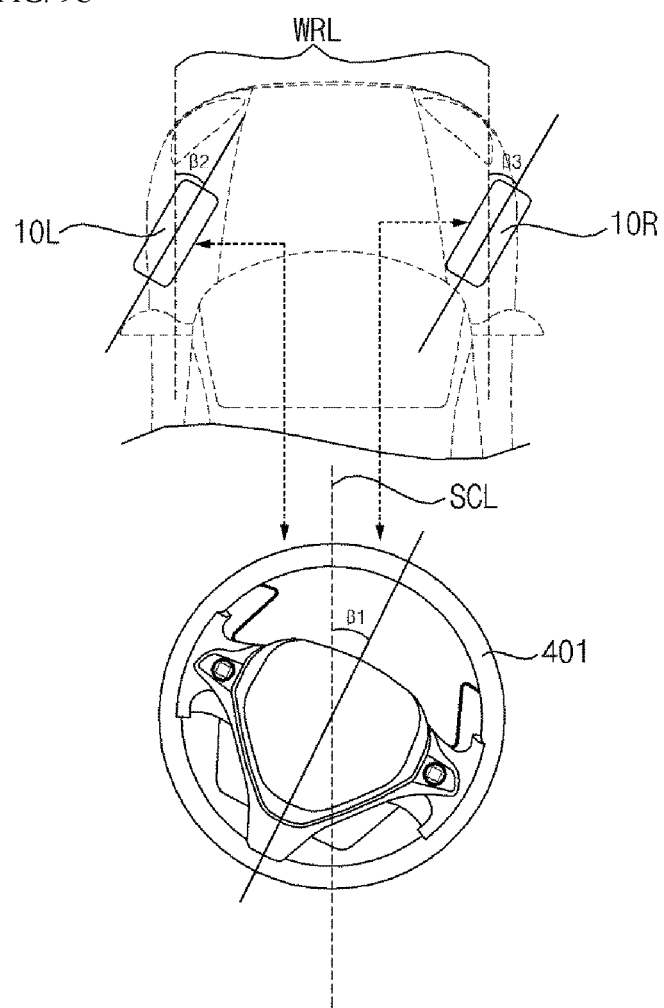

FIGS. 9A to 9C are views referenced to describe the operation when the steering wheel and the directional vehicle wheels are linked to each other according to an embodiment of the present invention.

FIG. 9A illustrates the case where the autonomous driving vehicle 100 drives straight in the state in which the steering wheel 401 and the directional vehicle wheels 10L and 10R are electrically linked to each other.

In this instance, the steering wheel 401 may maintain the original state. The original state of the steering wheel 401 may mean the state before the steering wheel 401 is rotated. The steering wheel 401 may not be rotated about the center line SCL which vertically penetrates the center of the steering wheel 401.

In this instance, the directional vehicle wheels 10L and 10R may face forward. The direction of the directional vehicle wheels 10L and 10R may not be changed in the left-and-right direction about the reference line WRL which faces the front of the autonomous driving vehicle 100. For example, the directional vehicle wheels 10L and 10R may not be rotated in the left-and-right direction about the reference line WRL which faces the front of the autonomous driving vehicle 100.

FIG. 9B illustrates the case where the autonomous driving vehicle 100 drives to the left direction in the state in which the steering wheel 401 and the directional vehicle wheels 10L and 10R are electrically linked to each other.

The controller 170 may control the directional vehicle wheels 101 and 10R so as to be changed in direction to correspond to the rotation of the steering wheel 401.

In this instance, the steering wheel 401 may be rotated to the left direction by an angle α1 about the center line SCL.

In this instance, the direction of the directional vehicle wheels 10L and 10R may be changed to the left direction by angles α2 and α3, respectively, about the reference line WRL. For example, the directional vehicle wheels 10L and 10R may be rotated to the left direction by angles α2 and α3, respectively, about the reference line WRL. In some embodiments, the angles α2 and α3 may be the same, or may be different.

Here, the angles α2 and α3 may be proportional to each other.

FIG. 9C illustrates the case where the autonomous driving vehicle 100 drives to the right direction in the state in which the steering wheel 401 and the directional vehicle wheels 10L and 10R are electrically linked to each other.

The controller 170 may control the direction of the directional vehicle wheels 10L and 10R so as to be changed to correspond to the rotation of the steering wheel 401.

In this instance, the steering wheel 401 may be rotated to the right direction by an angle β1 about the center line SCL.

In this instance, the direction of the directional vehicle wheels 10L and 10R may be changed to the right direction by angles β2 and β3, respectively, about the reference line WRL. For example, the directional vehicle wheels 10L and 10R may be rotated to the right direction by angles β2 and β3, respectively, about the reference line WRL. In some embodiments, the angles β2 and β3 may be the same, or may be different.

Here, the angles β2 and β3 may be proportional to each other.

FIGS. 10A to 11C are views referenced to describe the operation when the linkage between the steering wheel and the directional vehicle wheels is cut off according to an embodiment of the present invention.

Figure 10A:
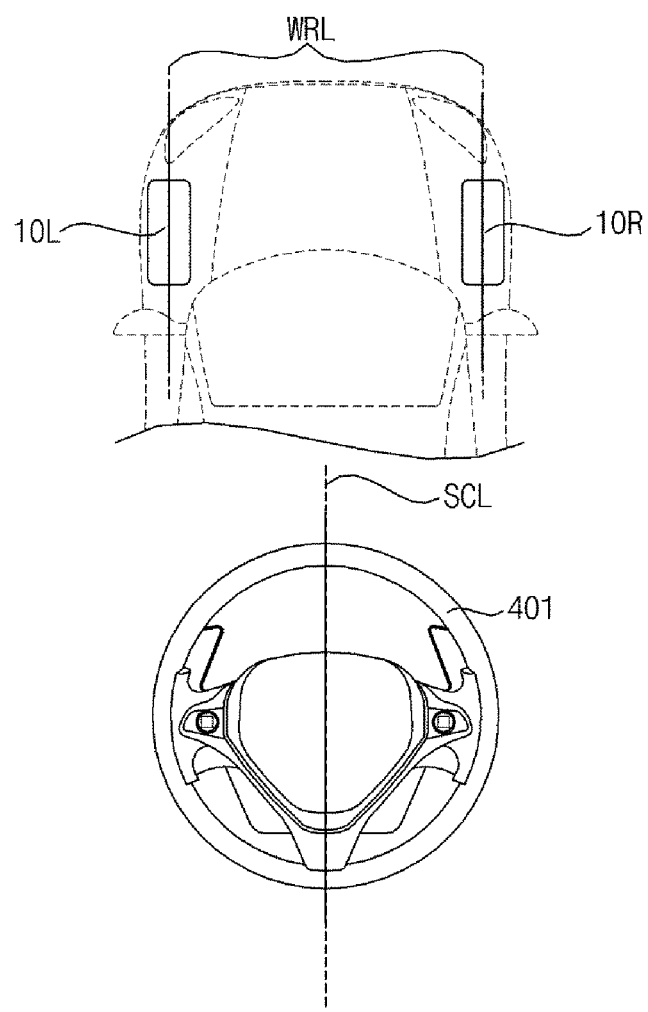
FIGS. 10A to 11C are views referenced to describe the operation of cutting off the linkage between the steering wheel and the directional vehicle wheels according to an embodiment of the present invention.

FIG. 10A illustrates the case where the autonomous driving vehicle 100 drives straight in the state in which the electrical linkage between the steering wheel 401 and the directional vehicle wheels 10L and 10R is cut off.

In this instance, the steering wheel 401 may maintain the original state. The original state of the steering wheel 401 may mean the state before the steering wheel 401 is rotated. The steering wheel 401 may not be rotated about the center line SCL which vertically penetrates the center of the steering wheel 401.

In this instance, the directional vehicle wheels 10L and 10R may face forward. The direction of the directional vehicle wheels 10L and 10R may not be changed in the left-and-right direction about the reference line WRL which faces the front of the autonomous driving vehicle 100. For example, the directional vehicle wheels 10L and 10R may not be rotated in the left-and-right direction about the reference line WRL which faces the front of the autonomous driving vehicle 100.

Figure 10B:
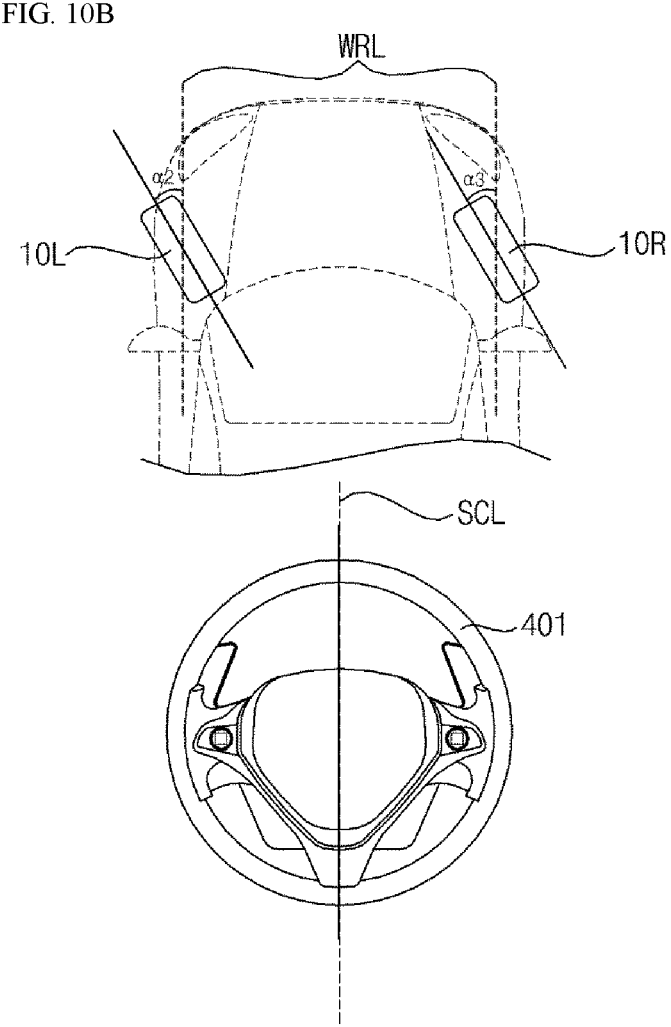

FIG. 10B illustrates the case where the autonomous driving vehicle 100 drives to the left direction in the state in which the electrical linkage between the steering wheel 401 and the directional vehicle wheels 10L and 10R is cut off.

The controller 170 may control the directional vehicle wheels 101 and 10R so as to be changed in direction regardless of the rotation of the steering wheel 401.

In this instance, the steering wheel 401 may maintain the original state. The original state of the steering wheel 401 may mean the state before the steering wheel 401 is rotated. The steering wheel 401 may not be rotated about the center line SCL which vertically penetrates the center of the steering wheel 401.

In this instance, the direction of the directional vehicle wheels 10L and 10R may be changed to the left direction by angles α2 and α3, respectively, about the reference line WRL. For example, the directional vehicle wheels 10L and 10R may be rotated to the left direction by angles α2 and α3, respectively, about the reference line WRL. In some embodiments, the angles α2 and α3 may be the same, or may be different.

Figure 10C:
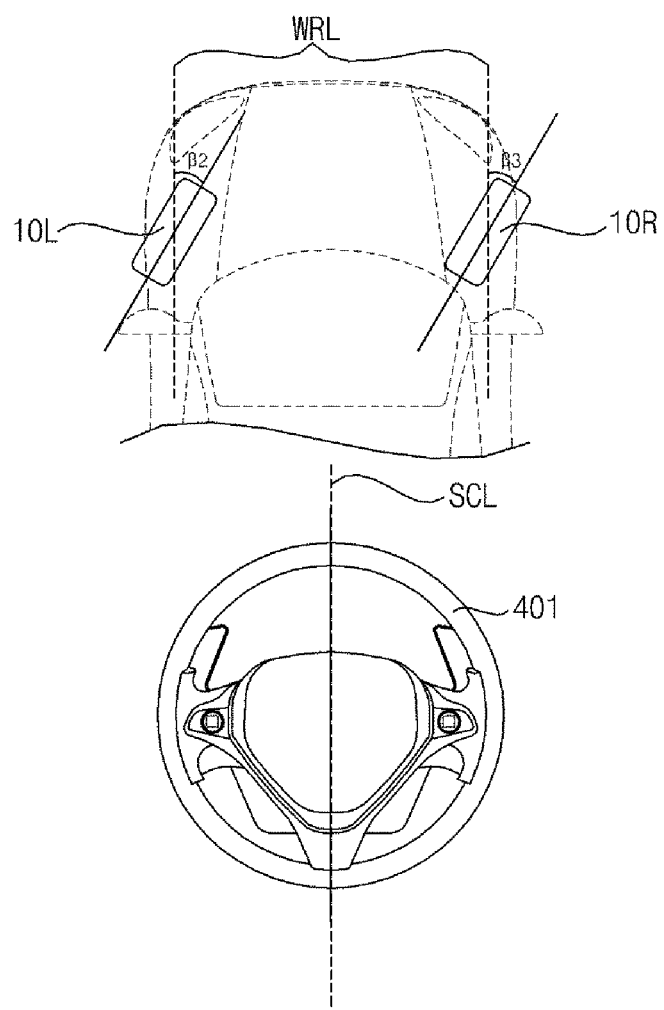

FIG. 10C illustrates the case where the autonomous driving vehicle 100 drives to the right direction in the state in which the electrical linkage between the steering wheel 401 and the directional vehicle wheels 10L and 10R is cut off.

The controller 170 may control the direction of the directional vehicle wheels 101 and 10R so as to be changed regardless of the rotation of the steering wheel 401.

In this instance, the steering wheel 401 may maintain the original state. The original state of the steering wheel 401 may mean the state before the steering wheel 401 is rotated. The steering wheel 401 may not be rotated about the center line SCL which vertically penetrates the center of the steering wheel 401.

In this instance, the direction of the directional vehicle wheels 10L and 10R may be changed to the right direction by angles β2 and β3, respectively, about the reference line WRL. For example, the directional vehicle wheels 10L and 10R may be rotated to the right direction by angles β2 and β3, respectively, about the reference line WRL. In some embodiments, the angles β2 and β3 may be the same, or may be different.

Figure 11A:
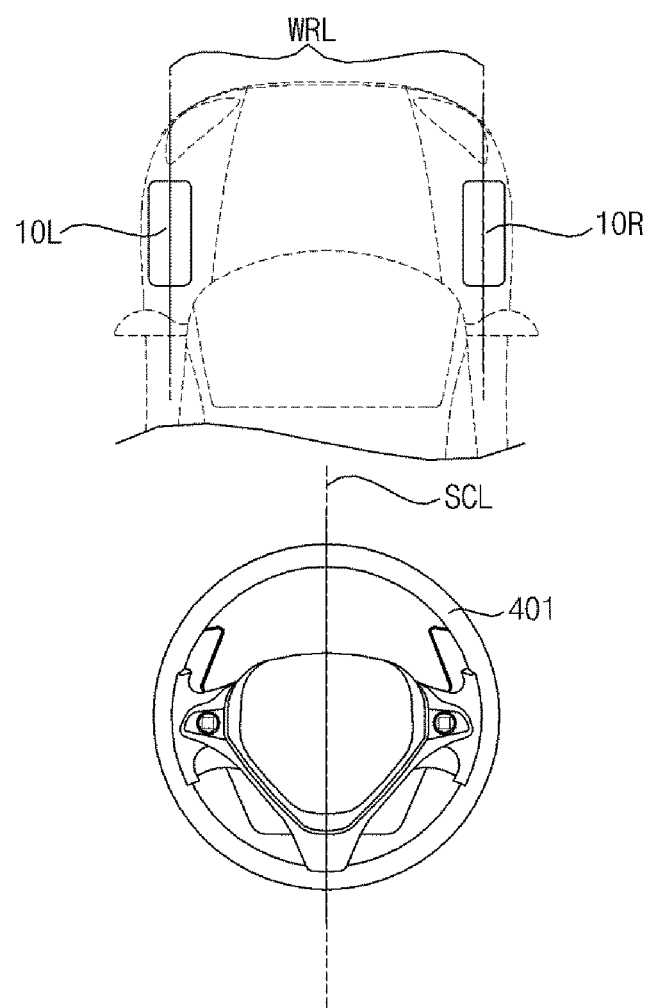

FIG. 11A illustrates the case where the autonomous driving vehicle 100 drives straight in the state in which the electrical linkage between the steering wheel 401 and the directional vehicle wheels 10L and 10R is cut off.

In this instance, the steering wheel 401 may maintain the original state. The original state of the steering wheel 401 may mean the state before the steering wheel 401 is rotated. The steering wheel 401 may not be rotated about the center line SCL which vertically penetrates the center of the steering wheel 401.

In this instance, the directional vehicle wheels 10L and 10R may face forward. The direction of the directional vehicle wheels 10L and 10R may not be changed in the left-and-right direction about the reference line WRL which faces the front of the autonomous driving vehicle 100. For example, the directional vehicle wheels 10L and 10R may not be rotated in the left-and-right direction about the reference line WRL which faces the front of the autonomous driving vehicle 100.

Figure 11B:
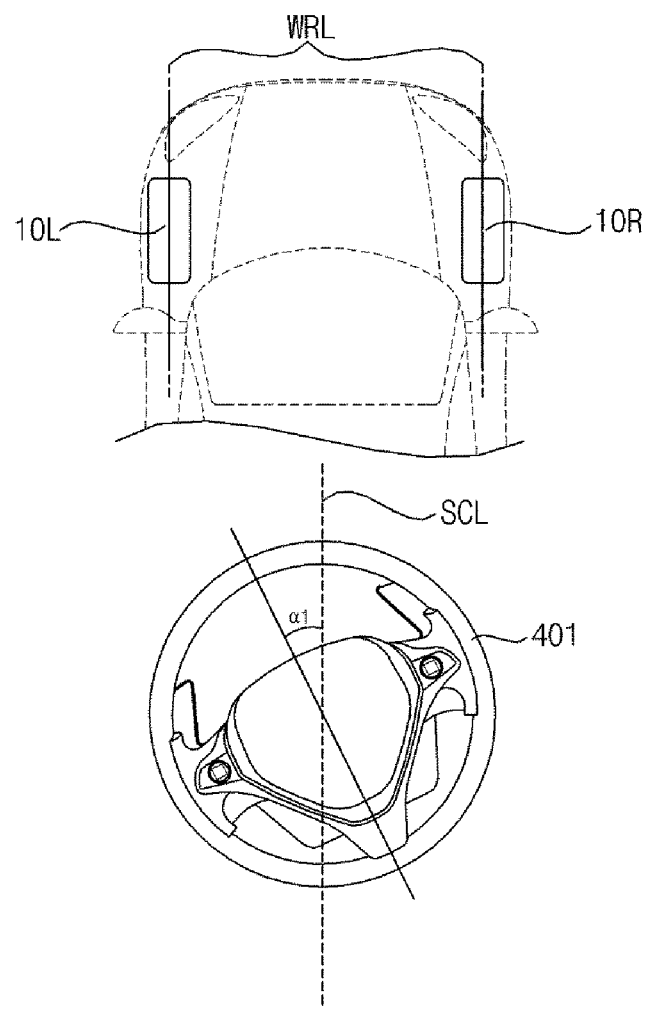

FIG. 11B illustrates the case where the autonomous driving vehicle 100 drives straight in the state in which the electrical linkage between the steering wheel 401 and the directional vehicle wheels 10L and 10R is cut off.

The controller 170 may perform control to prevent the directional vehicle wheels 101 and 10R from being changed in direction regardless of the rotation of the steering wheel 401.

In this instance, the steering wheel 401 may be rotated to the left direction by an angle α1 about the center line SCL.

In this instance, the directional vehicle wheels 10L and 10R may face forward. The direction of the directional vehicle wheels 10L and 10R may not be changed in the left-and-right direction about the reference line WRL which faces the front of the autonomous driving vehicle 100. For example, the directional vehicle wheels 10L and 10R may not be rotated in the left-and-right direction about the reference line WRL which faces the front of the autonomous driving vehicle 100.

Figure 11C:
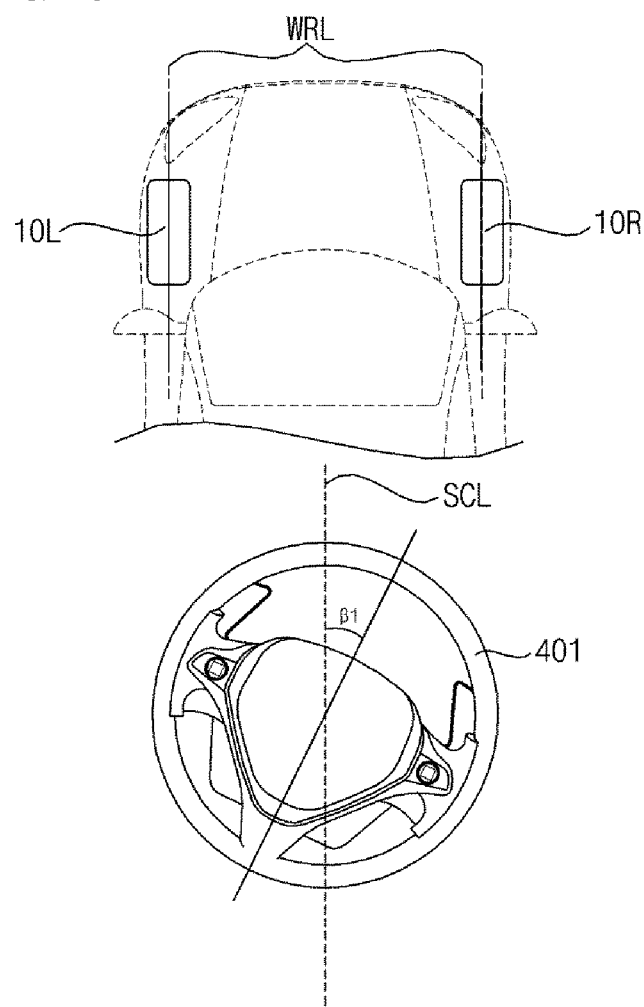

FIG. 11C illustrates the case where the autonomous driving vehicle 100 drives to the right direction in the state in which the electrical linkage between the steering wheel 401 and the directional vehicle wheels 10L and 10R is cut off.

The controller 170 may control the direction of the directional vehicle wheels 101 and 10R so as to be changed regardless of the rotation of the steering wheel 401.

In this instance, the steering wheel 401 may be rotated to the right direction by an angle β1 about the center line SCL.

In this instance, the directional vehicle wheels 10L and 10R may face forward. The direction of the directional vehicle wheels 10L and 10R may not be changed in the left-and-right direction about the reference line WRL which faces the front of the autonomous driving vehicle 100. For example, the directional vehicle wheels 10L and 10R may not be rotated in the left-and-right direction about the reference line WRL which faces the front of the autonomous driving vehicle 100.

FIGS. 12A to 12J are views referenced to describe the operation of the autonomous driving vehicle.

FIGS. 12A to 12J correspond to the flowchart of FIG. 6.

Figure 12A:
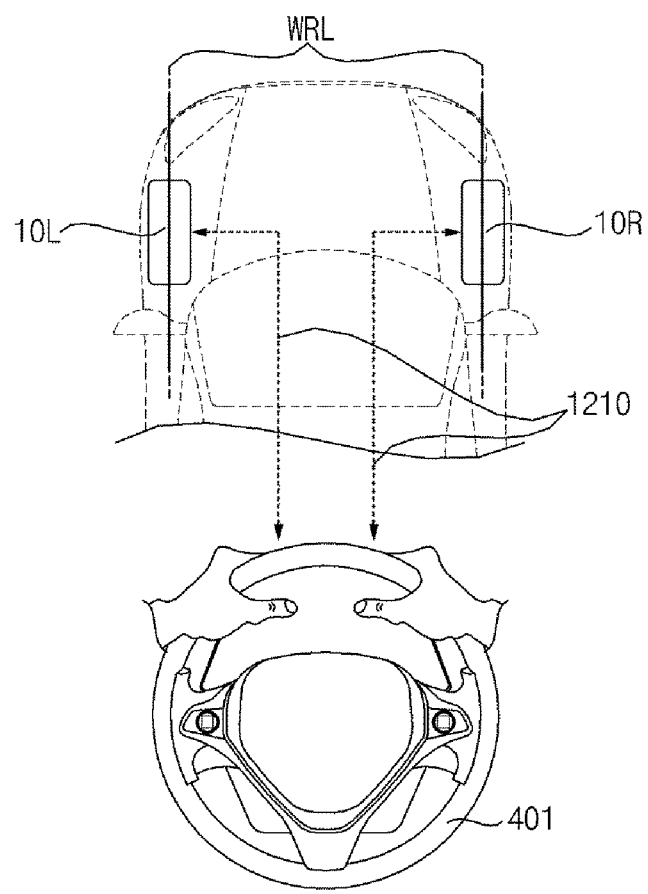
FIGS. 12A to 12J are views referenced to describe the operation of the autonomous driving vehicle.

As exemplarily illustrated in FIG. 12A, the autonomous driving vehicle 100 is in the manual driving state. In this instance, the controller 170 may control the steering wheel 401 and the directional vehicle wheels 10L and 10R so as to be linked to each other (as represented by arrows 1210). Here, the steering wheel 401 and the directional vehicle wheels 10L and 10R may be mechanically or electrically linked to each other.

Figure 12B:
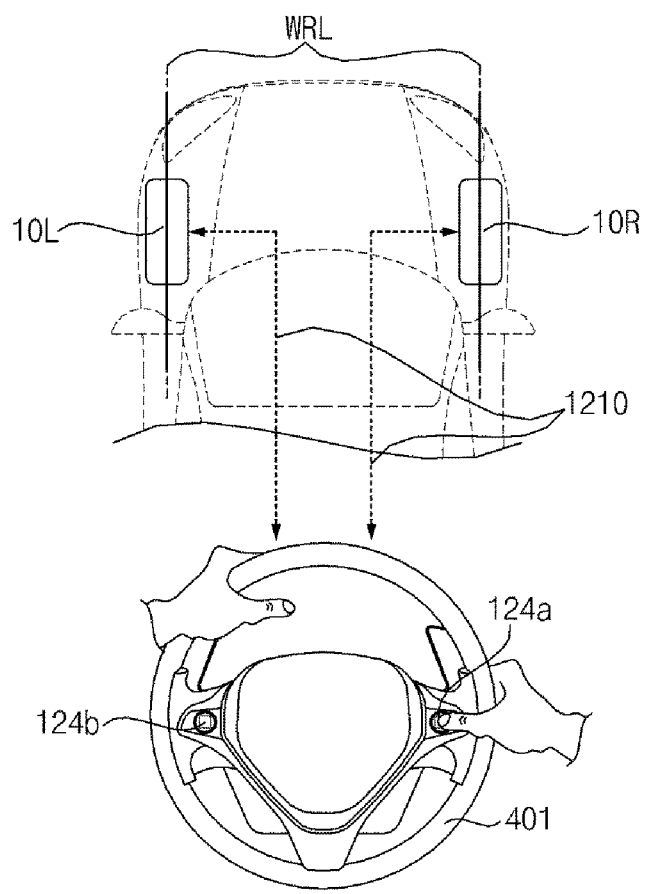

As exemplarily illustrated in FIG. 12B, in the state in which the steering wheel 401 and the directional vehicle wheels 10L and 10R are linked to each other, the controller 170 may receive first user input for switching to the autonomous driving state via a first user input unit 124a.

Figure 12C:
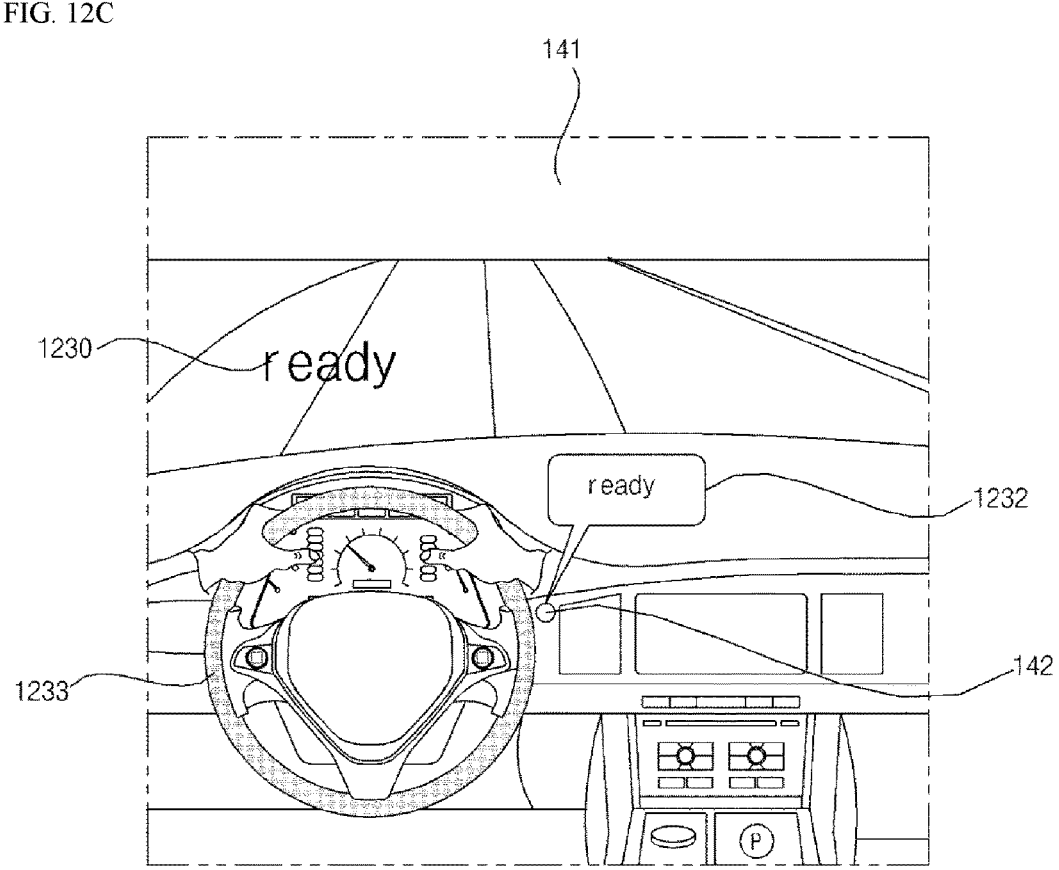

As exemplarily illustrated in FIG. 12C, when the first user input is received, the controller 170 may perform control to begin an operation to prepare for autonomous driving.

When the preparation operation begins, the controller 170 may control the output unit 140 so as to output information regarding the beginning of the preparation operation.

For example, the controller 170 may control the display unit 141 so as to display images or text 1230 indicating the information regarding the beginning of the preparation operation.

For example, the controller 170 may control the sound output unit 142 so as to output a voice 1232 indicating information regarding the beginning of the preparation operation.

For example, the controller 170 may control a light emitting unit located in a first region 1233 of the steering wheel 401 so as to visually display the information regarding the beginning of the preparation operation. Here, the first region 1233 of the steering wheel 401 may be the rim region of the steering wheel 401. The controller 170 may control the light-emitting unit located in the first region 1233 so as to emit light.

Figure 12D:
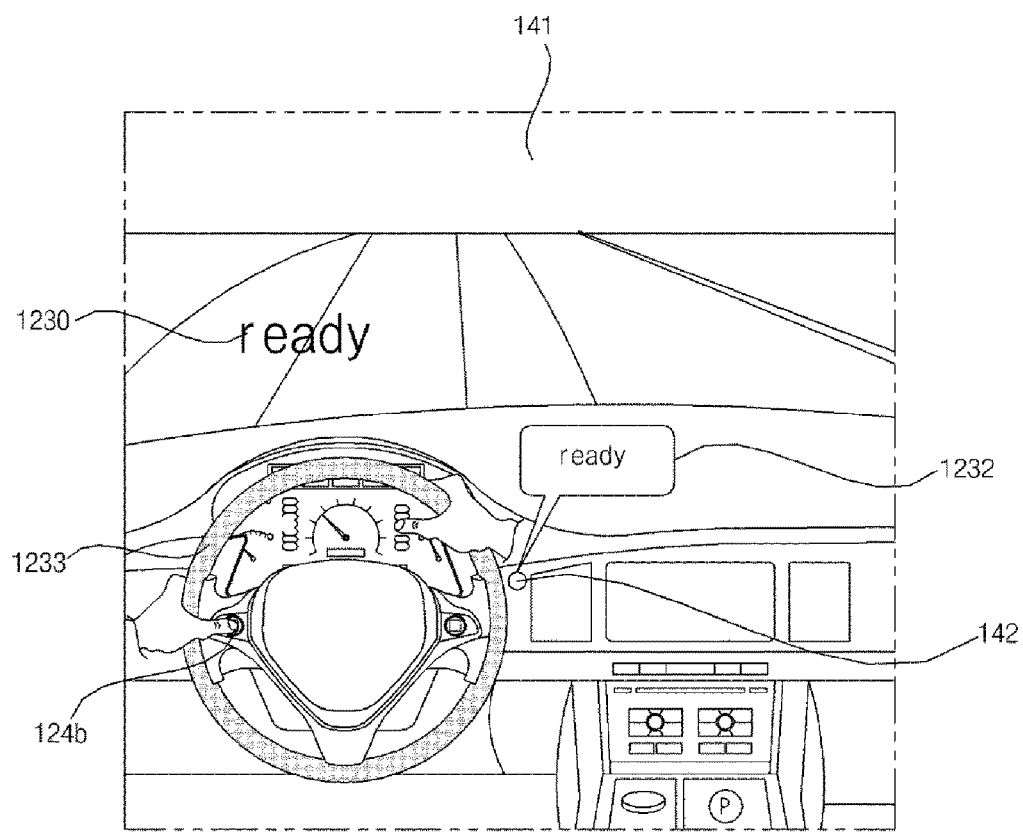

As exemplarily illustrated in FIG. 12D, in the preparation operation, the controller 170 may receive second user input to cut off the linkage between the steering wheel 401 and the directional vehicle wheels 10L and 10R via a second user input unit 124b.

Figure 12E:
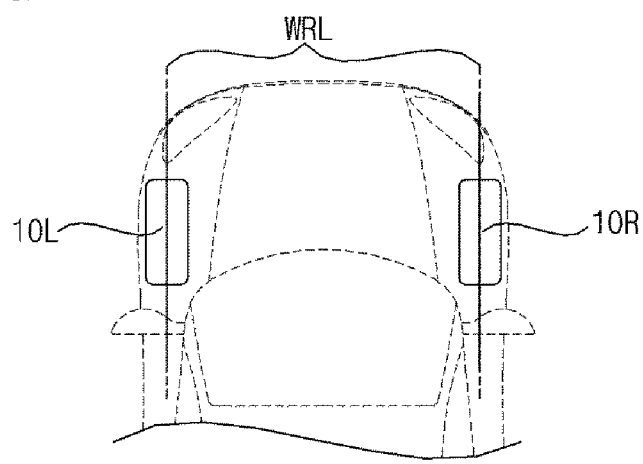
Figure 12E:
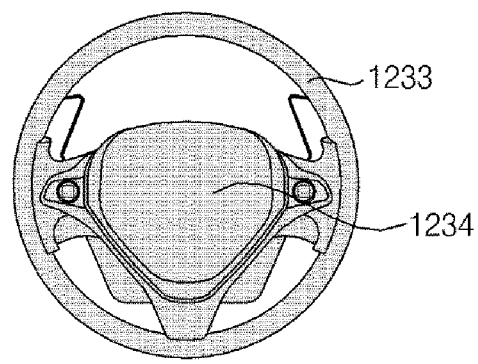

As exemplarily illustrated in FIG. 12E, when the second user input is received, the controller 170 may perform control to cut off the linkage between the steering wheel 401 and the directional vehicle wheels 10L and 10R.

The second user input may be omitted. For example, the controller 170 may control the linkage between the steering wheel 401 and the directional vehicle wheels 10L and 10R so as to be cut off after a predetermined time has passed in the state in which the preparation operation has begun.

In the state in which the linkage between the steering wheel 401 and the directional vehicle wheels 10L and 10R are cut off, the controller 170 may control the autonomous driving vehicle 100 so as to switch to the autonomous driving state.

In this instance, the controller 170 may control the output unit 140 so as to output information regarding the completion of switching to the autonomous driving state.

For example, the controller 170 may control the display unit 141 so as to display images or text indicating the information regarding the completion of switching to the autonomous driving state.

For example, the controller 170 may control the sound output unit 142 so as to output a voice indicating the information regarding the completion of switching to the autonomous driving state.

For example, the controller 170 may control light emitting units located in the first region 1233 and a second region 1234 of the steering wheel 401 so as to visually display the information regarding the completion of switching to the autonomous driving state. Here, the first region 1233 of the steering wheel 401 may be the rim region of the steering wheel 401. The second region 1234 of the steering wheel 401 may be the spoke region of the steering wheel 401. Alternatively, the second region 1234 of the steering wheel 401 may be the remaining region of the steering wheel 401 excluding the rim region 1233. The controller 170 may control the light-emitting units located in the first region 1233 and the second region 1234 so as to emit light.

Figure 12F:
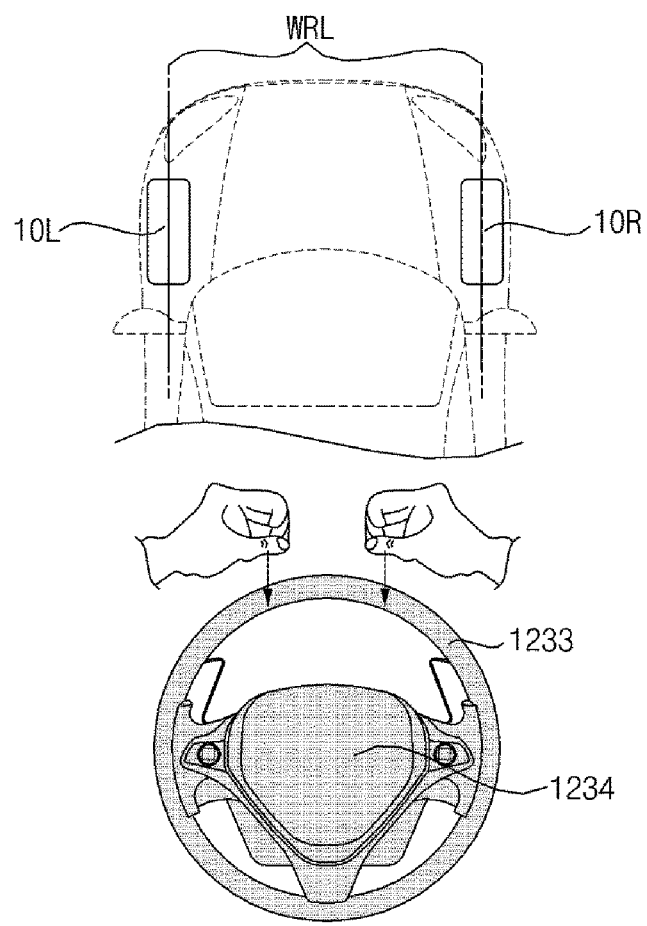

As exemplarily illustrated in FIG. 12F, the grip of the steering wheel 401 by the user may be sensed in the switched autonomous driving state.

Figure 12G:
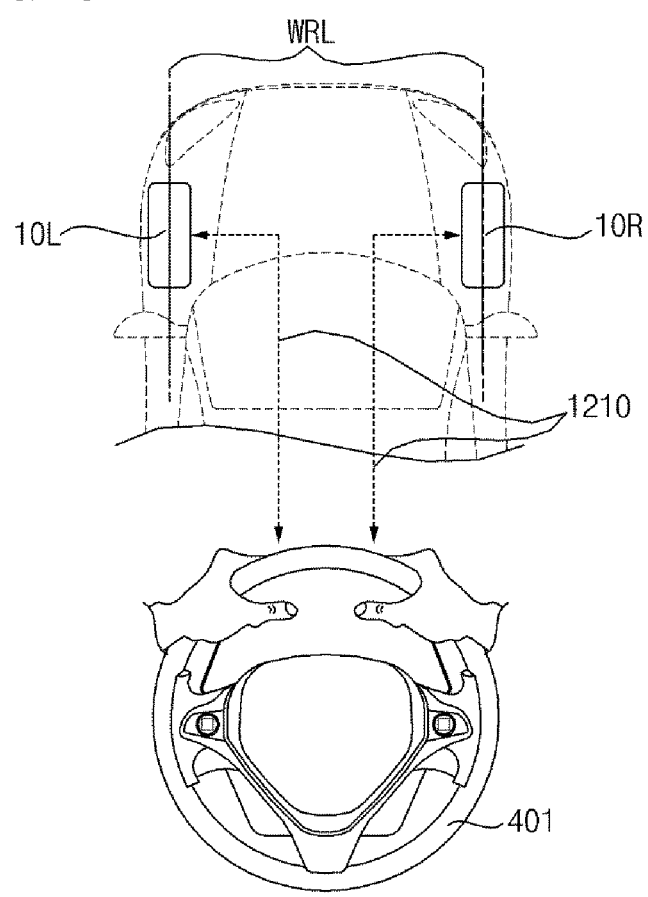

As exemplarily illustrated in FIG. 12G, when it is sensed that the steering wheel 401 is being gripped by the user in the switched autonomous driving state, the controller 170 may control the steering wheel 401 and the directional vehicle wheels 10L and 10R so as to be linked to each other. Thereafter, in the state in which the steering wheel 401 and the directional vehicle wheels 10L and 10R are linked to each other, the controller 170 may control the autonomous driving vehicle 100 so as to switch to the manual driving state.

In this instance, the controller 170 may control the output unit 140 so as to output information regarding switching to the manual driving state.

For example, the controller 170 may control the display unit 141 so as to display images or text indicating the information regarding switching to the manual driving state.

For example, the controller 170 may control the sound output unit 142 so as to output a voice indicating information regarding switching to the manual driving state.

For example, the controller 170 may control the light emitting units located in the first region 1233 and the second region 1234 of the steering wheel 401 so as to visually display the information regarding switching to the manual driving state. The controller 170 may control the light-emitting units located in the first region 1233 and the second region 1234 so as to emit light.

Figure 12H:
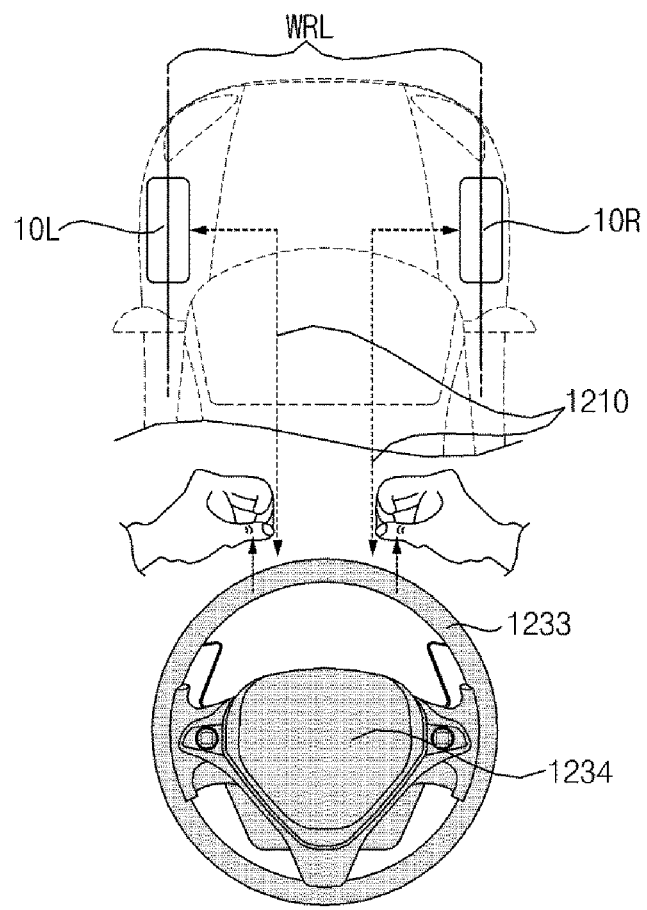

As exemplarily illustrated in FIG. 12H, when it is sensed that the user releases the grip of the steering wheel 401 in the manual driving state, the controller 170 may control the linkage between the steering wheel 401 and the directional vehicle wheels 10L and 10R so as to be cut off.

Figure 12I:
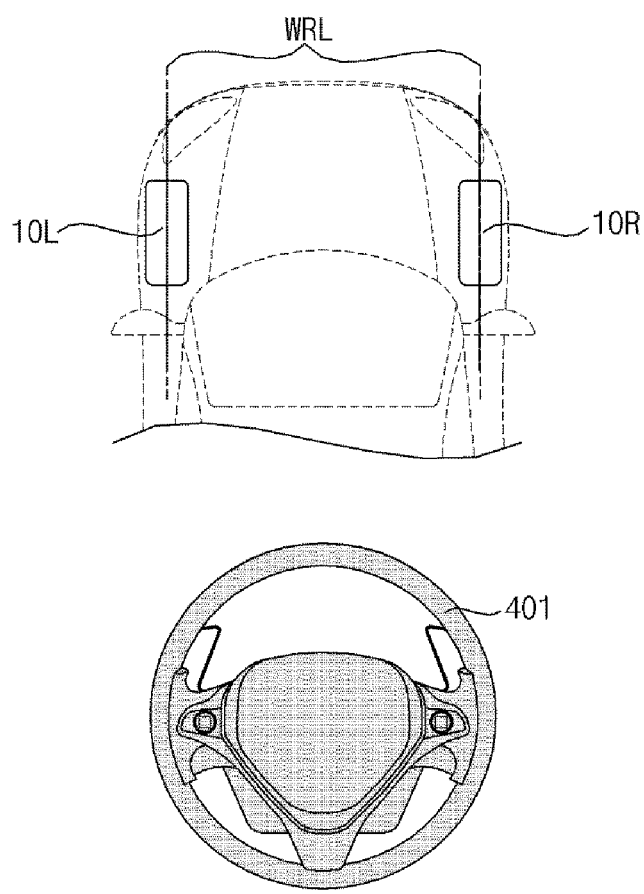

As exemplarily illustrated in FIG. 12I, thereafter, in the state in which the linkage between the steering wheel 401 and the directional vehicle wheels 10L and 10R is cut off, the controller 170 may control the autonomous driving vehicle 100 so as to again switch to the autonomous driving state.

In this instance, the controller 170 may control the output unit 140 so as to output information regarding the completion of switching to the autonomous driving state. The detailed output method has been described above with reference to FIG. 12E.

Figure 12J:
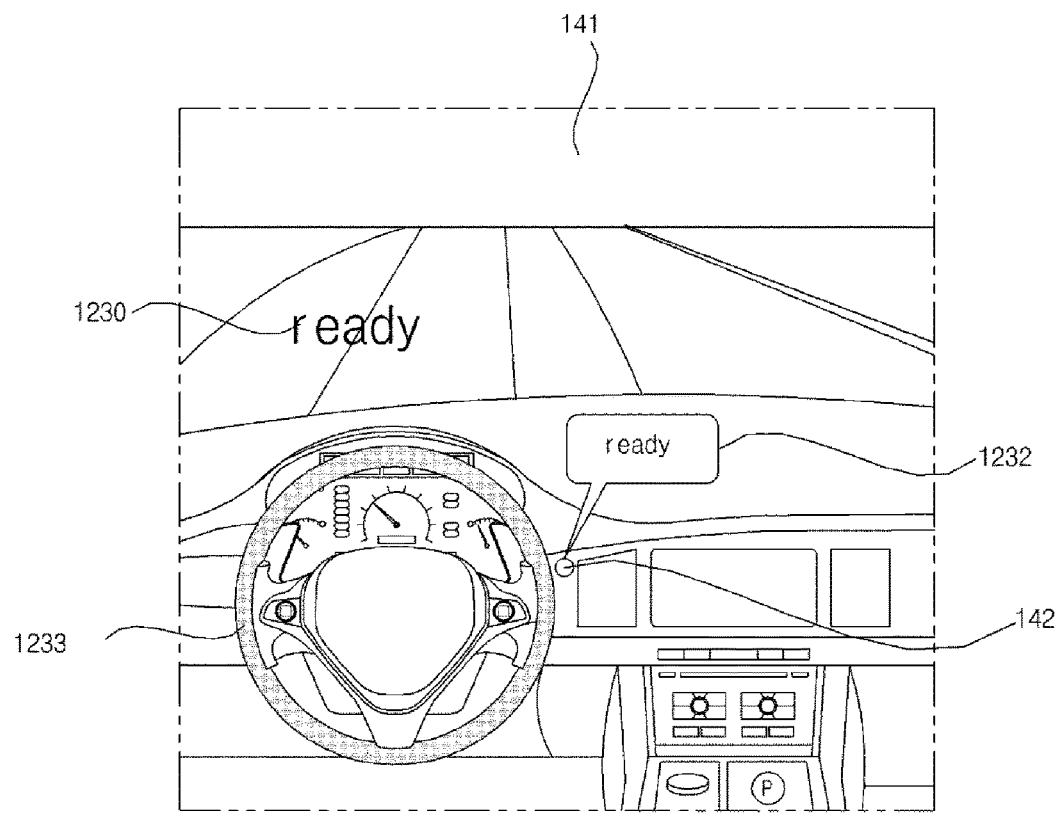

As exemplarily illustrated in FIG. 12J, when it is sensed that the user releases the grip of the steering wheel 401 in the manual driving state, the controller 170 may perform control to begin an operation to prepare for autonomous driving.

When the operation to prepare for autonomous driving begins, the controller 170 may control the output unit 140 so as to output information regarding the beginning of the preparation operation. The detailed output method has been described above with reference to FIG. 12C.

FIGS. 13A to 13J are views referenced to further describe the operation of the autonomous driving vehicle.

FIGS. 13A to 13J correspond to the flowchart of FIG. 7.

Figure 13A:
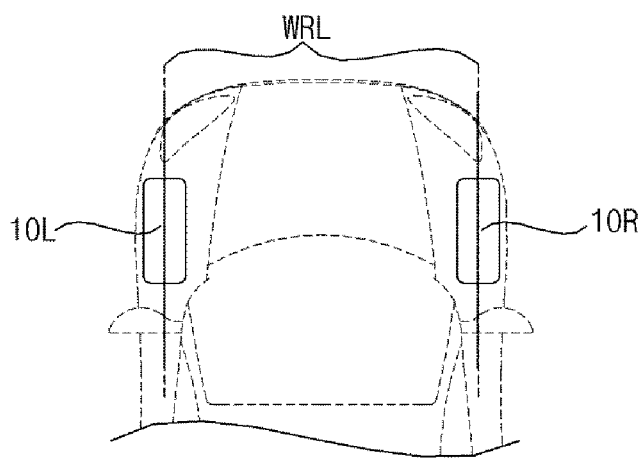
FIGS. 13A to 13J are views referenced to further describe the operation of the autonomous driving vehicle.
Figure 13A:
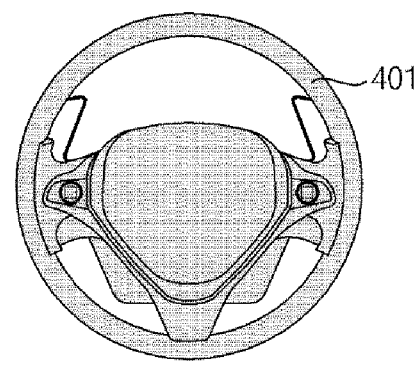

As exemplarily illustrated in FIG. 13A, the autonomous driving vehicle 100 is in the autonomous driving state. In this instance, the controller 170 may control the linkage between the steering wheel 401 and the directional vehicle wheels 10L and 10R so as to be cut off.

In this instance, the controller 170 may control the output unit 140 so as to output information regarding the autonomous driving state.

For example, the controller 170 may control the display unit 141 so as to display images or text indicating the information regarding the autonomous driving state.

For example, the controller 170 may control the sound output unit 142 so as to output a voice indicating the information regarding the autonomous driving state.

For example, the controller 170 may control the light emitting units located in the first region 1233 and the second region 1234 of the steering wheel 401 so as to visually display the information regarding the autonomous driving state. Here, the first region 1233 of the steering wheel 401 may be the rim region of the steering wheel 401. The second region 1234 of the steering wheel 401 may be the spoke region of the steering wheel 401. Alternatively, the second region 1234 of the steering wheel 401 may be the remaining region of the steering wheel 401 excluding the rim region 1233. The controller 170 may control the light-emitting units located in the first region 1233 and the second region 1234 so as to emit light.

Figure 13B:
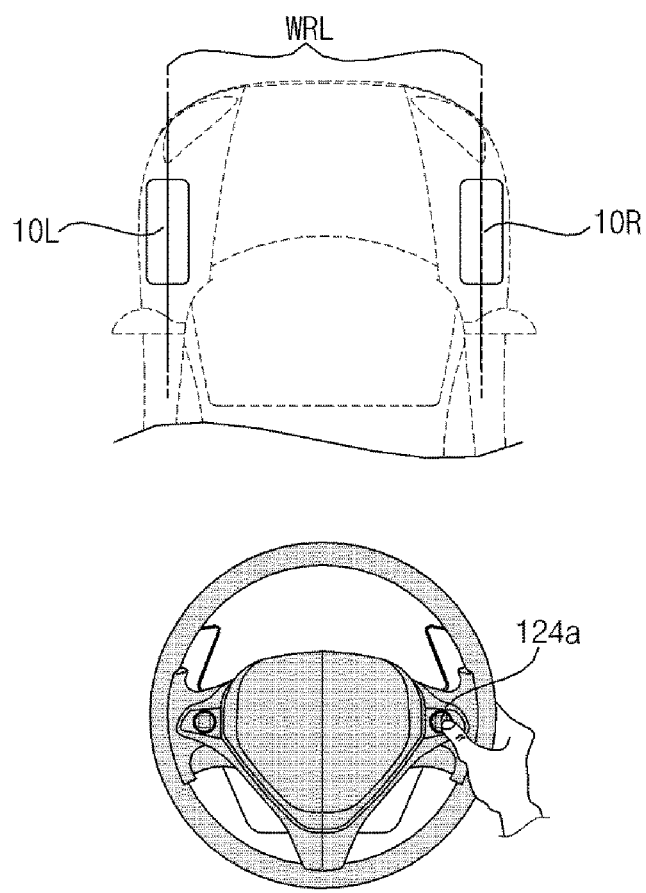

As exemplarily illustrated in FIG. 13B, in the state in which the linkage between the steering wheel 401 and the directional vehicle wheels 10L and 10R is cut off, the controller 170 may receive first user input for switching to the manual driving state via the first user input unit 124*a*.

Figure 13C:
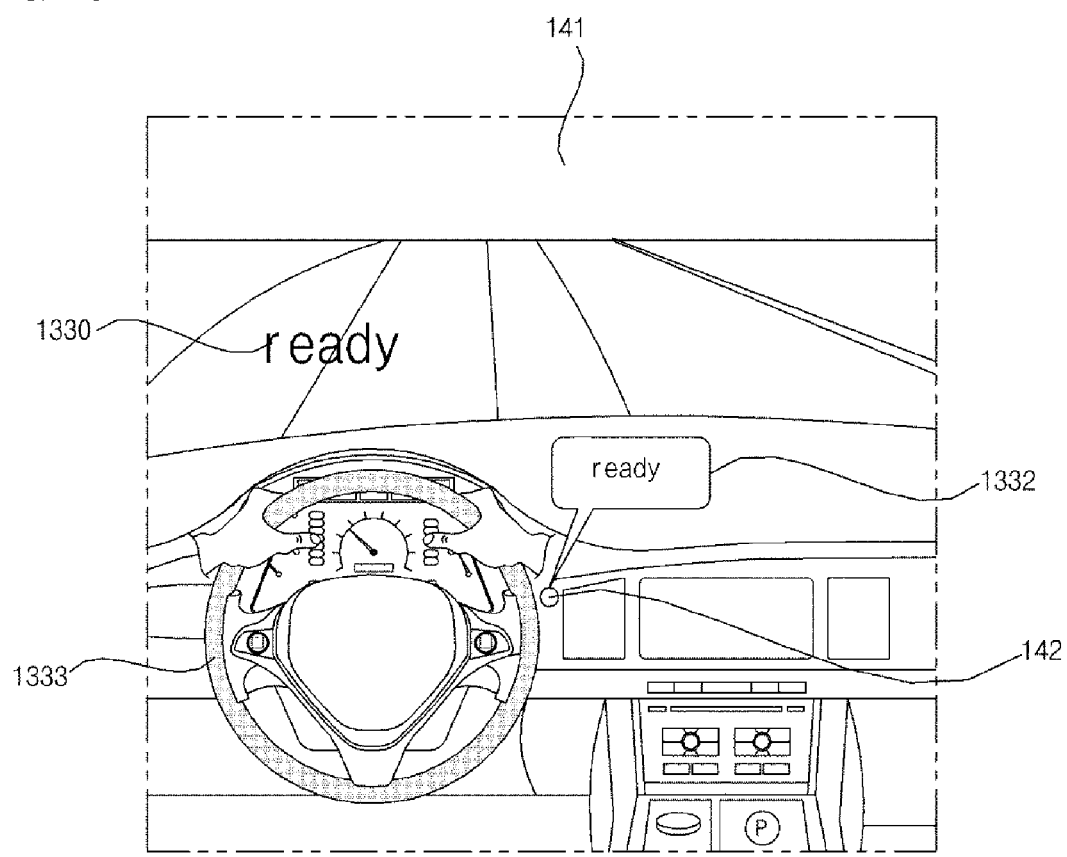

As exemplarily illustrated in FIG. 13C, when the first user input is received, the controller 170 may perform control to begin an operation to prepare for manual driving.

When the preparation operation begins, the controller 170 may control the output unit 140 so as to output information regarding the beginning of the preparation operation.

For example, the controller 170 may control the display unit 141 so as to display images or text 1330 indicating the information regarding the beginning of the preparation operation.

For example, the controller 170 may control the sound output unit 142 so as to output a voice 1332 indicating information regarding the beginning of the preparation operation.

For example, the controller 170 may control the light emitting unit located in the first region 1233 of the steering wheel 401 so as to visually display the information regarding the beginning of the preparation operation. Here, the first region 1233 of the steering wheel 401 may be the rim region of the steering wheel 401. The controller 170 may control the light-emitting unit located in the first region 1233 so as to emit light.

Figure 13D:
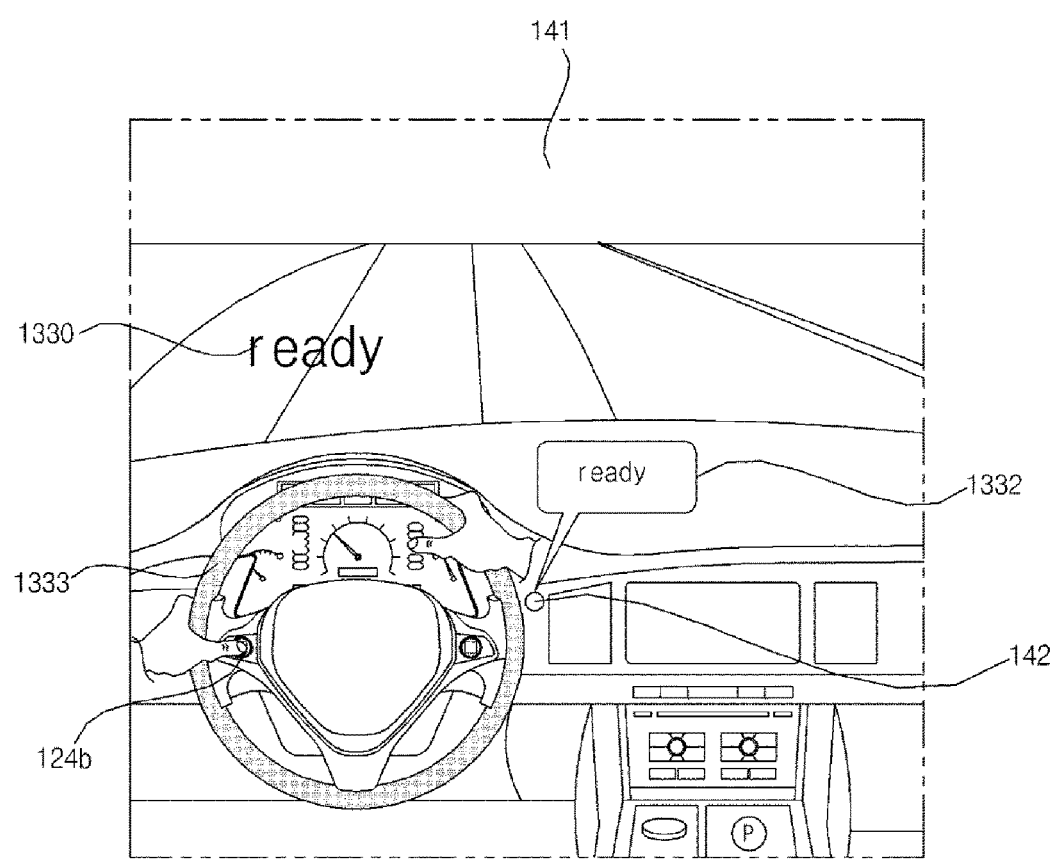

As exemplarily illustrated in FIG. 13D, in the preparation operation, the controller 170 may receive second user input to link the steering wheel 401 and the directional vehicle wheels 10L and 10R to each other via the second user input unit 124*b*.

Figure 13E:
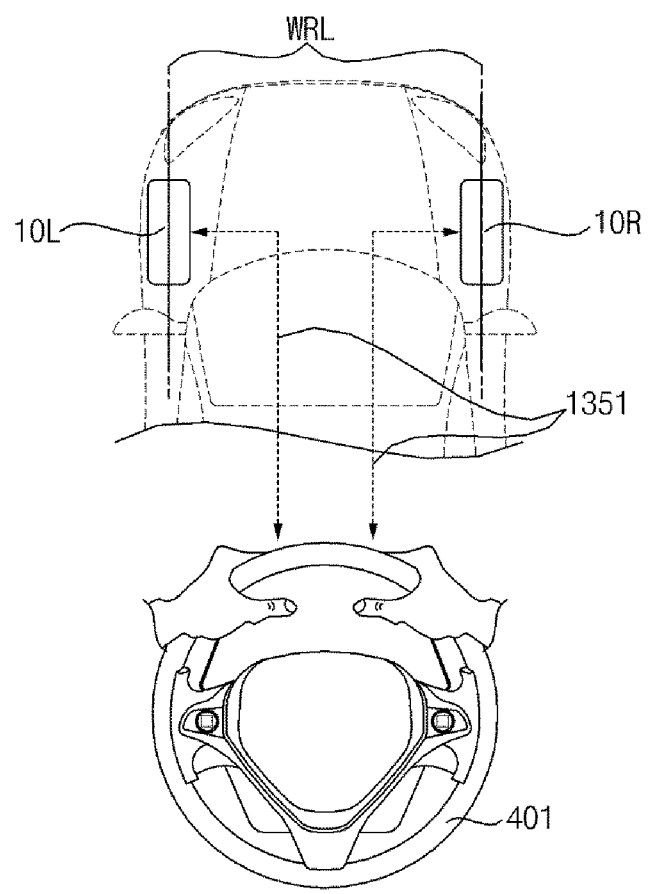

As exemplarily illustrated in FIG. 13E, when the second user input is received, the controller 170 may perform control to implement the linkage 1351 between the steering wheel 401 and the directional vehicle wheels 10L and 10R.

The second user input may be omitted. For example, the controller 170 may perform control to implement the linkage 1351 between the steering wheel 401 and the directional vehicle wheels 10L and 10R after a predetermined time has passed in the state in which the preparation operation has begun.

In the state in which the steering wheel 401 and the directional vehicle wheels 10L and 10R are linked to each other, the controller 170 may control the autonomous driving vehicle 100 so as to switch to the manual driving state.

In this instance, the controller 170 may control the output unit 140 so as to output information regarding the completion of switching to the manual driving state.

For example, the controller 170 may control the display unit 141 so as to display images or text indicating the information regarding the completion of switching to the manual driving state.

For example, the controller 170 may control the sound output unit 142 so as to output a voice indicating the information regarding the completion of switching to the manual driving state.

For example, the controller 170 may control light emitting units located in the first region 1233 and the second region 1234 of the steering wheel 401 so as to visually display the information regarding the completion of switching to the autonomous driving state. The controller 170 may control the light-emitting units located in the first region 1233 and the second region 1234 so as to emit light.

Figure 13F:
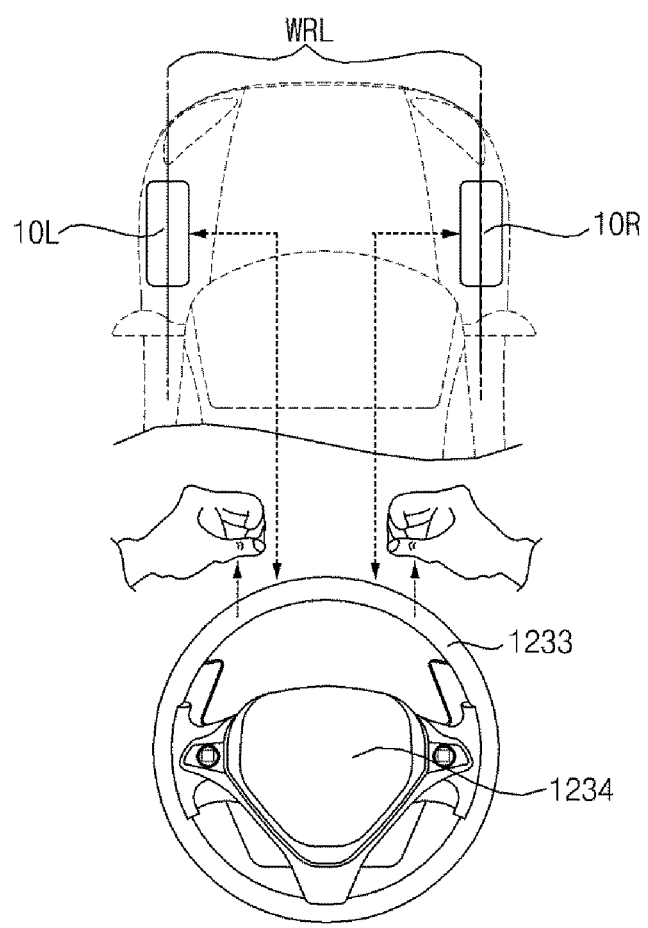

As exemplarily illustrated in FIG. 13F, a condition that the user releases the grip of the steering wheel 401 may be sensed in the switched manual driving state.

Figure 13G:
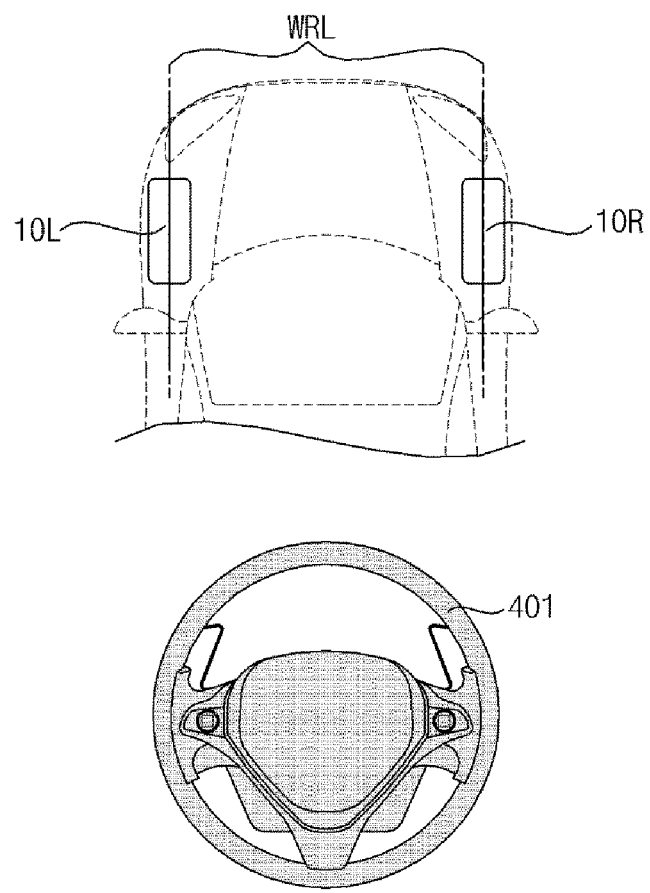

As exemplarily illustrated in FIG. 13G, when it is sensed that the user releases the grip of the steering wheel 401 in the switched autonomous driving state, the controller 170 may control the linkage between the steering wheel 401 and the directional vehicle wheels 10L and 10R so as to be cut off. Thereafter, in the state in which the linkage between the steering wheel 401 and the directional vehicle wheels 10L and 10R is cut off, the controller 170 may control the autonomous driving vehicle 100 so as to switch to the autonomous driving state.

In this instance, the controller 170 may control the output unit 140 so as to output information regarding switching to the autonomous driving state.

For example, the controller 170 may control the display unit 141 so as to display images or text indicating the information regarding switching to the autonomous driving state.

For example, the controller 170 may control the sound output unit 142 so as to output a voice indicating information regarding switching to the autonomous driving state.

For example, the controller 170 may control the light emitting units located in the first region 1233 and the second region 1234 of the steering wheel 401 so as to visually display the information regarding switching to the manual driving state. The controller 170 may control the light-emitting units located in the first region 1233 and the second region 1234 so as to emit light.

Figure 13H:
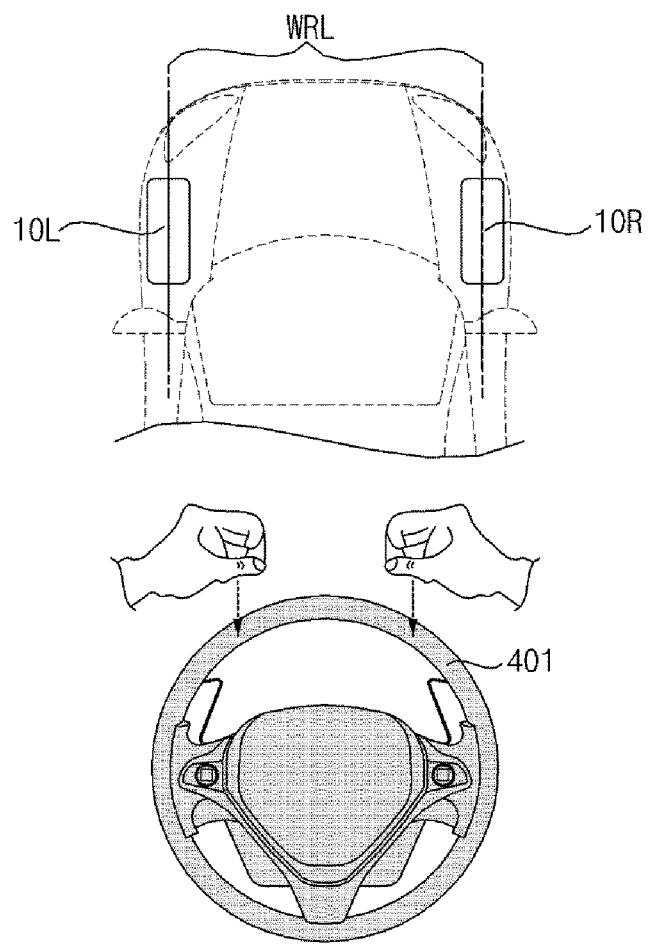

As exemplarily illustrated in FIG. 13H, when it is sensed that the user grips the steering wheel 401 in the manual driving state, the controller 170 may control the steering wheel 401 and the directional vehicle wheels 10L and 10R so as to be linked to each other.

Figure 13I:
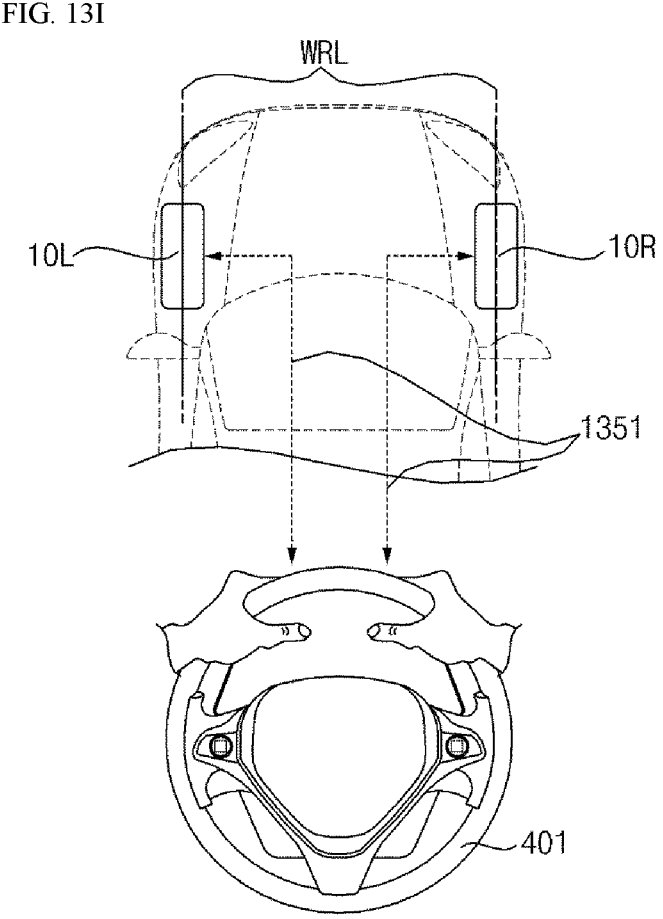

As exemplarily illustrated in FIG. 13I, thereafter, in the state in which the steering wheel 401 and the directional vehicle wheels 10L and 10R are linked to each other, the controller 170 may control the autonomous driving vehicle 100 so as to again switch to the manual driving state.

In this instance, the controller 170 may control the output unit 140 so as to output information regarding the completion of switching to the manual driving state. The detailed output method has been described above with reference to FIG. 13E.

Figure 13J:
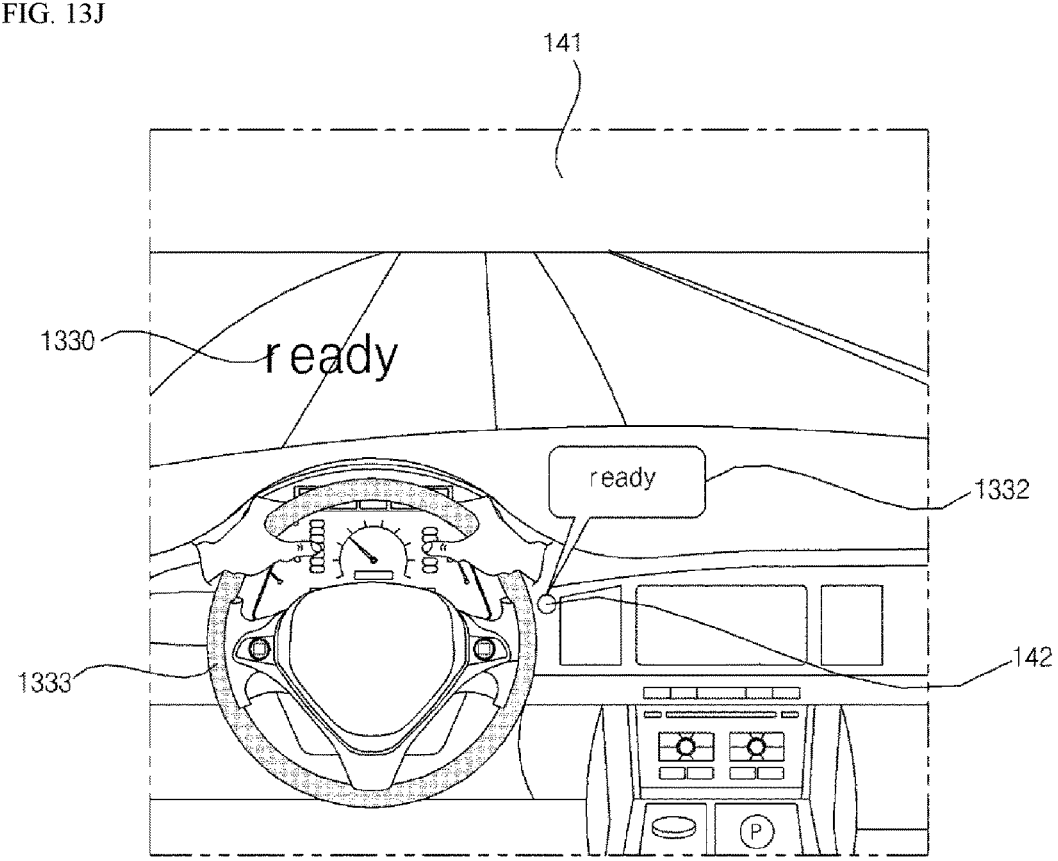

As exemplarily illustrated in FIG. 13J, when it is sensed that the steering wheel 401 is being gripped by the user in the autonomous driving state, the controller 170 may perform control to begin an operation to prepare for manual driving.

When the operation to prepare for manual driving begins, the controller 170 may control the output unit 140 so as to output information regarding the beginning of the preparation operation. The detailed output method has been described above with reference to FIG. 13C.

Figure 14A:
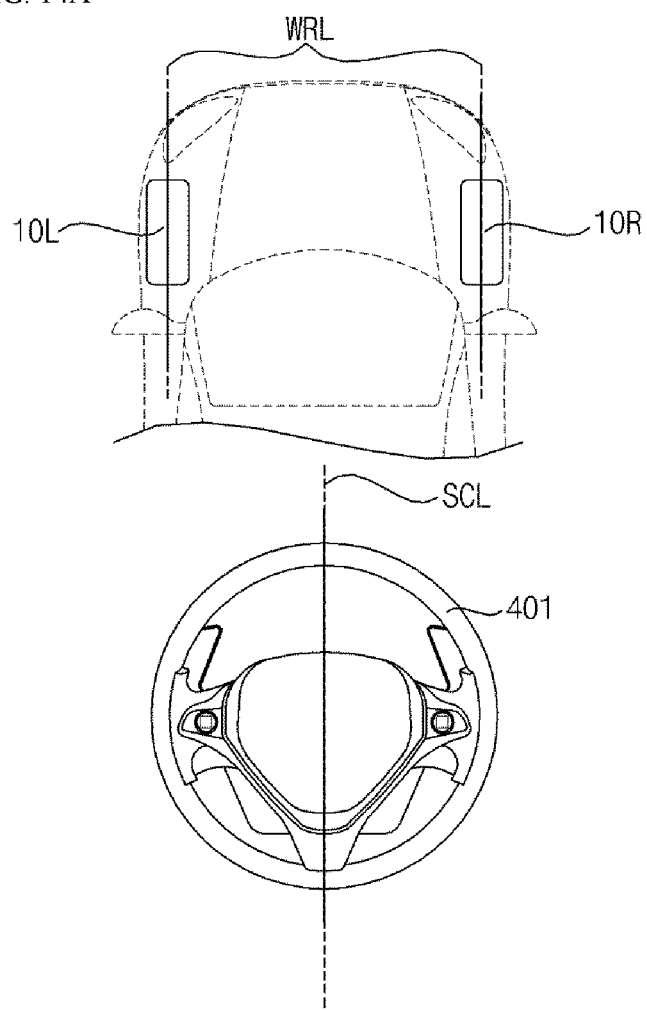
FIGS. 14A to 14C are views referenced to further describe the operation of the autonomous driving vehicle.
Figure 14B:
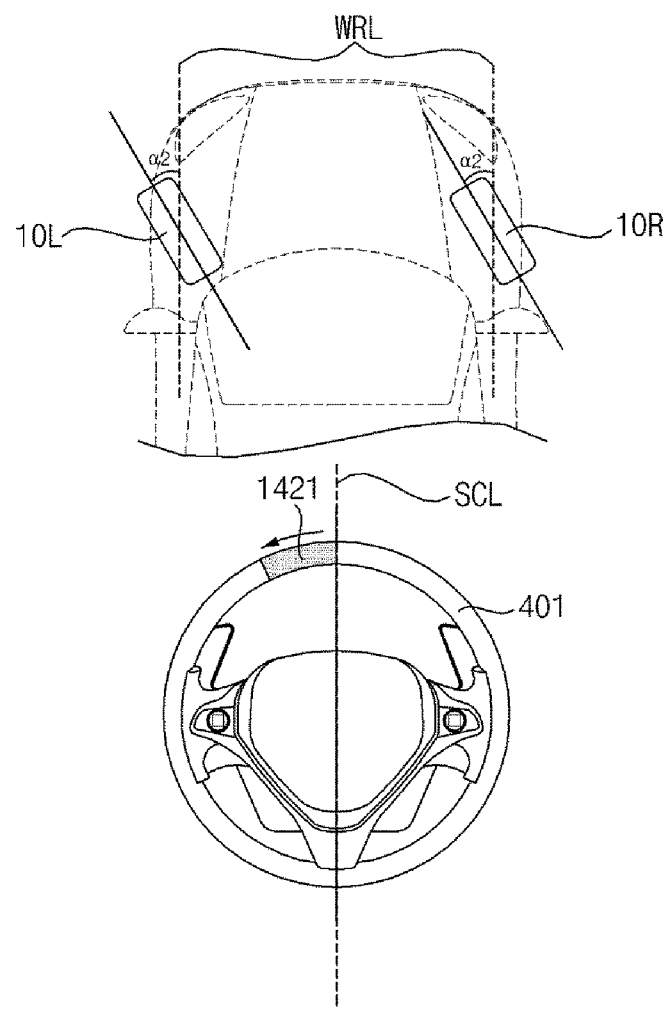
Figure 14C:
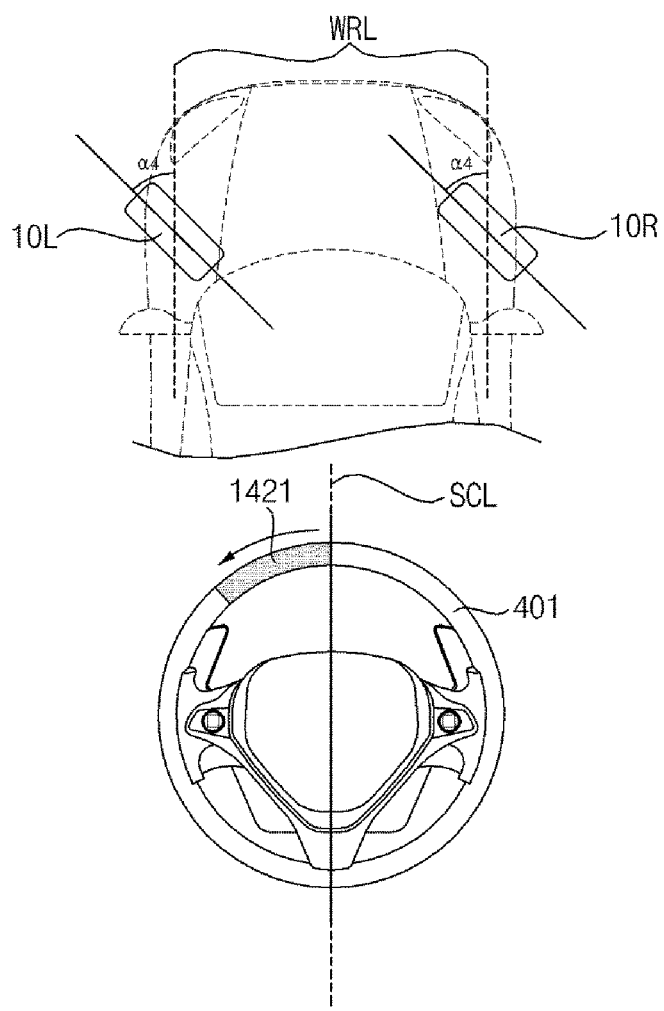

FIGS. 14A to 14C are views referenced to further describe the operation of the autonomous driving vehicle.

FIGS. 14A to 14C illustrate an operation of displaying direction change information of the directional vehicle wheels 10L and 10R in the state in which the linkage between the steering wheel 401 and the directional vehicle wheels 10L and 10R is cut off.

Referring to FIG. 14A, the controller 170 may control the linkage between the steering wheel 401 and the directional vehicle wheels 10L and 10R so as to be cut off in the autonomous driving state.

Referring to FIG. 14B, the direction of the directional vehicle wheels 10L and 10R may be changed to the left side or the right side relative the direction in which the vehicle is heading under the control of the controller 170. For example, the direction of the directional vehicle wheels 10L and 10R may be changed to the left direction by an angle α2 about the reference line WRL.

In this instance, the steering wheel 401 is not rotated.

At least one light emitting unit may be located on the steering wheel 401. The light emitting unit may emit light under the control of the controller 170. The light emitting unit may be located on the rim of the steering wheel 401.

The controller 170 may control the emission of light from the light emitting unit located on the steering wheel 401 so as to correspond to steering information.

The controller 170 may control the emission of light from the light emitting unit located on the steering wheel 401 so as to correspond to change in the direction of the directional vehicle wheels 10L and 10R.

For example, the controller 170 may control the number of light emitting elements which emit light or the area of the light emitting region of the light-emitting unit based on the extent of direction change of the directional vehicle wheels 10L and 10R. As exemplarily illustrated in the drawings, when the direction of the directional vehicle wheels 10R and 10L is changed to the left side by an angle α2 or α4, the controller 170 may control the light emitting unit so that light is emitted from the region 1421 corresponding to the angle α2 or α4, respectively. Here, α2 and α4 may be proportional to the size of the region 1421. The light emitting region may be the left region of the steering wheel 401 corresponding to the changed direction of the directional vehicle wheels 10L and 10R.

For example, the controller 170 may control, based on the speed of direction change of the directional vehicle wheels 10L and 10R, the rate of sequential increase in the area of the light emitting region or the rate of sequential increase in the number of light emitting elements of the light-emitting unit.

Unlike the illustration of the drawings, when the direction of the directional vehicle wheels 10L and 10R is changed to the right side relative to the direction in which the vehicle is heading, the controller 170 may control the light-emitting unit located in the right region of the steering wheel 401 so as to emit light.

When the linkage between the steering wheel 401 and the directional vehicle wheels 10L and 10R is cut off while the autonomous driving vehicle 100 is in the autonomous driving state, the user cannot know the rotation angle of the directional vehicle wheels 10L and 10R during autonomous driving.

As described above with reference to FIGS. 14A to 14C, as the emission of light from the light emitting unit located on the steering wheel 401 is controlled to correspond to the direction change of the directional vehicle wheels 10L and 10R, there is the effect of assisting the user in intuitively recognizing the extent of rotation of the directional vehicle wheels 10L and 10R.

Figure 15A:
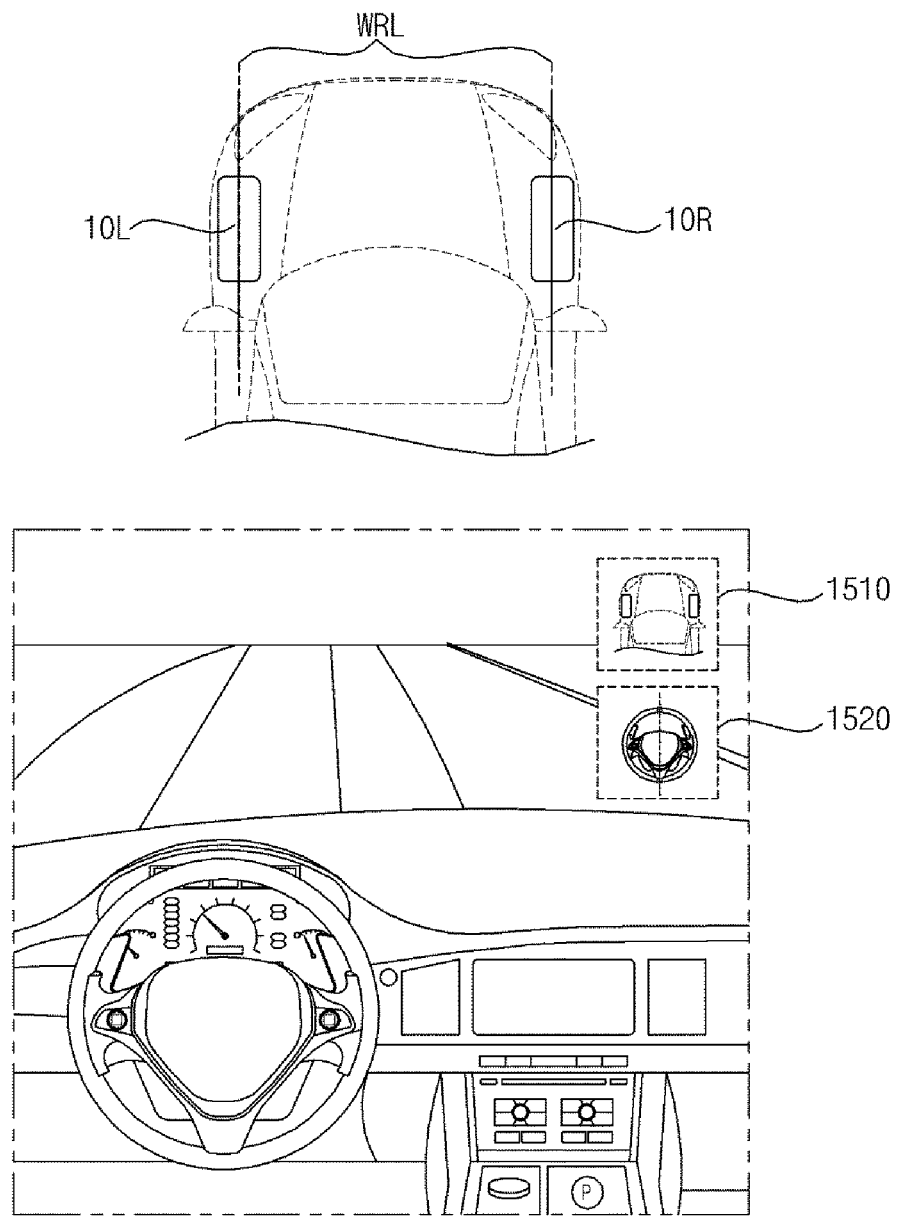
FIGS. 15A to 15C are views referenced to further describe the operation of the autonomous driving vehicle.
Figure 15B:
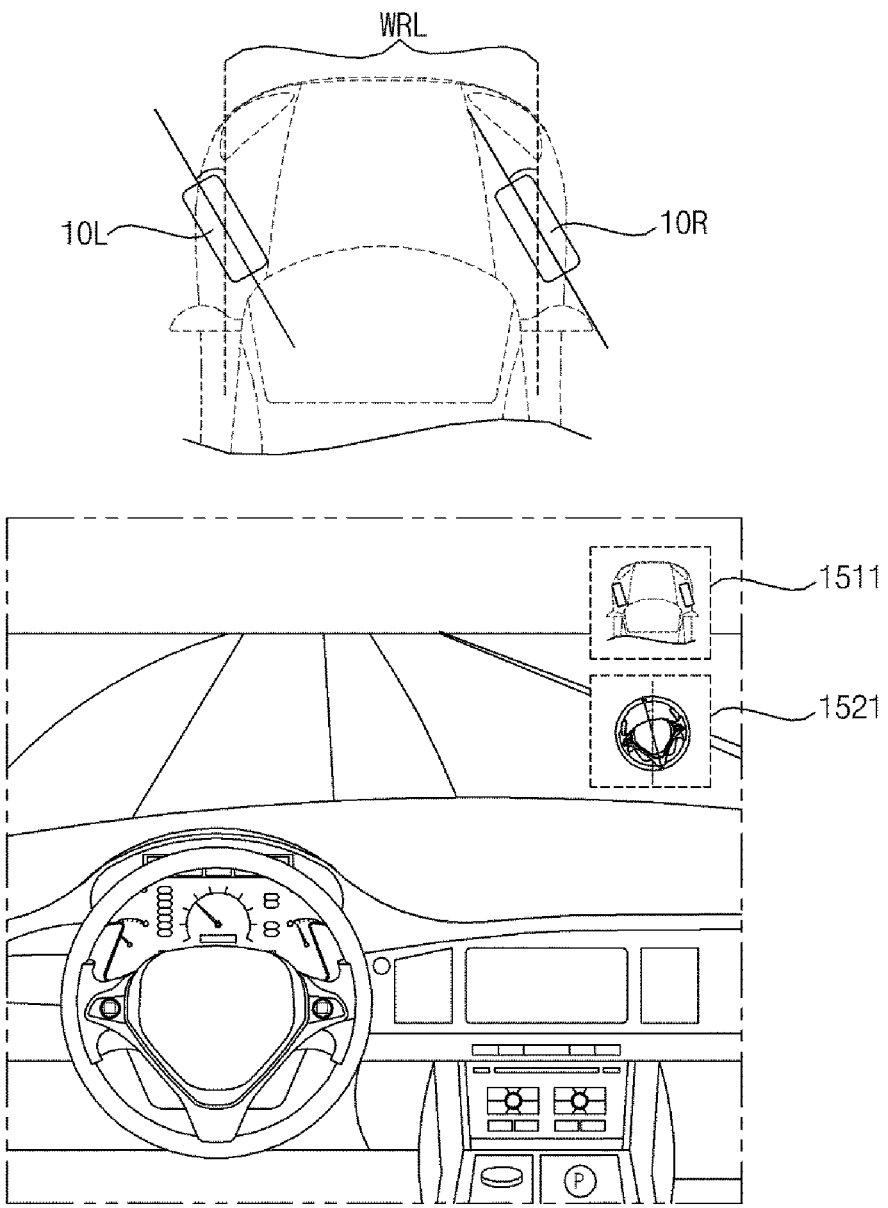
Figure 15C:
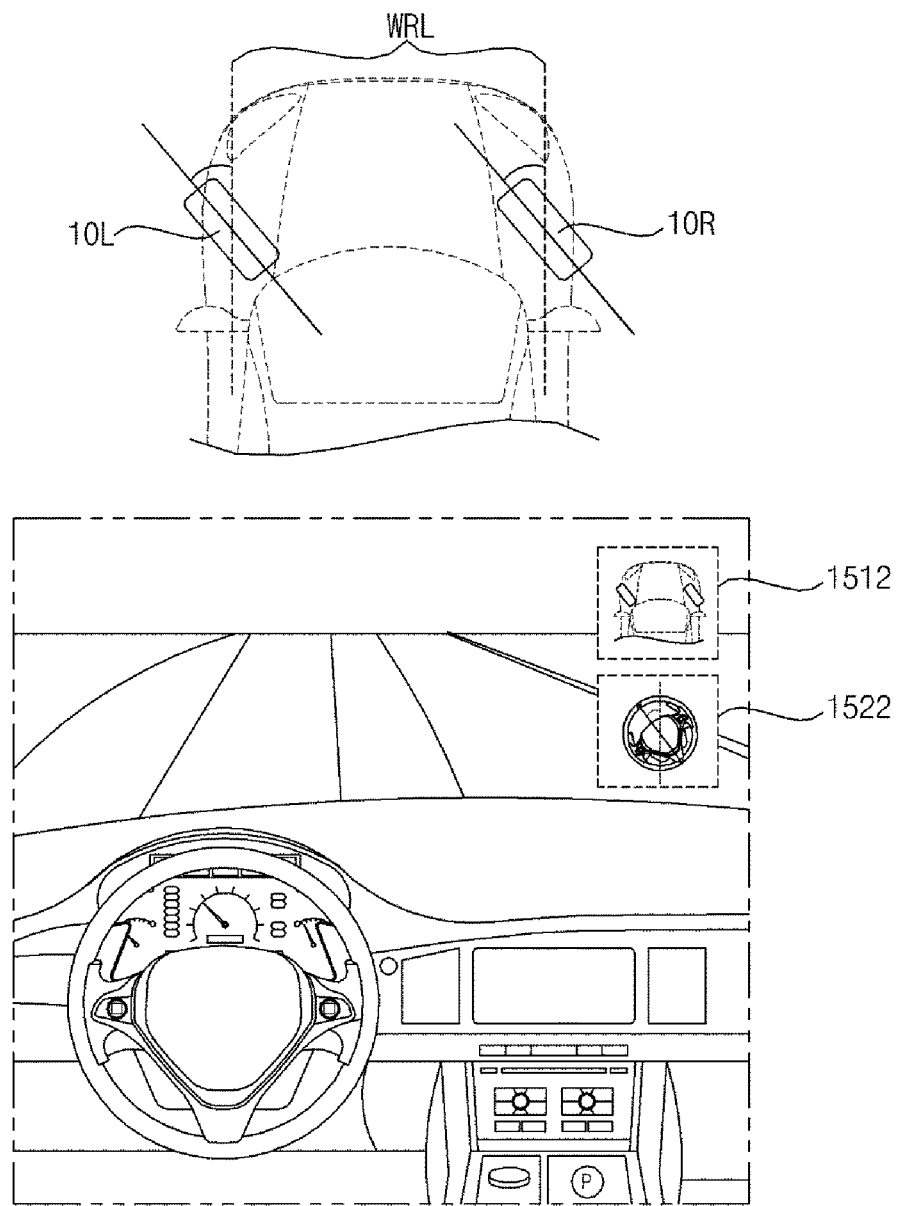

FIGS. 15A to 15C are views referenced to further describe the operation of the autonomous driving vehicle.

Referring to FIG. 15A, the controller 170 may control the linkage between the steering wheel 401 and the directional vehicle wheels 10L and 10R so as to be cut off in the autonomous driving state.

In this instance, the controller 170 may control the output unit 140 so as to output information regarding the state of the directional vehicle wheels 10L and 10R.

For example, the controller 170 may control the display unit 141 so as to display a steering wheel image 1520 and to display information regarding the state of the directional vehicle wheels 10L and 10R via the steering wheel image 1520.

For example, the controller 170 may control the display unit 141 so as to display a vehicle image 1510 to display information regarding the direction change of the directional vehicle wheels 10L and 10R via a directional vehicle wheel image included in the vehicle image 1510.

Referring to FIGS. 15B and 15C, the controller 170 may control the output unit 140 so as to output information regarding the direction change state of the directional vehicle wheels 10L and 10R.

For example, the controller 170 may control the display unit 141 so as to display the steering wheel image 1520 and to display information regarding the direction change state of the directional vehicle wheels 10L and 10R via rotation of the steering wheel image 1520. At this time, the steering wheel 401 is not rotated actually.

For example, the controller 170 may control the display unit 141 so as to display the vehicle image 1510 and to display information regarding the direction change state of the directional vehicle wheels 10L and 10R via rotation of a directional vehicle wheel image included in the vehicle image 1510.

As described above with reference to FIGS. 15A to 15C, the information regarding the direction change state of the directional vehicle wheels 10L and 10R is output to correspond to the direction change of the directional vehicle wheels 10L and 10R, there is the effect of assisting the user in intuitively recognizing the extent of rotation of the directional vehicle wheels 10L and 10R.

FIGS. 16A to 16D are views referenced to further describe the operation of the autonomous driving vehicle.

Figure 16A:
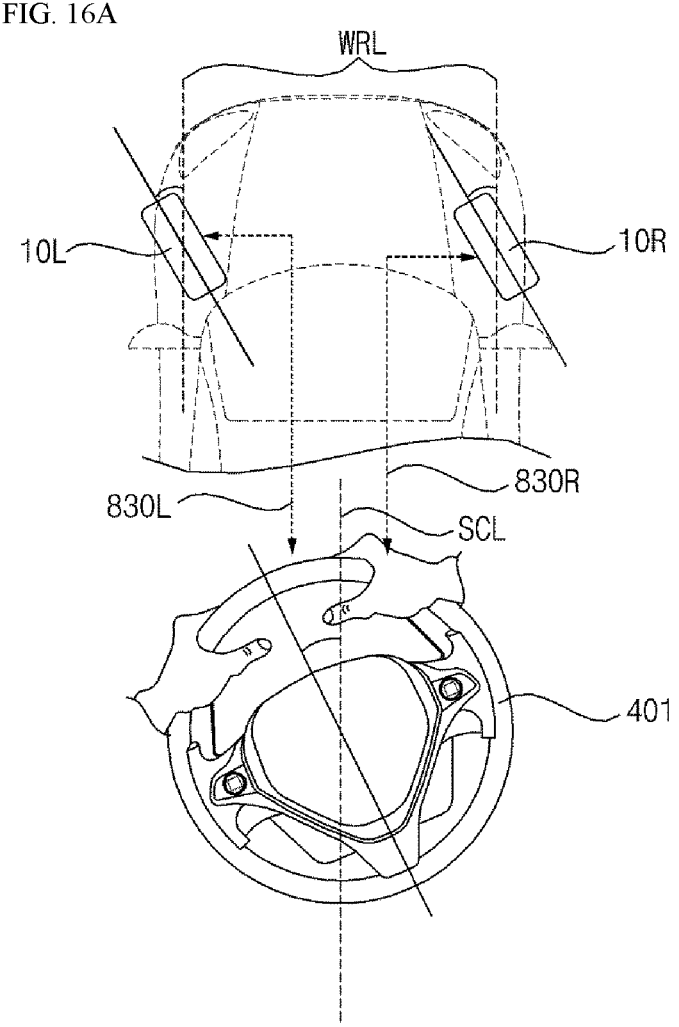
FIGS. 16A to 16D are views referenced to further describe the operation of the autonomous driving vehicle.

Referring to FIG. 16A, the controller 170 may control the steering wheel 401 and the directional vehicle wheels 10L and 10R so as to be mechanically or electrically linked to each other (as represented by arrows 830L and 830R) in the manual driving state. Although the drawings illustrate the electrical linkage between the steering wheel 401 and the directional vehicle wheels 10L and 10R, the steering wheel 401 and the directional vehicle wheels 10L and 10R may be mechanically linked to each other.

In this instance, the controller 170 may change the direction of the directional vehicle wheels 10L and 10R based on whether the steering wheel 401 is rotated and the rotational direction, the rotational displacement, or the rotational speed of the steering wheel 401.

Figure 16B:
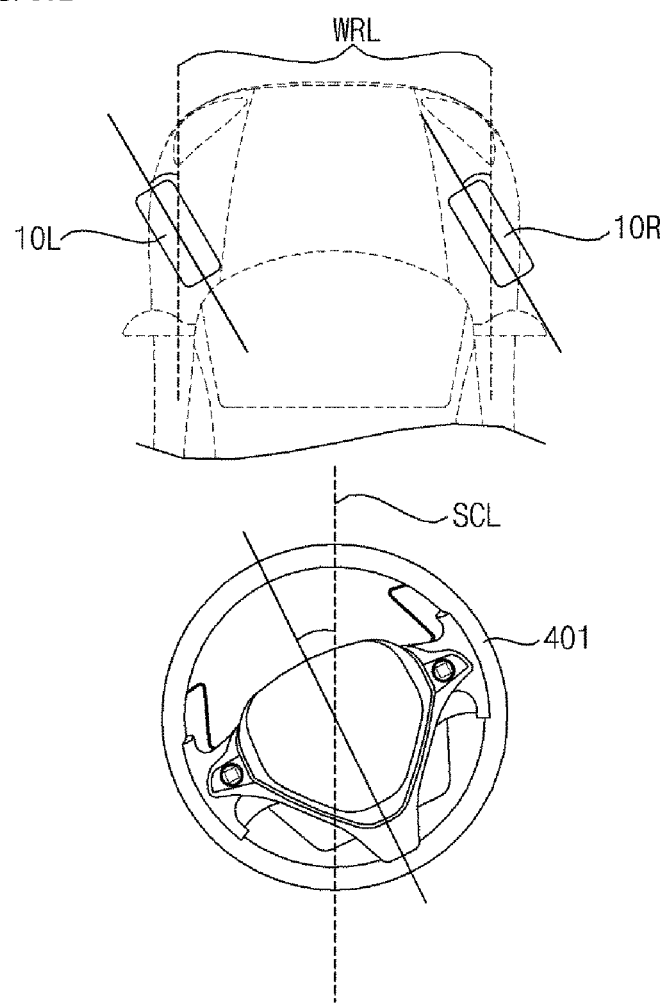

Referring to FIG. 16B, in the state in which the steering wheel 401 has been rotated, the controller 170 may begin an operation to prepare for autonomous driving. In this instance, the controller 170 may control the linkage between the steering wheel 401 and the directional vehicle wheels 10L and 10R so as to be cut off while maintaining the steering wheel 401 in the rotated state. Thereafter, the controller 170 may switch the autonomous driving vehicle 100 to the autonomous driving state.

When the linkage between the steering wheel 401 and the directional vehicle wheels 10L and 10R is cut off, the direction of the directional vehicle wheels 10L and 10R may be changed regardless of the rotation of the steering wheel 401.

Figure 16C:
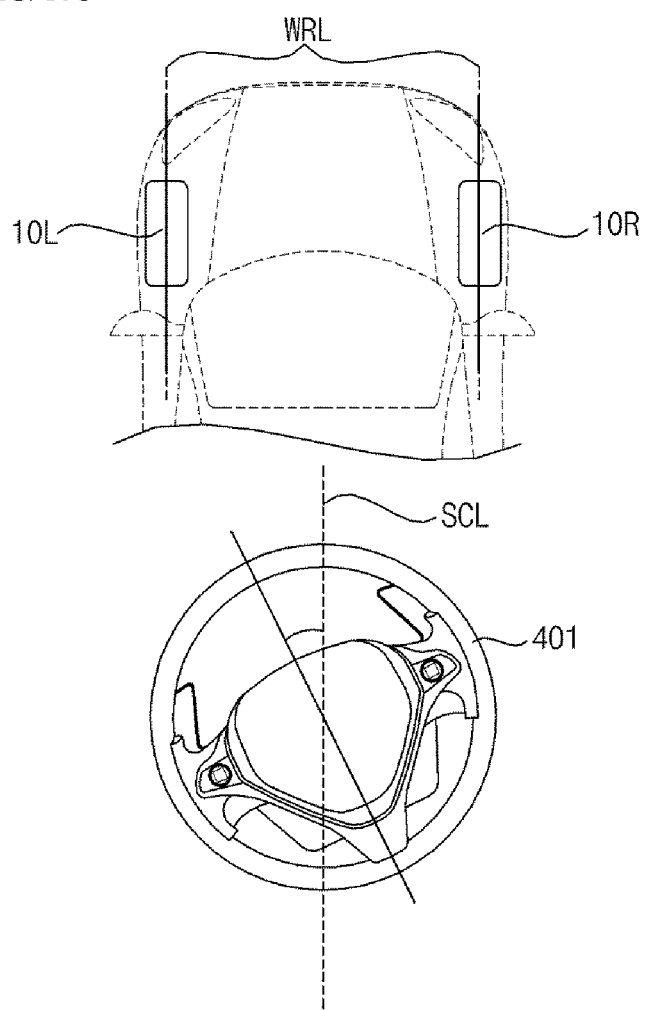

Referring to FIG. 16C, the controller 170 may control the direction change of the directional vehicle wheels 10L and 10R in the autonomous driving state regardless of the rotation of the steering wheel 401. In this instance, the direction of the directional vehicle wheels 10R and 10L may not match the rotation of the steering wheel 401.

Figure 16D:
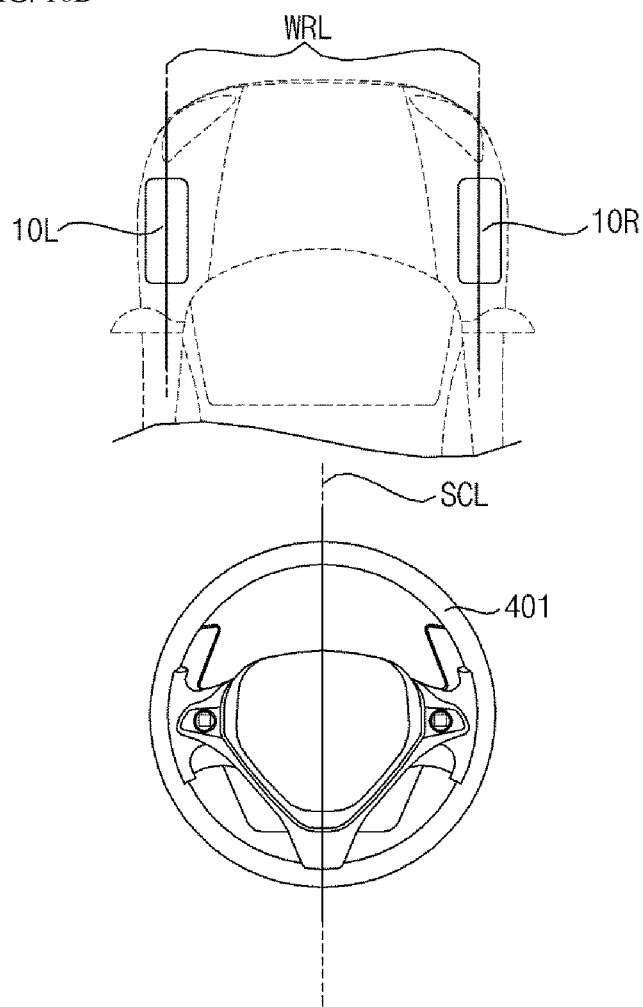

Referring to FIG. 16D, thereafter, the controller 170 may control the steering wheel 401 so as to return to the original state from the rotated state. Here, the original state of the steering wheel 401 may mean the state before the steering wheel 401 is rotated. The steering wheel 401 may not be rotated in the vertical direction about the center line SCL which vertically penetrates the center of the steering wheel 401.

After the steering wheel 401 is returned to the original state, the controller 170 may control the direction of the directional vehicle wheels 10L and 10R in the autonomous driving state regardless of the rotation of the steering wheel 401.

Figure 17A:
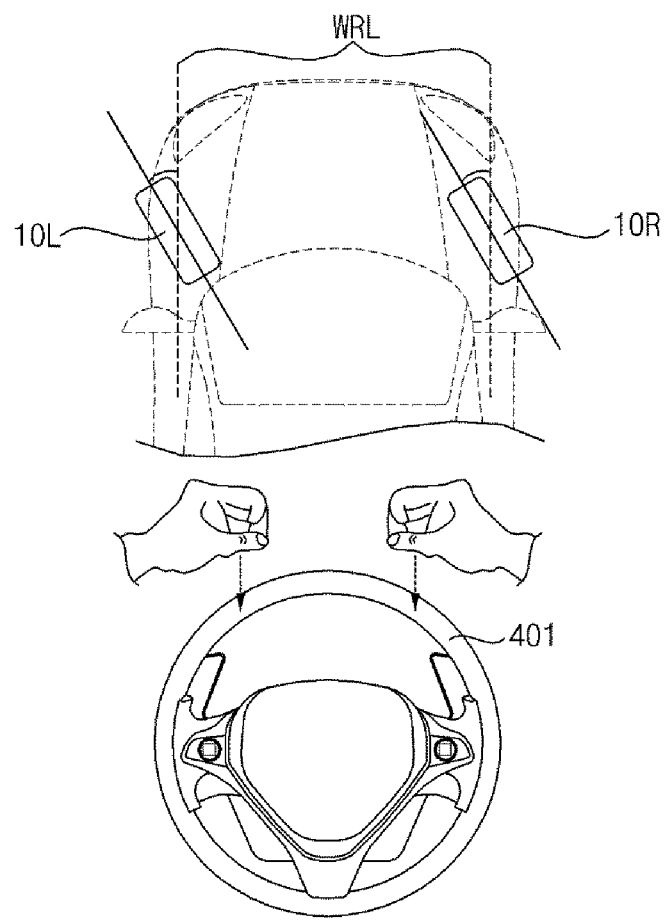
FIGS. 17A to 17C are views referenced to further describe the operation of the autonomous driving vehicle.
Figure 17B:
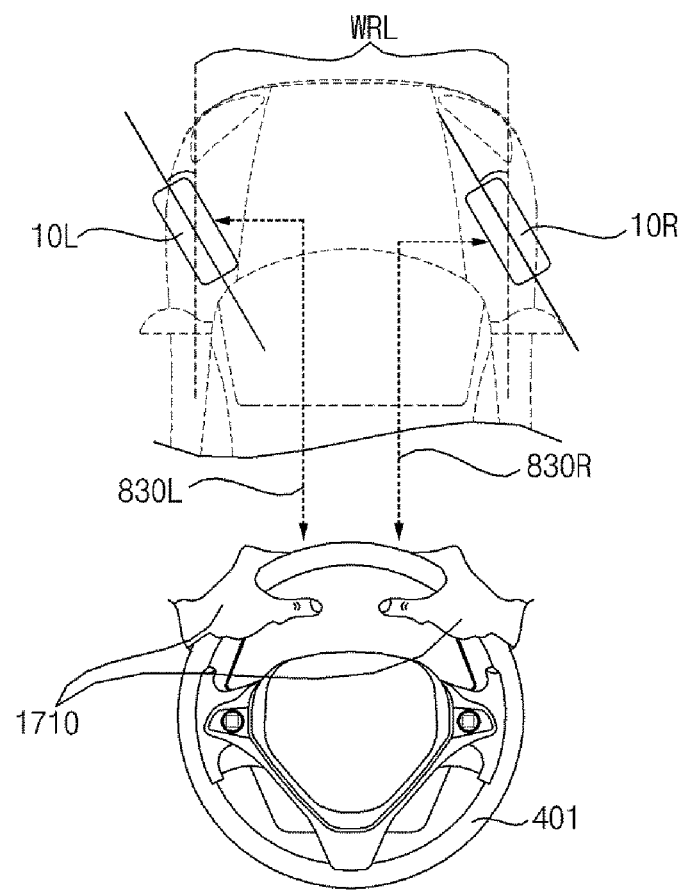
Figure 17C:
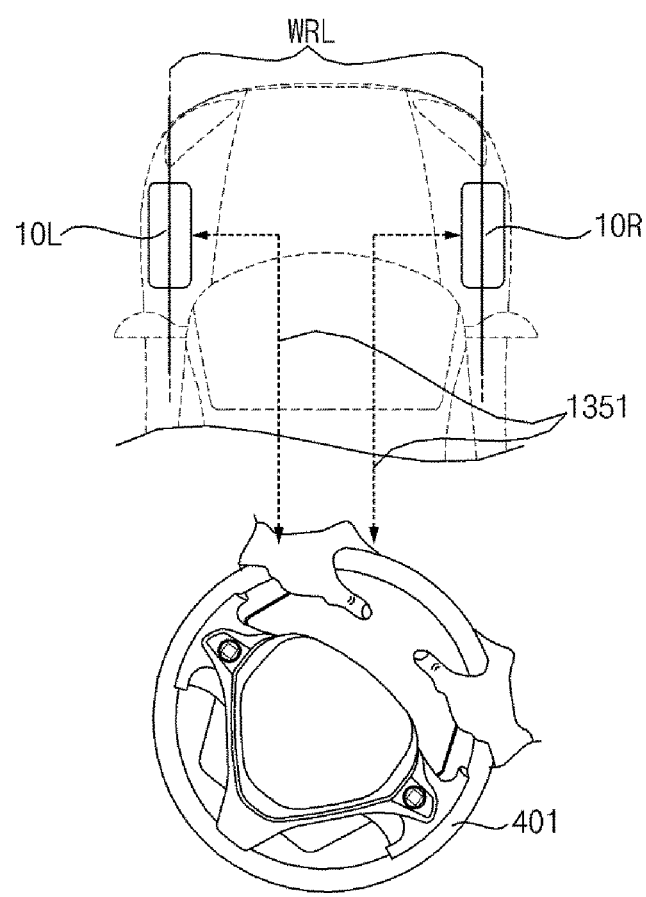

FIGS. 17A to 17C are views referenced to further describe the operation of the autonomous driving vehicle.

Referring to FIG. 17A, the controller 170 may control the direction of the directional vehicle wheels 10L and 10R in the autonomous driving state of the autonomous driving vehicle 100 regardless of the rotation of the steering wheel 401.

The controller 170 may control the direction of the directional vehicle wheels 10L and 10R so as to be changed to the left side or the right side relative to the direction in which the vehicle is heading in the original state of the steering wheel 401. In this instance, the steering wheel 401 and the directional vehicle wheels 10L and 10R may not be engaged with each other.

Referring to FIG. 17B, the controller 170 may sense that the steering wheel 401 is being gripped in the state in which the steering wheel 401 and the directional vehicle wheels 10L and 10R are not engaged with each other.

A sensor capable of sensing whether the user is gripping the steering wheel 401 may be located in the region of the steering wheel 401. For example, the sensor for sensing the grip of the steering wheel 401 by the user may be a touch sensor or a pressure sensor. The grip sensor may sense the grip pressure of the steering wheel 401. The grip sensor may be located in the overall rim region of the steering wheel 401 so as to sense that the left hand and the right hand of the user grips the steering wheel 401.

When it is sensed that the steering wheel 401 is being gripped (as represented by reference numeral 1710), the controller 170 may control the steering wheel 401 and the directional vehicle wheels 10L and 10R so as to be mechanically or electrically linked to each other (as represented by arrows 830L and 830R) while maintaining the steering wheel 401 and the directional vehicle wheels 10L and 10R in the unengaged state. In addition, the controller 170 may control the autonomous driving vehicle 100 so as to switch to the manual driving state.

Referring to FIG. 17C, when the steering wheel 401 is rotated in the unengaged state, the controller 170 may change the direction of the directional vehicle wheels 10L and 10R based on whether the steering wheel 401 is rotated, and the rotational direction, the rotational displacement, or the rotational speed of the steering wheel 401.

As described above, when it is sensed that the steering wheel 401 is being gripped in the state in which the steering wheel 401 and the directional vehicle wheels 10L and 10R are not engaged, the autonomous driving vehicle 100 may switch to the manual driving state, which may assist the user in directly inputting a steering command in response to an emergency situation.

FIGS. 18A to 18F are views referenced to further describe the operation of the autonomous driving vehicle.

Figure 18A:
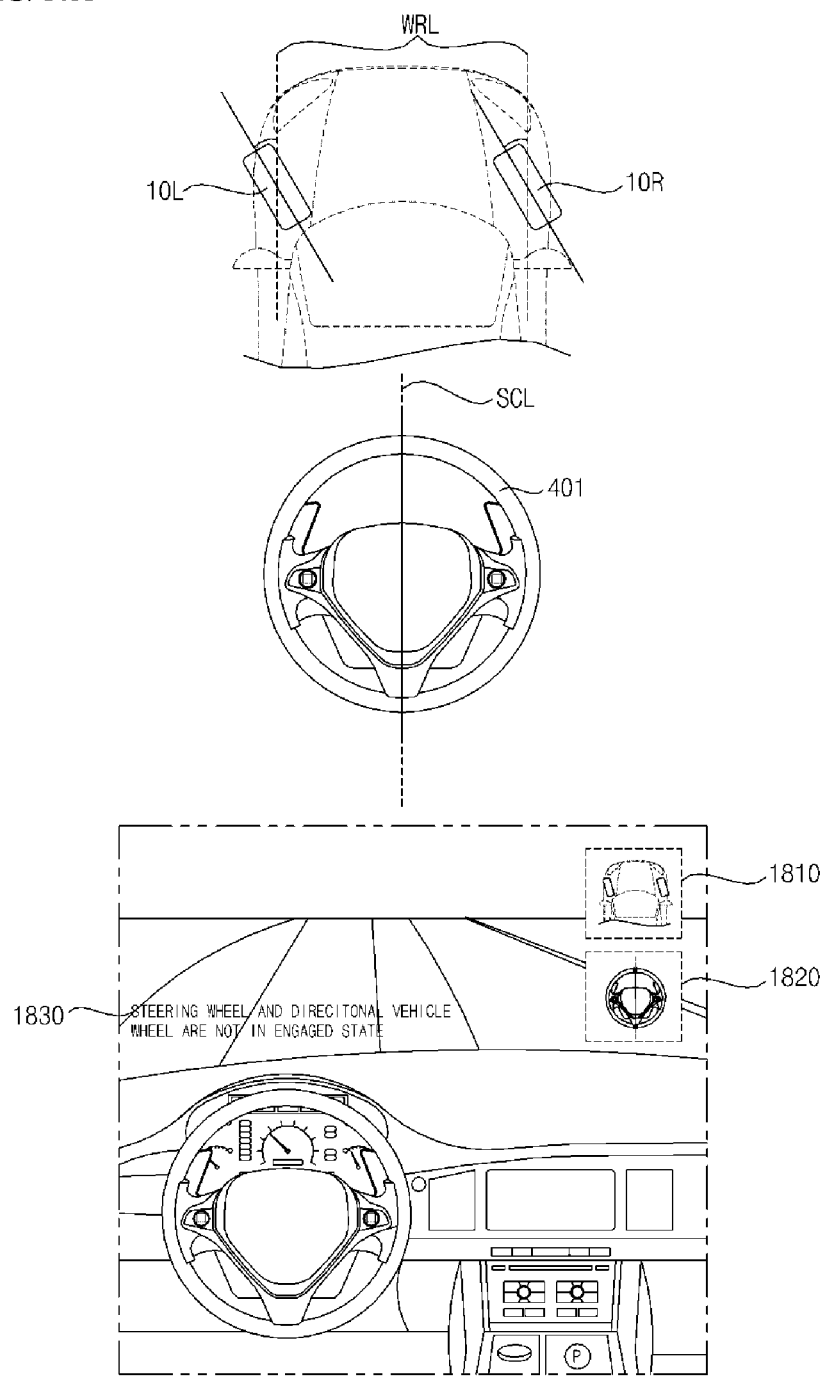
FIGS. 18A to 18F are views referenced to further describe the operation of the autonomous driving vehicle.

Referring to FIG. 18A, the controller 170 may control the direction of the directional vehicle wheels 10L and 10R in the autonomous driving state of the autonomous driving vehicle 100 regardless of the rotation of the steering wheel 401.

The controller 170 may control the direction of the directional vehicle wheels 10L and 10R so as to be changed to the left side or the right side relative to the direction in which the vehicle is heading in the original state of the steering wheel 401. In this instance, the steering wheel 401 and the directional vehicle wheels 10L and 10R may not be engaged with each other.

In this instance, the controller 170 may control the output unit 140 so as to output the rotational state of the steering wheel 401. For example, the controller 170 may control the display unit 141 so as to display a steering wheel image 1820. The controller 170 may display the steering wheel image 1820 so as to correspond to the steering wheel 401. The controller 170 may rotate and display the steering wheel image 1820 so as to correspond to the rotated state of the steering wheel 401.

The controller 170 may control the output unit 140 so as to output the direction change state of the directional vehicle wheels 10L and 10R. For example, the controller 170 may control the display unit 141 so as to display a vehicle image 1810 including the directional vehicle wheels 10L and 10R. The controller 170 may display a directional vehicle wheels image included in the vehicle image 1810 so as to correspond to the direction change state of the directional vehicle wheels 10L and 10R. The controller 170 may display the direction in which the directional vehicle wheels included in the vehicle image 1810 faces, and consequently, may display the direction change state of the directional vehicle wheels 10L and 10R.

The controller 170 may control the output unit 140 so as to output the engagement state of the steering wheel 401 and the directional vehicle wheels 10L and 10R. For example, the controller 170 may control the display unit 140 so as to display the vehicle image 1810 and the steering wheel image 1820. The control unit 170 may output the engagement state based on the direction in which the directional vehicle wheels included in the vehicle image 1810 faces and whether the direction in which the directional vehicle wheels faces matches the extent of rotation of the steering wheel 401 in the steering wheel image 1820. For example, the controller 170 may control the display unit 141 so as to output the engagement state in the form of text 1830. For example, the controller 170 may control the sound output unit 142 so as to output a voice indicating the engagements state.

FIG. 18A illustrates the state in which the steering wheel 401 and the directional vehicle wheels 10L and 10R are not engaged with each other.

Figure 18B:
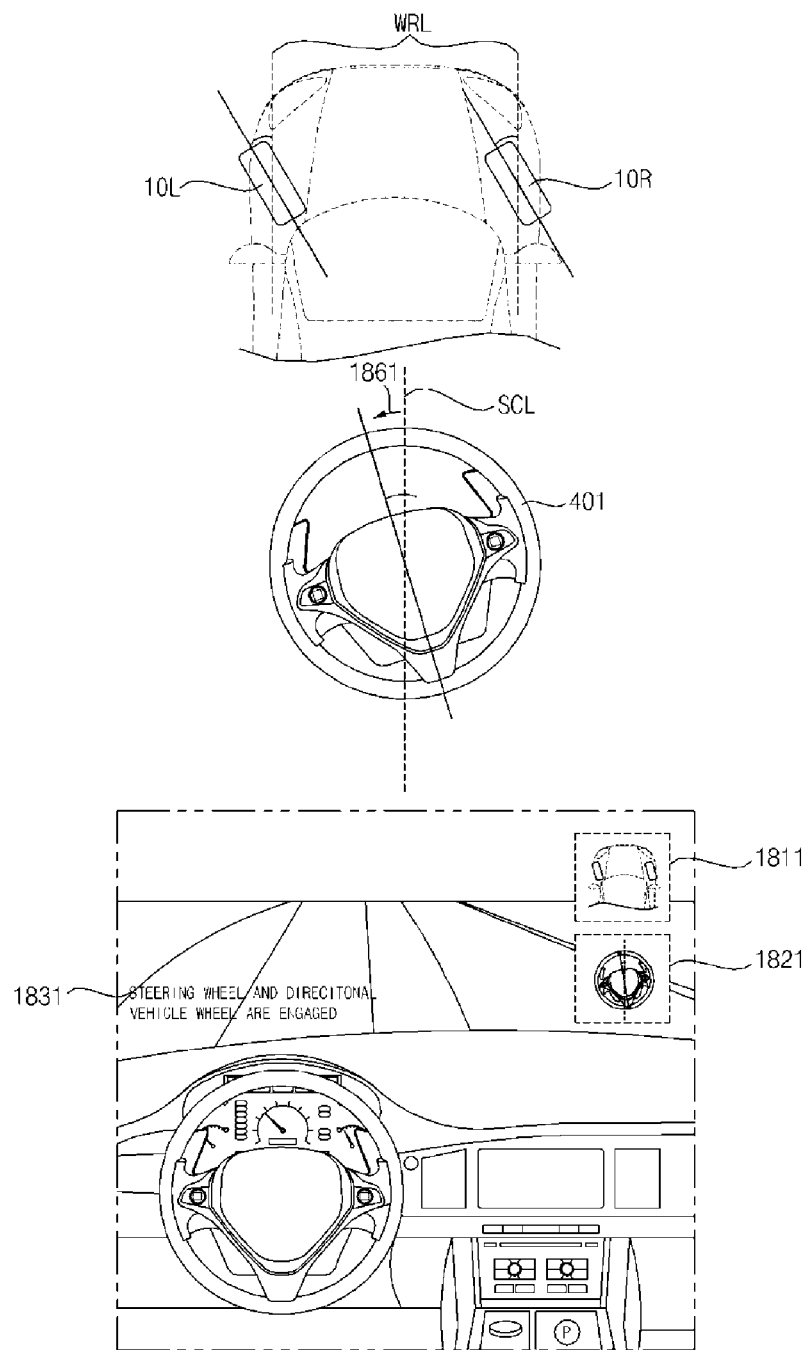
Figure 18C:
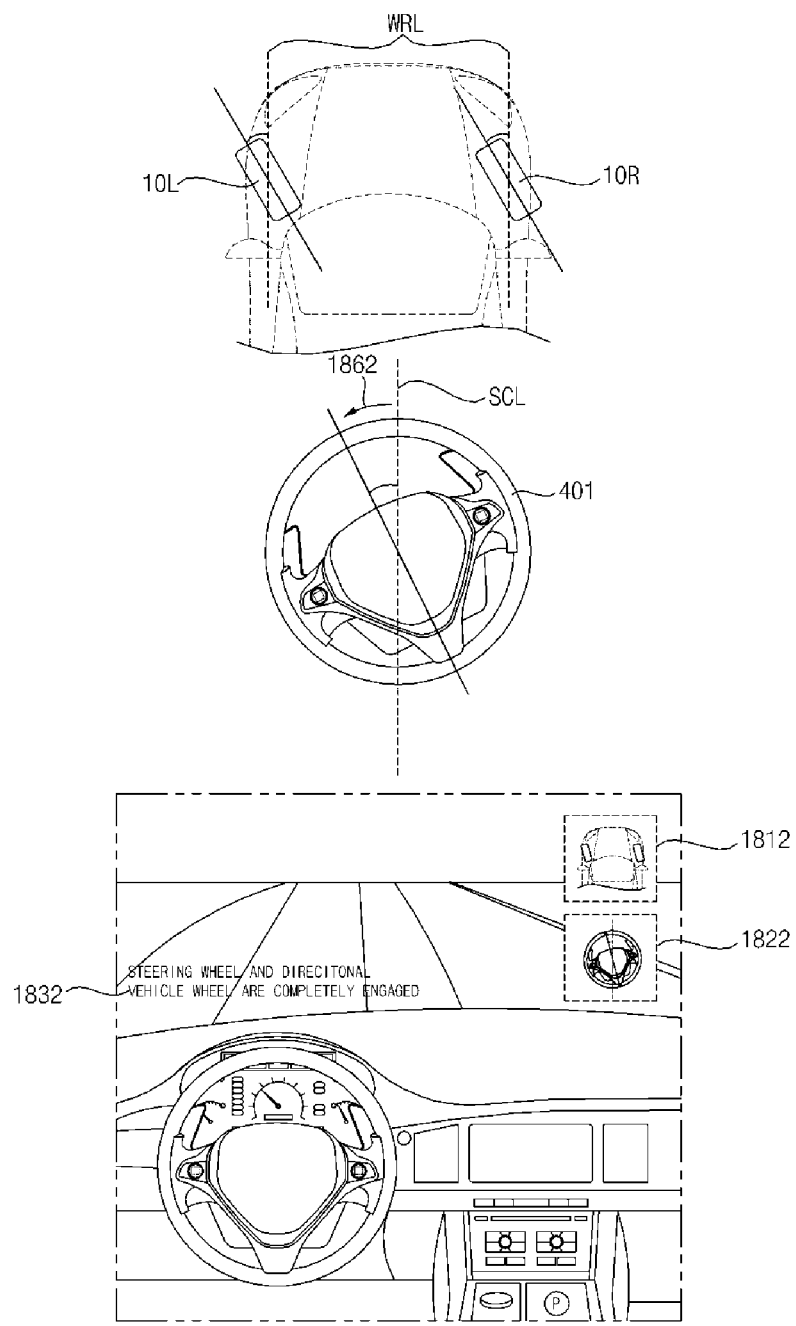

Referring to FIGS. 18B and 18C, when an operation to prepare for manual driving begins in the state in which the steering wheel 401 and the directional vehicle wheels 10L and 10R are not engaged with each other, the controller 170 may perform control to engage the steering wheel 401 and the directional vehicle wheels 10L and 10R with each other. The controller 170 may rotate the steering wheel 401 (as represented by arrows 1861 and 1862) so as to match the direction in which the directional vehicle wheels 10L and 10R face.

In this instance, the controller 170 may control the output unit 140 so as to display the situation in which the steering wheel 401 and the directional vehicle wheels 10L and 10R are engaged with each other. For example, the controller 170 may control the display unit 141 so as to display vehicle images 1811 and 1812 and steering wheel images 1821 and 1822. The controller 170 may display the engagement situation based on the state of the directional vehicle wheels included in the vehicle images 1811 and 1812 and based on the rotated state of the steering wheel included in the steering wheel images 1821 and 1822. For example, the controller 170 may control the display unit 141 so as to output the engagement situation in the form of text 1831 and 1832. For example, the controller 170 may control the sound output unit 142 so as to output a voice indicating the engagement situation.

FIG. 18B illustrates the engagement process of the steering wheel 401 and the directional vehicle wheels 10L and 10R. FIG. 18C illustrates the completion of engagement between the steering wheel 401 and the directional vehicle wheels 10L and 10R.

When the engagement between the steering wheel 401 and the directional vehicle wheels 10L and 10R is completed, the controller 170 may change the direction of the directional vehicle wheels 10L and 10R in response to the rotation of the steering wheel 401. In addition, the controller 170 may rotate the steering wheel 401 in response to the direction change of the directional vehicle wheels 10L and 10R.

In this instance, the controller 170 may adjust the rotational speed of the steering wheel 401 based on whether it is sensed that the steering wheel 401 is being gripped. For example, when it is sensed that the user is gripping the steering wheel 401, the controller 170 may rotate the steering wheel 401 more slowly than that when it is not sensed that the steering wheel 401 is being gripped. This is because the user may create a dangerous situation when the user rapidly rotates the steering wheel 401 while gripping the steering wheel 401.

Figure 18D:
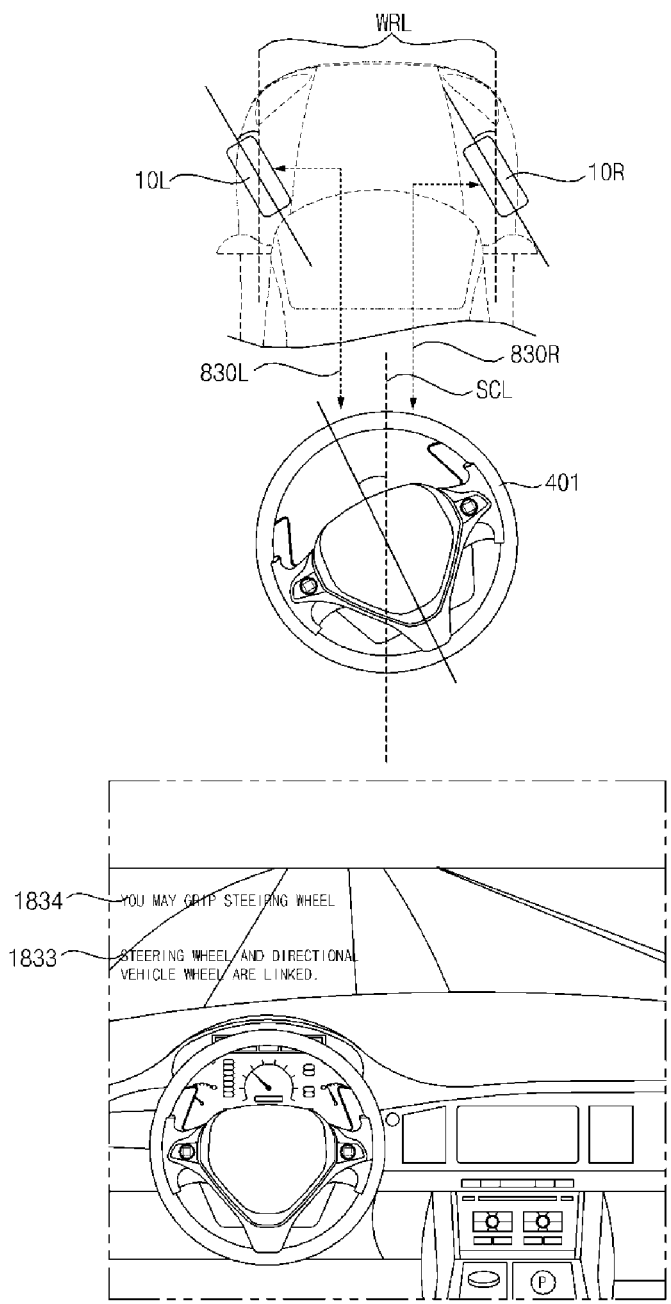

Referring to FIG. 18D, in the state in which the engagement between the steering wheel 401 and the directional vehicle wheels 10L and 10R is completed, the controller 170 may control the steering wheel 401 and the directional vehicle wheels 10L and 10R so as to be mechanically or electrically linked to each other (as represented by the arrows 830L and 830R). Thereafter, the controller 170 may switch the autonomous driving vehicle 100 from the autonomous driving state to the manual driving state.

In this instance, the controller 170 may control the output unit 140 so as to output information regarding the linkage of the steering wheel 401. For example, the controller 170 may control the display unit 141 so as to display information regarding the linkage between the steering wheel 401 and the directional vehicle wheels 10L and 10R in the form of text 1833. For example, the controller 170 may control the sound output unit 142 so as to output a voice indicating information regarding the linkage between the steering wheel 401 and the directional vehicle wheels 10L and 10R.

The controller 170 may control the output unit 140 so as to output information indicating that the user can grip the steering wheel 401 because the steering wheel 401 and the directional vehicle wheels 10L and 10R are linked to each other. For example, the controller 170 may control the display unit 141 so as to display information indicating that the user can grip the steering wheel 401 in the form of text 1834. For example, the controller 170 may control the sound output unit 142 so as to output a voice indicating information indicating that the user can grip the steering wheel 401.

Figure 18E:
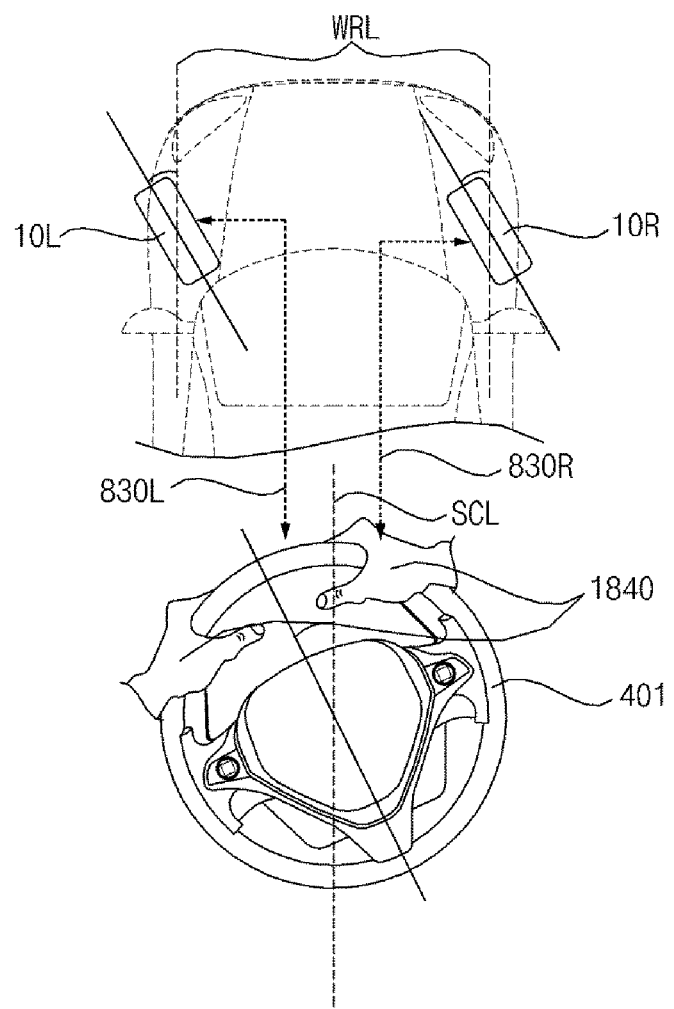
Figure 18F:
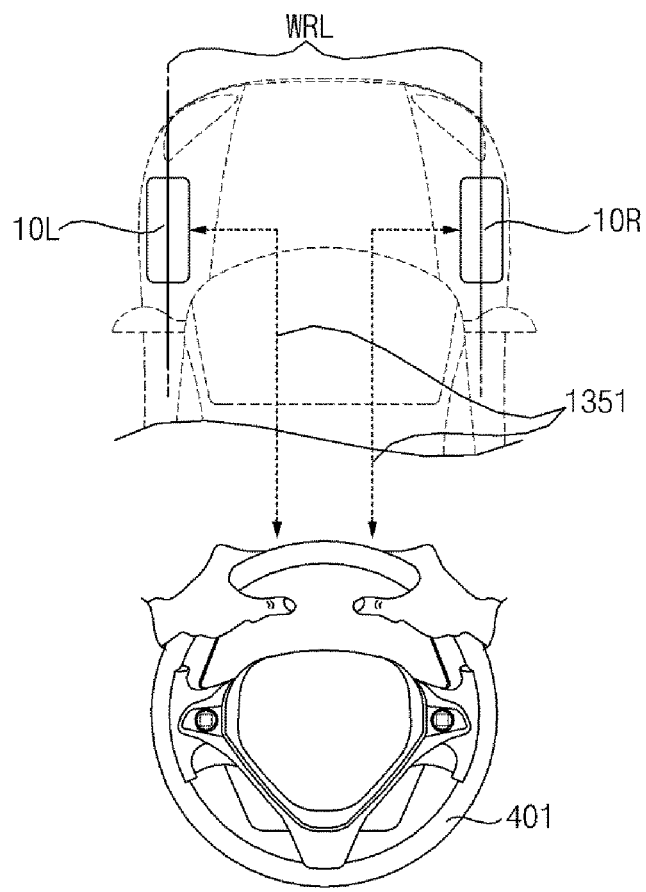

Referring to FIGS. 18E and 18F, after the user grips the steering wheel 401, the controller 170 may perform control to rotate the steering wheel 401. The controller 170 may change the direction of the directional vehicle wheels 10L and 10R in response to the rotation of the steering wheel 401.

Figure 19A:
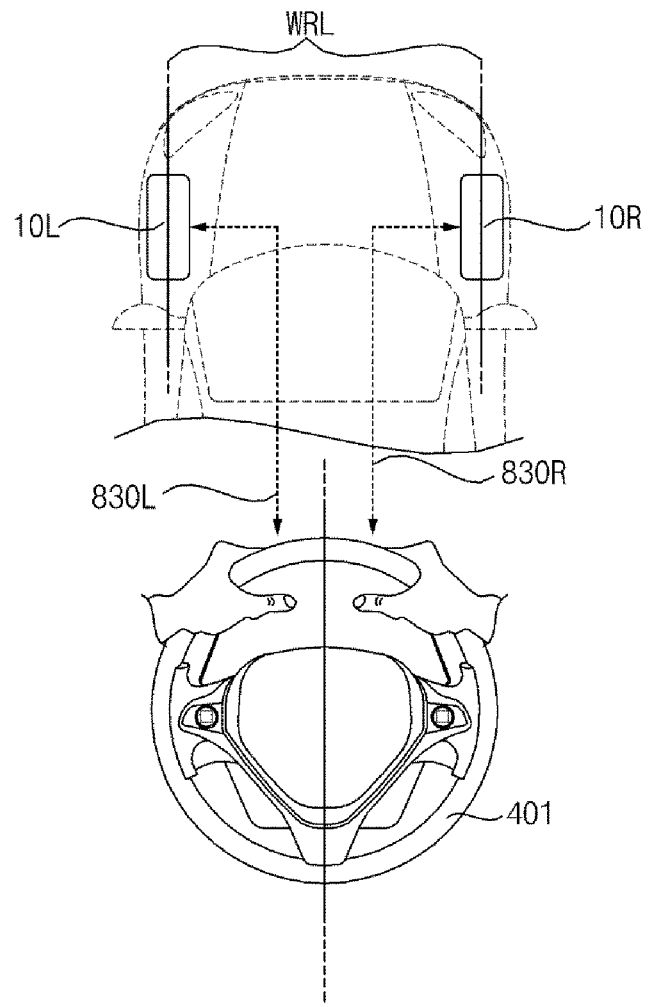
FIGS. 19A to 19C are views referenced to further describe the operation of the autonomous driving vehicle.
Figure 19B:
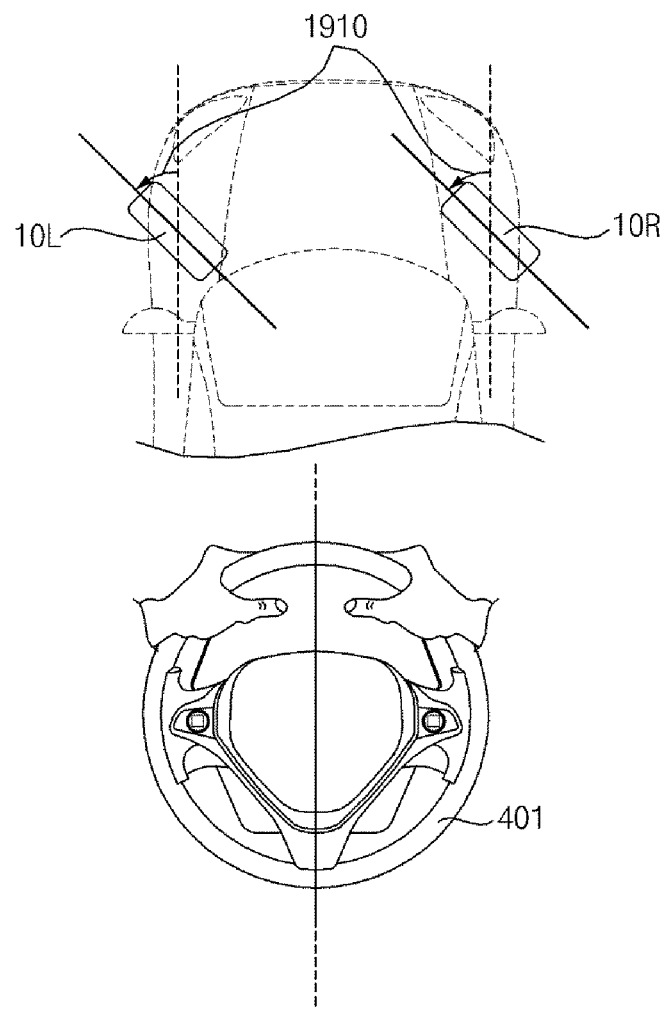
Figure 19C:
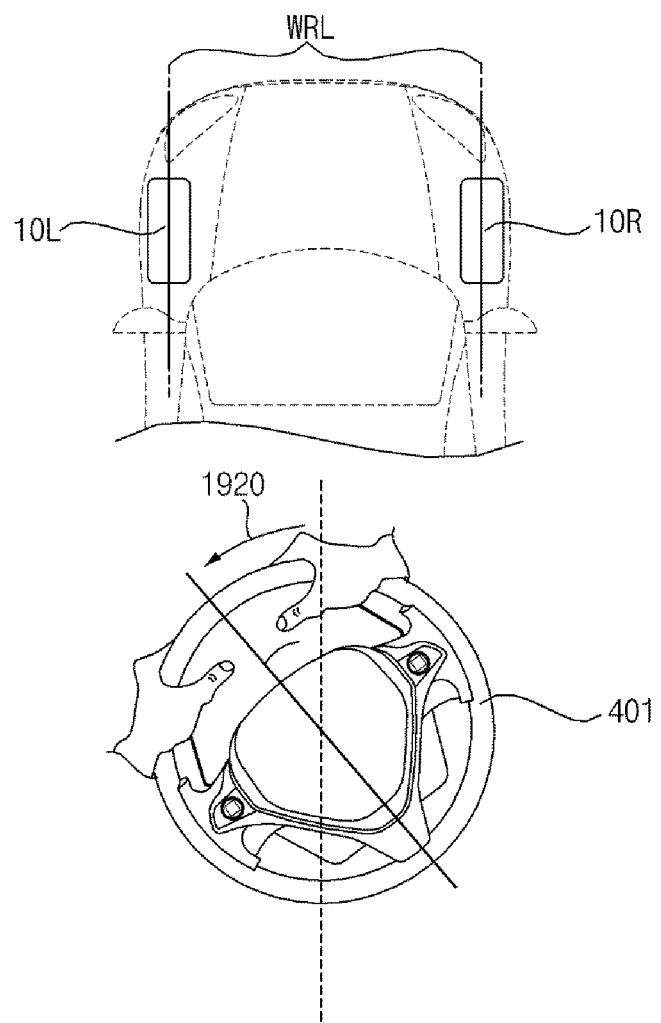

FIGS. 19A to 19C are views referenced to further describe the operation of the autonomous driving vehicle.

Referring to FIG. 19A, the controller 170 may control the steering wheel 401 and the directional vehicle wheels 10L and 10R so as to be mechanically or electrically linked to each other while the autonomous driving vehicle 100 is in the manual driving state.

As exemplarily illustrated in FIG. 19B, when the direction of the directional vehicle wheels 10L and 10R is rapidly changed (as represented by arrow 1910) in the manual driving state, the controller 170 may control the mechanical or electrical linkage between the steering wheel 401 and the directional vehicle wheels 10L and 10R so as to be cut off.

For example, the extent of direction change of the directional vehicle wheels 10L and 10R per unit time is a reference value or more while the autonomous driving vehicle 100 is in the manual driving state, the controller 170 may control the mechanical or electrical linkage between the steering wheel 401 and the directional vehicle wheels 10L and 10R so as to be cut off.

As described above, in the case where the direction of the wheels is rapidly changed in the automated manner when an emergency situation is sensed in the manual driving state, the linkage between the steering wheel 401 and the directional vehicle wheels 10L and 10R may be cut off, which may alleviate the shock that would otherwise be applied to the user by the rapid rotation of the steering wheel 401.

As exemplarily illustrated in FIG. 19C, when the direction of the directional vehicle wheels 10L and 10R is rapidly changed (as represented by arrow 1910) in the manual driving state, the controller 170 may control the mechanical or electrical linkage between the steering wheel 401 and the directional vehicle wheels 10L and 10R so as to be cut off.

For example, when the extent of direction change of the directional vehicle wheels 10L and 10R per unit time is a reference value or more while the autonomous driving vehicle 100 is in the manual driving state, the controller 170 may control the mechanical or electrical linkage between the steering wheel 401 and the directional vehicle wheels 10L and 10R so as to be cut off.

As described above, even if the user rapidly rotates the steering wheel 401 in a panic in an emergency situation in the manual driving state, the linkage between the steering wheel 401 and the directional vehicle wheels 10L and 10R is cut off, which may reduce the probability of an accident.

The present invention as described above may be implemented as code that can be written on a computer readable medium in which a program is recorded and thus read by a computer. The computer readable medium includes all kinds of recording devices in which data is stored in a computer readable manner. Examples of the computer readable recording medium may include a hard disk drive (HDD), a solid state disk (SSD), a silicon disk drive (SDD), a ROM, a RAM, a CD-ROM, a magnetic tape, a floppy disc, and an optical data storage device. In addition, the computer readable medium is implemented in a carrier wave (e.g., data transmission over the Internet). In addition, the computer may include the processor or the controller 170. Thus, the above detailed description should not be construed as limited to the embodiments set forth herein in all terms and be considered by way of example. The scope of the present invention should be determined by the reasonable interpretation of the accompanying claims and all changes in the equivalent range of the present invention are intended to be included in the scope of the present invention.

As is apparent from the above description, the embodiments of the present invention have one or more effects as follows.

First, because the linkage between a steering wheel and directional vehicle wheels is cut off in the state in which an autonomous driving vehicle is in the autonomous driving state, during autonomous driving, there is no risk of the steering wheel being rotated even in the case of the direction change of the vehicle-wheels, which has the effect of preventing a user from feeling a sense of disconnectedness and inconvenience.

Second, information related to the linkage between the steering wheel and the directional vehicle wheels and the cutoff of linkage is provided to the user, which has the effect of assisting the user in easily recognizing the linkage state.

Third, switching between the autonomous steering state and the manual driving state is implemented based on whether the user grips the steering wheel, which has the effect of enabling easy switching.

Fourth, when the user inputs a steering command by rotating the steering wheel upon switching from the manual driving state to the autonomous driving state, the linkage between the steering wheel and the directional vehicle wheels may be released while the steering wheel is maintained in the rotated state, which has the effect of enabling rapid manual switching.

Fifth, the steering wheel and the directional vehicle wheels may be controlled so as to be engaged with and linked to each other upon switching from the autonomous driving state to the manual driving state, which has the effect of preventing the user from feeling a sense of disconnectedness.

Sixth, when the steering wheel is rotated as the direction of the directional vehicle wheels is changed in the autonomous driving state, the rotated state of the steering wheel may be virtually output, which has the effect of preventing the user from feeling a sense of disconnectedness.

Effects of the present invention should not be limited to the aforementioned effects and other not-mentioned effects will be clearly understood by those skilled in the art from the claims.

What is claimed is:

1. An autonomous driving vehicle configured to enable mutual switching between an autonomous driving state and a manual driving state, the vehicle comprising:
   a steering wheel; and
   a controller configured to control a mechanical linkage or an electrical linkage between the steering wheel and a directional vehicle wheel so as to be disengaged or engaged based on whether the autonomous driving vehicle is in the autonomous driving state or the manual driving state, respectively,
   wherein the controller is configured to control the mechanical linkage or the electrical linkage between the steering wheel and the directional vehicle wheel so as to be disengaged when the autonomous driving vehicle is in the autonomous driving state, and
   wherein the controller is configured to perform control to temporarily switch to the manual driving state when user input for lane change is received in the autonomous driving state.

2. The vehicle according to claim 1, wherein the controller is configured to perform control to begin a preparation operation to prepare for autonomous driving when a prescribed event occurs in the manual driving state.

3. The vehicle according to claim 2, wherein the prescribed event is user input for switching from the manual driving state to the autonomous driving state.

4. The vehicle according to claim 2, further comprising an output unit,
   wherein the controller is configured to control the output unit so as to output information regarding switching to autonomous driving when the preparation operation begins.

5. The vehicle according to claim 2, wherein, when the preparation operation begins in the state in which the steering wheel is rotated, the controller is configured to control the mechanical linkage or the electrical linkage so as to be disengaged while maintaining the steering wheel in the rotated state.

6. The vehicle according to claim 5, wherein the controller is configured to control the steering wheel so as to return to an original state from the rotated state after the mechanical linkage or the electrical linkage is disengaged.

7. The vehicle according to claim 1, wherein the controller is configured to perform control to switch to the manual driving state when it is sensed that the steering wheel is being gripped in the autonomous driving state in the state in which the steering wheel and the directional vehicle wheel are not in an engaged state, thereby controlling the steering wheel and the directional vehicle wheel so as to be mechanically or electrically linked to each other while maintaining the steering wheel and the directional vehicle wheel in the unengaged state.

8. The vehicle according to claim 7, wherein the controller is configured to perform control to again switch to the autonomous driving state when the release of the grip of the steering wheel is sensed after switching to the manual driving state.

9. The vehicle according to claim 7, wherein the controller is configured to perform control to begin an operation to prepare for autonomous driving when user input for switching to the autonomous driving state is received in the state in which the release of the grip of the steering wheel is sensed after switching to the manual driving state.

10. The vehicle according to claim 1, wherein the controller is configured to control the steering wheel and the directional vehicle wheel so as to be mechanically or electrically linked to each other while the autonomous driving vehicle is in the manual driving state.

11. The vehicle according to claim 10, wherein the controller is configured to perform control to begin a preparation operation to prepare for manual driving when a prescribed event occurs in the autonomous driving state.

12. The vehicle according to claim 11, wherein the prescribed event is user input for switching from the autonomous driving state to the manual driving state, or an input corresponding to rotation of the steering wheel.

13. The vehicle according to claim 11, further comprising an output unit,
    wherein the controller is configured to control the output unit so as to output information regarding switching to manual driving when the preparation operation begins.

14. The vehicle according to claim 11, wherein the controller is configured to control the steering wheel and the directional vehicle wheel so as to be mechanically or electrically linked to each other for engagement therebetween when the preparation operation begins.

15. The vehicle according to claim 14, wherein the controller is configured to control the steering wheel and the directional vehicle wheel so as to be engaged with each other by rotating the steering wheel to correspond to a direction of the directional vehicle wheel.

16. The vehicle according to claim 15, wherein the controller is configured to adjust a rotational speed of the steering wheel based on whether it is sensed that the steering wheel is being gripped.

17. The vehicle according to claim 15, further comprising an output unit,
    wherein the controller is configured to control the output unit so as to output information regarding an engagement state of the steering wheel and the directional vehicle wheel.

18. The vehicle according to claim 10, wherein the controller is configured to control the mechanical linkage or the electrical linkage between the steering wheel and the directional vehicle wheel so as to be disengaged when an extent of direction change of the directional vehicle wheel per unit time is equal to a reference value or more in the manual driving state.

* * * * *